United States Patent
Guo et al.

(10) Patent No.: US 12,237,566 B2
(45) Date of Patent: Feb. 25, 2025

(54) ANTENNA APPARATUS AND ELECTRONIC DEVICE

(71) Applicant: Honor Device Co., Ltd., Shenzhen (CN)

(72) Inventors: Jianqiang Guo, Shenzhen (CN); Liang Bai, Shenzhen (CN); Lianjie Ye, Shenzhen (CN); Wenjun Luo, Shenzhen (CN); Zhihai Li, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 259 days.

(21) Appl. No.: 17/778,354

(22) PCT Filed: Apr. 13, 2021

(86) PCT No.: PCT/CN2021/086876
§ 371 (c)(1),
(2) Date: May 19, 2022

(87) PCT Pub. No.: WO2021/208900
PCT Pub. Date: Oct. 21, 2021

(65) Prior Publication Data
US 2022/0407218 A1    Dec. 22, 2022

(30) Foreign Application Priority Data
Apr. 14, 2020   (CN) .......................... 202010292512.5

(51) Int. Cl.
*H01Q 1/24*   (2006.01)
*H01Q 1/50*   (2006.01)
*H04M 1/02*   (2006.01)

(52) U.S. Cl.
CPC ............... *H01Q 1/243* (2013.01); *H01Q 1/50* (2013.01); *H04M 1/0266* (2013.01); *H04M 1/0277* (2013.01)

(58) Field of Classification Search
CPC ......... H05K 2201/10128; H05K 1/189; H05K 1/028; H05K 3/361; H05K 1/0281;
(Continued)

(56) References Cited

U.S. PATENT DOCUMENTS 8,525,739 B2   9/2013   Lee et al.
9,609,094 B2   3/2017   Yamashita et al.
(Continued)

FOREIGN PATENT DOCUMENTS

CN   205248423 U   5/2016
CN   106129603 A   11/2016
(Continued)

OTHER PUBLICATIONS

Zhang Jing, "The Design and Solution of Internal Antenna", Development & Innovation of Machinery & Electrical Products, vol. 24, No. 2, Mar. 2011; 10 total pages, including English translation.
(Continued)

*Primary Examiner* — Khalid W Shaheed
(74) *Attorney, Agent, or Firm* — Rimon PC

(57) ABSTRACT

The electronic device includes a frame, a screen, and a circuit board assembly. A part of the frame forms a radiator of an antenna, or the radiator of the antenna is fixed on an inner side of the frame. The circuit board assembly is located on the inner side of the frame. The circuit board assembly includes a first conductive member, and a first board, an elevating board, and a second board sequentially stacked. The first board is located on one side of the second board away from the screen. The first board includes a first main body portion and a first extension portion connected to the
(Continued)

first main body portion. The first main body portion is fixedly connected to the elevating board. The first extension portion protrudes relative to the elevating board and the second board, and is disposed close to the radiator.

18 Claims, 26 Drawing Sheets

(58) Field of Classification Search
CPC ........ H05K 2201/055; H05K 2201/056; G02F 1/13452; G06F 1/1652
See application file for complete search history.

(56) References Cited

U.S. PATENT DOCUMENTS

| | | | |
|---|---|---|---|
| 9,882,284 B2 | 1/2018 | Eom et al. | |
| 2007/0205960 A1 | 9/2007 | Fujikawa et al. | |
| 2008/0252554 A1 | 10/2008 | Chuang et al. | |
| 2016/0147263 A1* | 5/2016 | Choi | G06F 1/1616 |
| | | | 361/679.3 |
| 2016/0329626 A1 | 11/2016 | Jeon et al. | |
| 2017/0054199 A1 | 2/2017 | Gang et al. | |
| 2017/0094818 A1 | 3/2017 | Kim et al. | |
| 2017/0371198 A1* | 12/2017 | Kim | G02F 1/133308 |
| 2018/0184530 A1* | 6/2018 | Wang | G02F 1/1345 |
| 2019/0020114 A1 | 1/2019 | Paulotto et al. | |
| 2019/0220122 A1* | 7/2019 | Shin | G06F 3/0412 |
| 2020/0084888 A1* | 3/2020 | Lee | H05K 1/118 |
| 2020/0192431 A1* | 6/2020 | Shin | G06F 1/203 |
| 2020/0196496 A1* | 6/2020 | Shin | G06F 1/1652 |
| 2020/0227442 A1* | 7/2020 | Chen | G02F 1/13458 |
| 2021/0080773 A1* | 3/2021 | Li | G02F 1/133314 |

FOREIGN PATENT DOCUMENTS

| | | |
|---|---|---|
| CN | 107359412 A | 11/2017 |
| CN | 107800830 A | 3/2018 |
| CN | 108172972 A | 6/2018 |
| CN | 108232426 A | 6/2018 |
| CN | 108232427 A | 6/2018 |
| CN | 108235832 A | 6/2018 |
| CN | 108702401 A | 10/2018 |
| CN | 208923337 U | 5/2019 |
| CN | 109874228 A | 6/2019 |
| JP | 2014216837 A | 11/2014 |
| RU | 2562813 C2 | 9/2015 |

OTHER PUBLICATIONS

Wang Zhongyue, "Research And Design of Planar Multi-Mode Antenna for Mobile Phone", East China Jiaotong University, 2016; 210 total pages, including English translation.

S. R. McLaren and B. K. Watson, "The Design and Manufacture of High Performance Baggage Transportable, Ground Terminal Antennas," IEEE Colloquium on Materials and Manufacturing Processes for Antennas, 1990, pp. 2/1-2/7.

* cited by examiner

ANTENNA APPARATUS AND ELECTRONIC DEVICE

CROSS-REFERENCE TO RELATED APPLICATIONS

This application is a national stage of International Application No. PCT/CN2021/086876, filed on Apr. 13, 2021, which claims priority of Chinese Patent Application No. 202010292512.5, filed on Apr. 14, 2020. Both of the aforementioned applications are hereby incorporated by reference in its entirety.

This application claims priority to Chinese Patent Application No. 202010292512.5, filed with the China National Intellectual Property Administration on Apr. 14, 2020, and entitled "ANTENNA APPARATUS AND ELECTRONIC DEVICE", which is incorporated herein by reference in its entirety.

TECHNICAL FIELD

The present invention relates to the technical field of antennas, and in particular, to an antenna apparatus and an electronic device.

BACKGROUND

As electronic device technologies evolve, users hope that more electronic components (for example, cameras and various types of sensors) can be integrated into a mobile phone to realize more diverse functions of the mobile phone. However, as more and more electronic components are arranged inside the mobile phone, there is less space for arranging antennas. In addition, with the rapid development of 5G mobile phones, there are more and more 5G frequency bands and more and more antennas. In this way, in a tense environment in which there is little space for arranging antennas and the number of antennas is large, the clearance area of the antenna of a conventional mobile phone is small, and the antenna has poor ability to transmit and receive electromagnetic waves.

SUMMARY

The clearance area of an electronic device provided by the technical solutions of this application is larger, and the performance of an antenna of the electronic device is better.

According to a first aspect, an electronic device is provided. The electronic device may be a mobile phone, a watch, or other forms of a device capable of transmitting and receiving electromagnetic wave signals. The electronic device includes a frame, a screen, and a circuit board assembly.

The screen is mounted on one side of the frame. In an implementation, the screen includes a protective cover plate and a display screen. The protective cover plate is stacked on the display screen. The display screen is disposed close to the circuit board assembly relative to the protective cover plate. The protective cover plate may be mainly configured to protect the display screen and prevent dust.

A part of the frame forms a radiator of an antenna, or the radiator of the antenna is fixed on an inner side of the frame.

The circuit board assembly is located on the inner side of the frame. The circuit board assembly includes a first conductive member, and a first board, an elevating board, and a second board sequentially stacked. In other words, the elevating board is located between the first board and the second board. The first board is located on one side of the second board away from the screen. In other words, the first board is disposed away from the screen relative to the second board. The first board includes a first main body portion and a first extension portion connected to the first main body portion. The first main body portion is fixedly connected to the elevating board. The first extension portion protrudes relative to the elevating board and the second board, and is disposed close to the radiator. The first conductive member is fixed to the first extension portion. The first conductive member is in elastic contact with the radiator.

It should be noted that, the first conductive member may be an elastic piece having electrical conductivity or may alternatively be a spring having electrical conductivity, which is not limited in this application. In each of the solutions that can be implemented below, the first conductive member is described by taking a first elastic piece as an example.

In this implementation, by disposing the first extension portion that protrudes relative to the elevating board and the second board, and fixedly connecting the first elastic piece to the first extension portion, the first elastic piece is disposed away from the display screen of the screen, that is, in a thickness direction of the electronic device, a distance between the first elastic piece and the display screen becomes greater. In this way, the antenna clearance area between the first elastic piece and the display screen can be increased to a greater extent, and the performance of the antenna is better.

In addition, when the first elastic piece is disposed away from the display screen, a contact point at which the first elastic piece is in contact with the radiator can also be arranged away from the display screen. In this way, the contact point (feed point) between the first elastic piece and the radiator is less affected by the display screen.

In addition, compared with a solution of fixing the first elastic piece on the second board, in this implementation, by fixing the first elastic piece on the first extension portion, there are no longer any antenna-related components or wiring (for example, antenna switches, inductances, capacitors, or resistors) disposed on the elevating board and the second board. In this way, on the one hand, the structure of the circuit board assembly is simpler, that is, the assembly difficulty of the circuit board assembly is reduced, and the cost investment of the circuit board assembly is lower; and on the other hand, more space can be freed up on the second board to arrange more electronic components.

In addition, by bringing the first elastic piece into elastic contact with the radiator, the transmission of radio frequency signals between the first elastic piece and the radiator is ensured to be more stable. Specifically, because the first elastic piece has an elastic force, the first elastic piece can always be in contact with the radiator when the first elastic piece is in elastic contact with the radiator, so that the connection stability between the first elastic piece and the radiator is better.

In addition, by sequentially stacking the first board, the elevating board, and the second board, the board area of the circuit board assembly can be significantly increased, thereby increasing the number of electronic components arranged on the circuit board assembly. Specifically, when the first board and the second board are elevated by the elevating board, on the circuit board assembly, electronic components (for example, a CPU, a battery management chip, or the like) not only can be arranged on a surface of the first board facing a rear cover and a surface of the second board facing the display screen, but also can be arranged in a space between the first board and the second board (on a surface of the first board facing the second board and a surface of the second board facing the first board). In other words, on the circuit board assembly of this implementation, more electronic components can be arranged. In this way, on the one hand, the electronic device has more and more functions and better user experience; and on the other hand, in a case that the internal environment of the electronic device is tense, by arranging a large number of electronic components of the electronic device on the circuit board assembly, more space can be freed up inside the electronic device. When this part of space is applied to the clearance area of the antenna, the clearance area of the antenna can be significantly increased, thereby significantly improving the performance of the antenna.

In a possible implementation according to the first aspect, the electronic device further includes a radio frequency path. The radio frequency path can be configured to transmit radio frequency signals to the radiator of the antenna, so that the radiator of the antenna transmits electromagnetic wave signals according to the radio frequency signals. In addition, when the radiator of the antenna converts the received electromagnetic wave signals into radio frequency signals, the radio frequency path can further be configured to receive the radio frequency signals transmitted by the radiator of the antenna. In this case, the first elastic piece is electrically connected between the radio frequency path and the radiator.

In another possible implementation, the first elastic piece is electrically connected between the radiator and a ground layer of the first extension portion.

In another possible implementation, the first elastic piece is electrically connected to the ground layer of the first extension portion through a matching circuit.

According to the first aspect, or any one of the implementations of the first aspect described above, the first elastic piece is fixed to one side of the first extension portion facing the screen. In this case, the first elastic piece, the elevating board, and the second board are located on the same side of the first board. In the thickness direction of the electronic device, there is an overlapping region between the first elastic piece and the elevating board. The first elastic piece utilizes a space of the elevating board facing the side of the radiator. In this way, in the thickness direction of the electronic device, the circuit board assembly does not thicken due to the configuration of the first elastic piece.

In addition, the space between a surface of the first extension portion facing the screen and the radiator is generally small. General chips or electronic components are not easy to be disposed in this region. In this case, the space is unused, which easily results in a waste of space. In this implementation, by fixing the first elastic piece with a small size to one side of the first extension portion facing the display screen, on the one hand, the space of this part can be effectively utilized to improve the internal space utilization of the electronic device; and on the other hand, compared with a case in which the first elastic piece is disposed on one side of the first board facing the rear cover, in this implementation, a space occupied by at least one first elastic piece can be saved by a space between the first board and the rear cover, and in this case, the space saved can be used for arranging more electronic components, thereby improving the space utilization of the circuit board assembly to a greater extent.

According to the first aspect, or any one of the implementations of the first aspect described above, In addition, a distance L from the contact point between the first elastic piece and the radiator to the display screen is greater than or equal to 2 mm. For example, L equals 2 mm, 2.5 mm, 3 mm, 3.5 mm or 4 mm.

It may be understood that, when the distance L from the contact point between the first elastic piece and the radiator to the display screen is greater than or equal to 2 mm, the first elastic piece can be disposed away from the display screen to a greater extent. In this way, the antenna clearance area between the first elastic piece and the display screen can be increased to a greater extent, and the performance of the antenna is better.

According to the first aspect, or any one of the implementations of the first aspect described above, the distance L from the contact point between the first elastic piece and the radiator to the display screen is less than or equal to 4.7 mm.

It may be understood that, when the distance L from the contact point between the first elastic piece and the radiator to the display screen is less than or equal to 4.7 mm, on the one hand, it can be ensured that the first elastic piece is disposed away from the display screen; and on the other hand, it can be ensured that a thickness of the electronic device in a Z direction is not great, which is conducive to thinning configuration.

According to the first aspect, or any one of the implementations of the first aspect described above, a distance between the first elastic piece and the elevating board is between 0.15 mm and 30 mm.

It may be understood that, when the distance between the first elastic piece and the elevating board ranges from 0.15 mm to 30 mm, the size of the first extension portion located between the first elastic piece and the elevating board is relatively moderate. In this way, when the first elastic piece is in elastic contact with the radiator, the first elastic piece receives a reaction force of the radiator. The first elastic piece transmits the reaction force to the first extension portion. In this case, the first extension portion located between the first elastic piece and the elevating board is not easy to fracture or crack. In other words, the reaction force received by the first extension portion can be rapidly transmitted to the elevating board, thereby counteracting the reaction force with an internal stress of the elevating board.

According to the first aspect, or any one of the implementations of the first aspect described above, the circuit board assembly further includes a first strengthening board. The first strengthening board is located on one side of the first elastic piece and fixedly connected to a board surface of the first extension portion facing the screen.

It may be understood that, by stacking the first strengthening board on one side of the first elastic piece and on the first extension portion, a thickness of a part of the first extension portion is significantly increased, which further significantly improves the structural strength of the first board. In this way, when the first elastic piece is in elastic contact with the radiator, the first elastic piece receives a reaction force of the radiator of the antenna. The first elastic piece transmits the reaction force to the first extension portion of the first board. In this case, with the cooperation of the first strengthening board, the first extension portion can effectively counteract the force, thereby avoiding the first extension portion from being damaged or cracked due to an external force, and thus avoiding the disconnection of the circuit of the antenna.

According to the first aspect, or any one of the implementations of the first aspect described above, the first strengthening board includes a first portion and a second portion connected to the first portion. The first portion is fixedly connected to the board surface of the first extension portion facing the screen, and the first portion is fixedly connected to the elevating board. The second portion is fixedly connected to the second board. In the thickness direction of the electronic device, a thickness of the first strengthening board is greater than a thickness of the elevating board.

It may be understood that, the first portion and the second portion are sequentially stacked on the first extension portion, the first portion is fixedly connected to the elevating board, and the second portion is fixedly connected to the second board, thereby significantly improving the structural strength of the first board. In this way, when the first elastic piece is in elastic contact with the radiator of the antenna, the first elastic piece receives a reaction force of the radiator of the antenna. The first elastic piece transmits the reaction force to the first extension portion of the first board. In this case, with the cooperation of the first strengthening board, the elevating board, and the second board, the first extension portion can effectively counteract the force, thereby avoiding the first extension portion from being damaged or cracked due to an external force, and thus avoiding the disconnection of the circuit of the antenna.

In another possible implementation, the first strengthening board is fixedly connected to the elevating board. In a thickness direction of the electronic device, a thickness of the first strengthening board is less than or equal to a thickness of the elevating board.

It may be understood that, the first strengthening board is stacked on the first extension portion, and the first strengthening board is fixedly connected to the elevating board, thereby significantly improving the structural strength of the first board. In this way, when the first elastic piece is in elastic contact with the radiator of the antenna, the first elastic piece receives a reaction force of the radiator of the antenna. The first elastic piece transmits the reaction force to the first extension portion of the first board. In this case, with the cooperation of the first strengthening board and the elevating board, the first extension portion can effectively counteract the force, thereby avoiding the first extension portion from being damaged or cracked due to an external force.

According to the first aspect, or any one of the implementations of the first aspect described above, the first portion and the elevating board are of an integrally formed structure, and the second portion and the second board are of an integrally formed structure. In other words, the first portion and the elevating board are an integral board. In this case, the connection between the first portion and the elevating board is firmer. In this way, the first portion and the elevating board are not easy to fracture or crack when receiving an external force. In addition, the second portion and the second board are an integral board. In this case, the connection between the second portion and the second board is firmer. In this way, the second portion and the second board are not easy to fracture or crack when subjected to an external force.

In another possible implementation, the first portion can alternatively be fixedly connected to the elevating board by a soldering process. the second portion can alternatively be fixedly connected to the second board by a soldering process.

According to the first aspect, or any one of the implementations of the first aspect described above, the first portion is provided with a first strengthening solder pad. The first extension portion is provided with a second strengthening solder pad. The first strengthening solder pad is soldered to the second strengthening solder pad.

It may be understood that, when the first portion and the first extension portion are soldered together through the first strengthening solder pad and the second strengthening solder pad, the connection between the first portion and the first extension portion is firmer, and the integral strength of the circuit board assembly is better. In addition, after the first strengthening solder pad and the second strengthening solder pad are soldered together, the first strengthening solder pad and the second strengthening solder pad can effectively protect a solder pad (the solder pad of this part is mainly configured for electrical connection between wiring of the first board and wiring of the elevating board) between the first main body portion of the first board and the elevating board. That is, the solder pad between the first body portion and the elevating board is avoided from easily breaking due to an external force.

According to the first aspect, or any one of the implementations of the first aspect described above, a distance between the first elastic piece and the first portion ranges from 0.15 mm to 30 mm. In this case, the size of the first extension portion located between the first elastic piece and the first portion is relatively moderate. In this way, when the first elastic piece is in elastic contact with the radiator of the antenna, the first elastic piece receives a reaction force of the radiator. The first elastic piece transmits the reaction force to the first extension portion. In this case, the first extension portion located between the first elastic piece and the first portion is not easy to fracture or crack. In other words, the reaction force received by the first extension portion can be rapidly transmitted to the first portion, thereby counteracting the reaction force by an internal stress of the first portion.

According to the first aspect, or any one of the implementations of the first aspect described above, the circuit board assembly further includes a second strengthening board. The second strengthening board is located on one side of the first elastic piece away from the first strengthening board, and is fixedly connected to the board surface of the first extension portion facing the screen.

It may be understood that, by stacking the first strengthening board on one side of the first elastic piece and on the first extension portion, and stacking the second strengthening board on the other side of the first elastic piece and on the first extension portion, a thickness of a part of the first extension portion is significantly increased, which further significantly improves the structural strength of the first board. In this way, when the first elastic piece is in elastic contact with the radiator, the first elastic piece receives a reaction force of the radiator of the antenna. The first elastic piece transmits the reaction force to the first extension portion of the first board. In this case, with the cooperation of the first strengthening board and the second strengthening board, the first extension portion can effectively counteract the force, thereby avoiding the first extension portion from being damaged or cracked due to an external force, and thus avoiding the disconnection of the circuit of the antenna.

According to the first aspect, or any one of the implementations of the first aspect described above, the second strengthening board includes a third portion and a fourth portion connected to the third portion. The third portion is fixedly connected to the board surface of the first extension portion facing the screen, and the third portion is fixedly connected to the elevating board. The fourth portion is fixedly connected to the second board. In the thickness direction of the electronic device, a thickness of the second strengthening board is greater than a thickness of the elevating board.

It may be understood that, the third portion and the fourth portion connected to the third portion are sequentially stacked on the first extension portion, the third portion is fixedly connected to the elevating board, and the fourth portion is fixedly connected to the second board, thereby significantly improving the structural strength of the first board. In this way, when the first elastic piece is in elastic contact with the radiator of the antenna, the first elastic piece receives a reaction force of the radiator of the antenna. The first elastic piece transmits the reaction force to the first extension portion of the first board. In this case, with the cooperation of the first strengthening board, the second strengthening board, the elevating board, and the second board, the first extension portion can effectively counteract the force, thereby avoiding the first extension portion from being damaged or cracked due to an external force, and thus avoiding the disconnection of the circuit of the antenna.

In another possible implementation, the second strengthening board is fixedly connected to the elevating board. In a thickness direction of the electronic device, a thickness of the second strengthening board is less than or equal to a thickness of the elevating board.

According to the first aspect, or any one of the implementations of the first aspect described above, the third portion and the elevating board are of an integrally formed structure. The fourth portion and the second board are of an integrally formed structure. In other words, the third portion and the elevating board are an integral board. In this case, the connection between the third portion and the elevating board is firmer. In this way, the third portion and the elevating board are not easy to fracture or crack when receiving an external force. In addition, the fourth portion and the second board are an integral board. In this case, the connection between the fourth portion and the second board is firmer. In this way, the fourth portion and the second board are not easy to fracture or crack when receiving an external force.

In another possible implementation, the third portion can alternatively be fixedly connected to the elevating board by a soldering process. The fourth portion can alternatively be fixedly connected to the second board by a soldering process.

According to the first aspect, or any one of the implementations of the first aspect described above, a distance d3 between the first elastic piece and the third portion ranges from 0.15 mm to 30 mm.

In this case, the size of the first extension portion located between the first elastic piece and the third portion is relatively moderate. In this way, when the first elastic piece is in elastic contact with the radiator of the antenna, the first elastic piece receives a reaction force of the radiator. The first elastic piece transmits the reaction force to the first extension portion. In this case, the first extension portion located between the first elastic piece and the third portion is not easy to fracture or crack. In other words, the reaction force received by the first extension portion can be rapidly transmitted to the third portion, thereby counteracting the reaction force by an internal stress of the third portion.

According to the first aspect, or any one of the implementations of the first aspect described above, the first extension portion is provided with a groove. The groove is located between the first strengthening board and the second strengthening board, and an opening of the groove is located on a surface of the first extension portion facing the screen. A part of the first elastic piece is mounted in the groove.

It may be understood that, when a part of the first elastic piece is mounted in the groove, in the thickness direction of the electronic device, there is an overlapping region between the first elastic piece and the first extension portion. In this case, the first elastic piece can be disposed further away from the display screen, that is, in the thickness direction of the electronic device, a distance between the first elastic piece and the display screen can be significantly increased. In this case, a distance from the contact point between the first elastic piece and the radiator to the display screen is significantly increased. In this way, in the thickness direction of the electronic device, the antenna clearance area between the first elastic piece and the display screen can be made larger, and the performance of the antenna is better.

In addition, when the first extension portion is provided with the first strengthening board and the second strengthening board, the first strengthening board and the second strengthening board are located at the periphery of the groove. In this case, the first strengthening board and the second strengthening board can improve the strength of the first extension portion, thereby avoiding the first extension portion from being reduced in strength due to the opening of the groove.

According to the first aspect, or any one of the implementations of the first aspect described above, a conductive piece is disposed on a surface of the radiator facing the first elastic piece. The first elastic piece is in elastic contact with the conductive piece.

It may be understood that, when the conductive piece is disposed on the radiator, the conductive piece can improve the surface flatness of the radiator. In this way, when the first elastic piece is in elastic contact with the radiator through the conductive piece, the elastic contact between the first elastic piece and the radiator is more stable. In this way, the radio frequency signals are also more stable in the process of transmission between the radiator and the first elastic piece, thereby ensuring better antenna performance of the electronic device.

According to the first aspect, or any one of the implementations of the first aspect described above, the oxidation resistance of the conductive piece is better than that of the radiator. It may be understood that, under an environment with the same temperature and humidity, the conductive piece is not easy to be oxidized compared with the radiator. In this way, compared with a solution in which the first elastic piece directly comes into elastic contact with the radiator, a contact resistance between the first elastic piece and the conductive piece is smaller, that is, the contact resistance between the first elastic piece and the conductive piece is more stable, and the transmission loss of the radio frequency signals is smaller. In this case, the performance of the antenna of the electronic device is better.

According to the first aspect, or any one of the implementations of the first aspect described above, the electronic device includes a fastener. The radiator is provided with a blind hole. The fastener is fixed into the blind hole. The first elastic piece is in elastic contact with the fastener.

It may be understood that, compared with a solution of soldering the conductive piece on the radiator, this implementation saves the process of soldering the conductive piece on the radiator by disposing the fastener in the blind hole of the radiator, and electrically connecting the first elastic piece to the radiator of the antenna through the fastener. Therefore, on the one hand, the cost investment of the electronic device is reduced, and there is no need to further increase the input cost of the soldering process; and on the other hand, the case that the performance of the radiator in transmitting and receiving electromagnetic waves is affected by the generation of gas holes, slag inclusions, solder joints, or cracks in the soldering process in the radiator is avoided.

According to the first aspect, or any one of the implementations of the first aspect described above, the radiator has an inner side surface facing the circuit board assembly. The first elastic piece is in elastic contact with the inner side surface. In this way, the first elastic piece can be disposed away from the display screen to a greater extent. In the thickness direction of the electronic device, a distance between the first elastic piece and the display screen can be significantly increased. In this way, in the thickness direction of the electronic device, the antenna clearance area between the first elastic piece and the display screen can be made larger, and the performance of the antenna is better.

In addition, a distance from the contact point between the first elastic piece and the radiator to the display screen is significantly increased, and in this case, the signal interference of the display screen to the contact point between the first elastic piece and the radiator is less.

In addition, the radiator may not need to be provided with a protrusion to come into contact with the first elastic piece, and in this case, in the thickness direction of the electronic device, the space omitting the protrusion may also be used for the clearance area of the antenna. In this way, the clearance area of the antenna is larger, and the performance of the antenna is better.

According to the first aspect, or any one of the implementations of the first aspect described above, the first elastic piece is fixed to one side of the first extension portion of the first board facing the rear cover. In addition, the first elastic piece is in elastic contact with the protrusion of the radiator.

It may be understood that, by fixing the first elastic piece to one side of the first extension portion facing the rear cover, and bringing the first elastic piece into elastic contact with the protrusion of the radiator, the first elastic piece can be disposed close to the rear cover to a greater extent, that is, the first elastic piece can be disposed away from the display screen to a greater extent, that is, in the thickness direction of the electronic device, a distance between the first elastic piece and the display screen can be significantly increased. In this way, in the thickness direction of the electronic device, the protrusion configured to be in contact with the first elastic piece can be disposed away from the display screen to a greater extent. The antenna clearance area between the bottom of the protrusion and the display screen can be made larger, and the performance of the antenna is better.

In addition, a distance from the contact point between the first elastic piece and the radiator to the display screen is significantly increased, and in this case, the signal interference of the display screen to the contact point between the first elastic piece and the radiator is less.

According to the first aspect, or any one of the implementations of the first aspect described above, the first elastic piece includes a first fixed piece, an elastic member, and a second fixed piece. The elastic member is connected between the first fixed piece and the second fixed piece. It may be understood that, the elastic member may be, but is not limited to, an elastic piece or a spring. In addition, the first fixed piece may be, but is not limited to, a copper piece, an aluminum piece, or a gold piece. The second fixed piece may be, but is not limited to, a copper piece, an aluminum piece, or a gold piece.

In addition, the first fixed piece is fixedly connected to the radiator. The second fixed piece is fixedly connected to the first extension portion of the first board.

It may be understood that, the first elastic piece has a simple structure and is easy to assemble, which can reduce the assembly difficulty of the electronic device.

According to the first aspect, or any one of the implementations of the first aspect described above, the electronic device further includes a middle plate. The middle plate is located on the inner side of the frame. The middle plate is grounded. The frame further includes a connection segment. One end of the connection segment is connected to the radiator and the other end is connected to the middle plate.

It may be understood that, the radiator is grounded in a relatively simple manner and has a simple structure and relatively low cost investment.

According to the first aspect, or any one of the implementations of the first aspect described above, the circuit board assembly further includes a second conductive member. The second conductive member may be, but is not limited to, an elastic piece or a spring. The second conductive member is disposed on the first extension portion of the first board. The second conductive member is electrically connected between the ground layer of the first board and the radiator. In other words, the second conductive member is configured to ground the radiator.

It may be understood that, the radiator is grounded in a relatively simple manner and has a simple structure and relatively low cost investment.

According to the first aspect, or any one of the implementations of the first aspect described above, the first board is provided with a second matching circuit. The second matching circuit includes an inductor, a capacitor, a resistor, or an antenna switch. A second elastic piece is electrically connected to the second matching circuit and is electrically connected to the ground layer of the first board through the second matching circuit. The second matching circuit is configured to tune the frequency bands of the antenna for receiving and transmitting electromagnetic waves and the impedance matching for the antenna. In this way, the antenna is more widely applied to transmit and receive electromagnetic waves and has better performance.

According to the first aspect, or any one of the implementations of the first aspect described above, the electronic device further includes a middle plate. The middle plate is grounded. The middle plate is located on the inner side of the frame. The circuit board assembly further includes a second conductive member and a third conductive member. The second conductive member is fixed to the first extension portion of the first board. The second conductive member is in elastic contact with the radiator. The third conductive member is fixed to the second board. The third conductive member is in elastic contact with the middle plate, and is electrically connected to the second conductive member.

It may be understood that, by disposing the second conductive member on the first extension portion, disposing the third conductive member on the second conductive member, and utilizing the third conductive member for grounding, a ground path of the radiator is increased. In this case, in the ground path of the radiator, a matching circuit may be disposed on the circuit board assembly to tune the frequency bands of the antenna for receiving and transmitting electromagnetic waves, so that the frequency bands of the antenna for receiving and transmitting are wider.

According to the first aspect, or any one of the implementations of the first aspect described above, the radiator includes a protrusion facing an interior of the electronic device. The first conductive member is fixed to one side of the first extension portion facing the screen. The first conductive member is in elastic contact with the protrusion, and the first conductive member is electrically connected between the radiator and a radio frequency path of the antenna. The radio frequency path is mounted on the circuit board assembly;

The circuit board assembly further includes a first strengthening board and a second strengthening board. The first strengthening board and the second strengthening board are respectively located on two sides of the first conductive member. In the thickness direction of the electronic device, a thickness of the first strengthening board and a thickness of the second strengthening board are both greater than a thickness of the elevating board.

The first strengthening board includes a first portion and a second portion connected to the first portion. The first portion is fixedly connected to the board surface of the first extension portion facing the screen. The first portion is fixedly connected to the elevating board. The second portion is fixedly connected to the second board.

The second strengthening board includes a third portion and a fourth portion connected to the third portion. The third portion is fixedly connected to the board surface of the first extension portion facing the screen. The third portion is fixedly connected to the elevating board, and the fourth portion is fixedly connected to the second board.

The first portion, the third portion, and the elevating board are of an integrally formed structure. The second portion, the fourth portion, and the second board are of an integrally formed structure.

It may be understood that, by sequentially stacking the first portion and the second portion on one side of the first elastic piece and on the first extension portion, and sequentially stacking the third portion and the fourth portion on the other side of the first elastic piece and on the first extension portion, a thickness of a part of the first extension portion is significantly increased, thereby significantly improving the structural strength of the first board. In this way, when the first elastic piece is in elastic contact with the radiator, the first elastic piece receives a reaction force of the radiator of the antenna. The first elastic piece transmits the reaction force to the first extension portion of the first board. In this case, with the cooperation of the first portion, the second portion, the third portion, and the fourth portion, the first extension portion can effectively counteract the force, thereby avoiding the first extension portion from being damaged or cracked due to an external force, and thus avoiding the disconnection of the circuit of the antenna.

In addition, the first elastic piece is fixed to one side of the first extension portion facing the display screen. In this case, the first elastic piece, the elevating board, and the second board are located on the same side of the first board. In the thickness direction of the electronic device, there is an overlapping region between the first elastic piece and the elevating board. The first elastic piece utilizes a space of the elevating board facing the side of the radiator. In this way, in the thickness direction of the electronic device, the circuit board assembly does not thicken due to the configuration of the first elastic piece.

In addition, the space between a surface of the first extension portion facing the screen and the radiator is generally small. General chips or electronic components are not easy to be disposed in this region. In this case, the space is unused, which easily results in a waste of space. In this implementation, by fixing the first elastic piece with a relatively small size on the side of the first extension portion facing the display screen, on the one hand, the space of this part can be effectively utilized, to improve the internal space utilization of the electronic device, and on the other hand, compared with a case in which the first elastic piece is disposed on one side of the first board facing a rear cover, in this implementation, a space between the first board and the rear cover can save the space occupied by at least one first elastic piece. In this case, the saved space can be used for arranging more electronic components, thereby greatly improving the space utilization of the circuit board assembly.

In addition, the first portion and the elevating board are an integral board. In this case, the connection between the first portion and the elevating board is firmer. In this way, the first portion and the elevating board are not easy to fracture or crack when receiving an external force. In addition, the second portion and the second board are an integral board. In this case, the connection between the second portion and the second board is firmer. In this way, the second portion and the second board are not easy to fracture or crack when subjected to an external force.

According to a second aspect, an electronic device is provided. The electronic device may be a mobile phone, a watch, or other forms of a device capable of transmitting and receiving electromagnetic wave signals. The electronic device includes a frame, a screen, and a circuit board assembly.

The screen is mounted on one side of the frame. In an implementation, the screen includes a protective cover plate and a display screen. The protective cover plate is stacked on the display screen. The display screen is disposed close to the circuit board assembly relative to the protective cover plate. The protective cover plate may be mainly configured to protect the display screen and prevent dust.

A part of the frame forms a radiator of an antenna, or the radiator of the antenna is fixed on an inner side of the frame.

The circuit board assembly is located on the inner side of the frame. The circuit board assembly includes a first board, an elevating board, a second board, and a first conductive member. The first board and the elevating board are both located on one side of the second board away from the screen. In other words, the first board and the elevating board are disposed away from the screen relative to the second board. The first board includes a first main body portion and a first extension portion connected to the first main body portion. The elevating board includes a second main body portion and a second extension portion connected to the second main body portion. The first main body portion, the second main body portion, and the second board are sequentially stacked. In other words, the second main body portion is located between the first main body portion and the second board. The first extension portion and the second extension portion are stacked, and both the first extension portion and the second extension portion protrude relative to the second board and are disposed close to the radiator. The first conductive member is fixed to the second extension portion, and is in elastic contact with the radiator.

It should be noted that, the first conductive member may be an elastic piece having electrical conductivity or may alternatively be a spring having electrical conductivity, which is not limited in this application. In each of the solutions that can be implemented below, the first conductive member is described by taking a first elastic piece as an example.

In this implementation, by disposing the second extension portion that protrudes relative to the second board, and fixedly connecting the first elastic piece to the second extension portion, the first elastic piece is disposed away from the display screen, that is, in a thickness direction of the electronic device, a distance between the first elastic piece and the display screen becomes greater. In this way, the antenna clearance area between the first elastic piece and the display screen can be increased to a greater extent, and the performance of the antenna is better.

In addition, when the first elastic piece is disposed away from the display screen, a contact point between the first elastic piece and the radiator can also be arranged away from the display screen. In this way, the contact point (feed point) at which the first elastic piece is in contact with the radiator is less affected by the display screen.

In addition, by stacking the second extension portion on the first extension portion, and in this case, by the cooperation of the second extension portion and the first extension portion, the integral strength of this part can be improved. In this way, when the first elastic piece is in elastic contact with the radiator of the antenna, the first elastic piece receives a reaction force of the radiator. The first elastic piece transmits the reaction force to the second extension portion. In this case, with the cooperation of the first extension portion, the second extension portion can effectively counteract the force, thereby avoiding the second extension portion from being damaged or cracked due to an external force, and thus avoiding the disconnection of the circuit of the antenna.

In addition, by bringing the first elastic piece into elastic contact with the radiator, the transmission of radio frequency signals between the first elastic piece and the radiator is ensured to be more stable. Specifically, because the first elastic piece has an elastic force, the first elastic piece can always be in contact with the radiator when the first elastic piece is in elastic contact with the radiator, so that the connection stability between the first elastic piece and the radiator is better.

In a possible implementation according to the second aspect, the electronic device further includes a radio frequency path. The radio frequency path can be configured to transmit radio frequency signals to the radiator of the antenna, so that the radiator of the antenna transmits electromagnetic wave signals according to the radio frequency signals. In addition, when the radiator of the antenna converts the received electromagnetic wave signals into radio frequency signals, the radio frequency path can further be configured to receive the radio frequency signals transmitted by the radiator of the antenna. In this case, the first elastic piece is electrically connected between the radio frequency path and the radiator.

In another possible implementation, the first elastic piece is electrically connected between the radiator and a ground layer of the second extension portion.

In another possible implementation, the first elastic piece is electrically connected to the ground layer of the second extension portion through a matching circuit.

According to the second aspect, or any one of the implementations of the second aspect described above, the first elastic piece is fixed to one side of the second extension portion facing the display screen. In this case, the first elastic piece and the second board are on the same side of the elevating board. In the thickness direction of the electronic device, there is an overlapping region between the first elastic piece and the second board. The first elastic piece utilizes a space of the second board facing one side of the radiator. In this way, in the thickness direction of the electronic device, the circuit board assembly does not thicken due to the configuration of the first elastic piece.

In addition, the space between a surface of the second extension portion facing the screen and the radiator is generally small. General chips or electronic components are not easy to be disposed in this region. In this case, the space is unused, which easily results in a waste of space. In this implementation, by fixing the first elastic piece with a small size to one side of the second extension portion facing the display screen, on the one hand, the space of this part can be effectively utilized to improve the internal space utilization of the electronic device; and on the other hand, compared with a case in which the first elastic piece is disposed on one side of the first board facing the rear cover, in this implementation, a space occupied by at least one first elastic piece can be saved by a space between the first board and the rear cover, and in this case, the space saved can be used for arranging more electronic components, thereby improving the space utilization of the circuit board assembly to a greater extent.

According to the second aspect, or any one of the implementations of the second aspect described above, a distance L from the contact point between the first elastic piece and the radiator to the display screen is greater than or equal to 2 mm. For example, L equals 2 mm, 2.5 mm, 3 mm, 3.5 mm or 4 mm.

It may be understood that, when the distance L from the contact point between the first elastic piece and the radiator to the display screen is greater than or equal to 2 mm, the first elastic piece can be disposed away from the display screen to a greater extent. In this way, the antenna clearance area between the first elastic piece and the display screen can be increased to a greater extent, and the performance of the antenna is better.

According to the second aspect, or any one of the implementations of the second aspect described above, the distance L from the contact point between the first elastic piece and the radiator to the display screen is less than or equal to 4.7 mm.

It may be understood that, when the distance L from the contact point between the first elastic piece and the radiator to the display screen is less than or equal to 4.7 mm, on the one hand, it can be ensured that the first elastic piece is disposed away from the display screen; and on the other hand, it can be ensured that a thickness of the electronic device in a Z direction is not great, which is conducive to thinning configuration.

According to the second aspect, or any one of the implementations of the second aspect described above, a distance between the first elastic piece and the second board is between 0.15 mm and 30 mm.

It may be understood that, when the distance between the first elastic piece and the second board ranges from 0.15 mm to 30 mm, the size of the second extension portion located between the first elastic piece and the second board is relatively moderate. In this way, when the first elastic piece is in elastic contact with the radiator, the first elastic piece receives a reaction force of the radiator. The first elastic piece transmits the reaction force to the second extension portion. In this case, the second extension portion located between the first elastic piece and the second board is not easy to fracture or crack. In other words, the reaction force received by the second extension portion can be rapidly transmitted to the second board, thereby counteracting the reaction force by an internal stress of the second board.

According to the second aspect, or any one of the implementations of the second aspect described above, the circuit board assembly further includes a third strengthening board. The third strengthening board is located on one side of the first elastic piece and fixedly connected to a board surface of the second extension portion facing the screen.

It may be understood that, by stacking the third strengthening board on one side of the first elastic piece and on the second extension portion, a thickness of a part of the second extension portion is significantly increased, which further significantly improves the structural strength of the elevating board. In this way, when the first elastic piece is in elastic contact with the radiator, the first elastic piece receives a reaction force of the radiator of the antenna. The first elastic piece transmits the reaction force to the second extension portion of the elevating board. In this case, with the cooperation of the third strengthening board, the second extension portion can effectively counteract the force, thereby avoiding the second extension portion from being damaged or cracked due to an external force, and thus avoiding the disconnection of the circuit of the antenna.

According to the second aspect, or any one of the implementations of the second aspect described above, the third strengthening board and the second board are of an integrally formed structure. In other words, the third strengthening board and the second board are an integral board. In this case, the integral structural strength of the third strengthening board and the second board is better. In this way, the third strengthening board and the second board are not easy to fracture or crack when receiving an external force.

In another possible implementation, the third strengthening board may be connected to the second board by a soldering process, or the third strengthening board may be disposed separately from the second board.

According to the second aspect, or any one of the implementations of the second aspect described above, a distance between the first elastic piece and the third strengthening board ranges from 0.15 mm to 30 mm. In this case, the size of the second extension portion located between the first elastic piece and the third strengthening board is relatively moderate. In this way, when the first elastic piece is in elastic contact with the radiator of the antenna, the first elastic piece receives a reaction force of the radiator. The first elastic piece transmits the reaction force to the second extension portion. In this case, the second extension portion located between the first elastic piece and the third strengthening board is not easy to fracture or crack. In other words, the reaction force received by the first extension portion can be rapidly transmitted to the third strengthening board, thereby counteracting the reaction force by an internal stress of the third strengthening board.

According to the second aspect, or any one of the implementations of the second aspect described above, the circuit board assembly further includes a fourth strengthening board. The fourth strengthening board is located on one side of the first elastic piece away from the third strengthening board, and is fixedly connected to the board surface of the second extension portion facing the screen.

It may be understood that, by stacking the fourth strengthening board on one side of the first elastic piece and on the second extension portion, a thickness of a part of the second extension portion is significantly increased, which further significantly improves the structural strength of the elevating board. In this way, when the first elastic piece is in elastic contact with the radiator, the first elastic piece receives a reaction force of the radiator of the antenna. The first elastic piece transmits the reaction force to the second extension portion of the elevating board. In this case, with the cooperation of the fourth strengthening board, the second extension portion can effectively counteract the force, thereby avoiding the second extension portion from being damaged or cracked due to an external force, and thus avoiding the disconnection of the circuit of the antenna.

According to the second aspect, or any one of the implementations of the second aspect described above, the fourth strengthening board and the second board are of an integrally formed structure. In other words, the fourth strengthening board and the second board are an integral board. In this case, the integral structural strength of the fourth strengthening board and the second board is better. In this way, the fourth strengthening board and the second board are not easy to fracture or crack when receiving an external force.

In another possible implementation, the fourth strengthening board may be connected to the second board by a soldering process, or the fourth strengthening board may be disposed separately from the second board.

According to the second aspect, or any one of the implementations of the second aspect described above, a distance between the first elastic piece and the fourth strengthening board ranges from 0.15 mm to 30 mm. In this case, the size of the second extension portion located between the first elastic piece and the fourth strengthening board is relatively moderate. In this way, when the first elastic piece is in elastic contact with the radiator of the antenna, the first elastic piece receives a reaction force of the radiator. The first elastic piece transmits the reaction force to the second extension portion. In this case, the second extension portion located between the first elastic piece and the fourth strengthening board is not easy to fracture or crack. In other words, the reaction force received by the first extension portion can be rapidly transmitted to the fourth strengthening board, thereby counteracting the reaction force by an internal stress of the fourth strengthening board.

According to the second aspect, or any one of the implementations of the second aspect described above, the second extension portion is provided with a groove, the groove is located between the third strengthening board and the fourth strengthening board, an opening of the groove is located on a surface of the second extension portion facing the screen, and a part of the first elastic piece is mounted in the groove.

It may be understood that, when a part of the first elastic piece is mounted in the groove, in the thickness direction of the electronic device, there is an overlapping region between the first elastic piece and the second extension portion. In this case, the first elastic piece can be disposed further away from the display screen, that is, in the thickness direction of the electronic device, a distance between the first elastic piece and the display screen can be significantly increased. In this case, a distance from the contact point between the first elastic piece and the radiator to the display screen is significantly increased. In this way, in the thickness direction of the electronic device, the antenna clearance area between the first elastic piece and the display screen can be made larger, and the performance of the antenna is better.

In addition, when the second extension portion is provided with the first strengthening board and the second strengthening board, the first strengthening board and the second strengthening board can improve the strength of the second extension portion, thereby avoiding the second extension portion from being reduced in strength due to the opening of the groove.

According to the second aspect, or any one of the implementations of the second aspect described above, a conductive piece is disposed on a surface of the radiator facing the first elastic piece. The first elastic piece is in elastic contact with the conductive piece.

It may be understood that, when the conductive piece is disposed on the radiator, the conductive piece can improve the surface flatness of the radiator. In this way, when the first elastic piece is in elastic contact with the radiator through the conductive piece, the elastic contact between the first elastic piece and the radiator is more stable. In this way, the radio frequency signals are also more stable in the process of transmission between the radiator and the first elastic piece, thereby ensuring better antenna performance of the electronic device.

According to the second aspect, or any one of the implementations of the second aspect described above, the oxidation resistance of the conductive piece is better than that of the radiator. It may be understood that, under an environment with the same temperature and humidity, the conductive piece is not easy to be oxidized compared with the radiator. In this way, compared with a solution in which the first elastic piece directly comes into elastic contact with the radiator, a contact resistance between the first elastic piece and the conductive piece is smaller, that is, the contact resistance between the first elastic piece and the conductive piece is more stable, and the transmission loss of the radio frequency signals is smaller. In this case, the performance of the antenna of the electronic device is better.

According to the second aspect, or any one of the implementations of the second aspect described above, the electronic device includes a fastener. The radiator is provided with a blind hole. The fastener is fixed into the blind hole. The first elastic piece is in elastic contact with the fastener.

It may be understood that, compared with a solution of soldering the conductive piece on the radiator, this implementation saves the process of soldering the conductive piece on the radiator by disposing the fastener in the blind hole of the radiator, and electrically connecting the first elastic piece to the radiator of the antenna through the fastener. Therefore, on the one hand, the cost investment of the electronic device is reduced, and there is no need to further increase the input cost of the soldering process; and on the other hand, the case that the performance of the radiator in transmitting and receiving electromagnetic waves is affected by the generation of gas holes, slag inclusions, solder joints, or cracks in the soldering process in the radiator is avoided.

According to the second aspect, or any one of the implementations of the second aspect described above, the radiator has an inner side surface facing the circuit board assembly. The first elastic piece is in elastic contact with the inner side surface. In this way, the first elastic piece can be disposed away from the display screen to a greater extent. In the thickness direction of the electronic device, a distance between the first elastic piece and the display screen can be significantly increased. In this way, in the thickness direction of the electronic device, the antenna clearance area between the first elastic piece and the display screen can be made larger, and the performance of the antenna is better.

In addition, a distance from the contact point between the first elastic piece and the radiator to the display screen is significantly increased, and in this case, the signal interference of the display screen to the contact point between the first elastic piece and the radiator is less.

In addition, the radiator may not need to be provided with a protrusion to come into contact with the first elastic piece, and in this case, in the thickness direction of the electronic device, the space omitting the protrusion may also be used for the clearance area of the antenna. In this way, the clearance area of the antenna is larger, and the performance of the antenna is better.

According to the second aspect, or any one of the implementations of the second aspect described above, the first elastic piece includes a first fixed piece, an elastic member, and a second fixed piece. The elastic member is connected between the first fixed piece and the second fixed piece. It may be understood that, the elastic member may be, but is not limited to, an elastic piece or a spring. In addition, the first fixed piece may be, but is not limited to, a copper piece, an aluminum piece, or a gold piece. The second fixed piece may be, but is not limited to, a copper piece, an aluminum piece, or a gold piece.

In addition, the first fixed piece is fixedly connected to the radiator. The second fixed piece is fixedly connected to the second extension portion of the elevating board.

It may be understood that, the first elastic piece has a simple structure and is easy to assemble, which can reduce the assembly difficulty of the electronic device.

According to the second aspect, or any one of the implementations of the second aspect described above, the electronic device further includes a middle plate. The middle plate is located on the inner side of the frame. The middle plate is grounded. The frame further includes a connection segment. One end of the connection segment is connected to the radiator and the other end is connected to the middle plate.

It may be understood that, the radiator is grounded in a relatively simple manner and has a simple structure and relatively low cost investment.

According to the second aspect, or any one of the implementations of the second aspect described above, the circuit board assembly further includes a second conductive member. The second conductive member may be, but is not limited to, an elastic piece or a spring. The second conductive member is disposed on the second extension portion of the elevating board. The second conductive member is electrically connected between the ground layer of the elevating board and the radiator. In other words, the second conductive member is configured to ground the radiator.

It may be understood that, the radiator is grounded in a relatively simple manner and has a simple structure and relatively low cost investment.

According to the second aspect, or any one of the implementations of the second aspect described above, the first board is provided with a second matching circuit. The second matching circuit includes an inductor, a capacitor, a resistor, or an antenna switch. A second elastic piece is electrically connected to the second matching circuit, and is electrically connected to the ground layer of the elevating board through the second matching circuit. The second matching circuit is configured to tune the frequency bands of the antenna for receiving and transmitting electromagnetic waves and the impedance matching for the antenna. In this way, the antenna is more widely applied to transmit and receive electromagnetic waves and has better performance.

According to the second aspect, or any one of the implementations of the second aspect described above, the electronic device further includes a middle plate. The middle plate is grounded. The middle plate is located on the inner side of the frame. The circuit board assembly further includes a second conductive member and a third conductive member. The second conductive member is fixed to the second extension portion of the elevating board. The second conductive member is in elastic contact with the radiator. The third conductive member is fixed to the second board.

The third conductive member is in elastic contact with the middle plate, and is electrically connected to the second conductive member.

It may be understood that, by disposing the second conductive member on the second extension portion, disposing the third conductive member on the second conductive member, and utilizing the third conductive member for grounding, a ground path of the radiator is increased. In this case, in the ground path of the radiator, a matching circuit may be disposed on the circuit board assembly to tune the frequency bands of the antenna for receiving and transmitting electromagnetic waves, so that the frequency bands of the antenna for receiving and transmitting are wider.

According to a third aspect, an electronic device is provided. The electronic device may be a mobile phone, a watch, or other forms of a device capable of transmitting and receiving electromagnetic wave signals. The electronic device includes a frame, a screen, and a circuit board assembly.

The screen is mounted on the frame and is disposed around the frame. In an implementation, the screen includes a protective cover plate and a display screen. The protective cover plate is stacked on the display screen. The display screen is disposed close to the circuit board assembly relative to the protective cover plate. The protective cover plate may be mainly configured to protect the display screen and prevent dust.

In addition, the screen includes a first screen region and a second screen region disposed opposite to each other.

A part of the frame forms a radiator of an antenna, or the radiator of the antenna is fixed on an inner side of the frame.

The circuit board assembly is located on the inner side of the frame. The circuit board assembly includes a first conductive member, and a first board, an elevating board, and a second board sequentially stacked. In other words, the elevating board is located between the first board and the second board. The first board is disposed away from the first screen region relative to the second board. In other words, the first board is disposed away from the first screen region relative to the second board. The first board includes a first main body portion and a first extension portion connected to the first main body portion. The first main body portion is fixedly connected to the elevating board. The first extension portion protrudes relative to the elevating board and the second board, and is disposed close to the radiator. The first conductive member is fixed to the first extension portion, and is in elastic contact with the radiator.

A distance from the contact point between the first conductive member and the radiator to the first screen region is a first distance. A distance from the contact point between the first conductive member and the radiator to the second screen region is a second distance. A ratio of the first distance to the second distance ranges from 0.5 to 2.

It should be noted that, the first conductive member may be an elastic piece having electrical conductivity or may alternatively be a spring having electrical conductivity, which is not limited in this application. In each of the solutions that can be implemented below, the first conductive member is described by taking a first elastic piece as an example.

It may be understood that, when the first elastic piece is fixed to the second board, in the thickness direction of the electronic device, a distance between the first elastic piece and the first screen region is relatively small, that is, the first elastic piece is disposed close to the first screen region. In this implementation, by fixedly connecting the first elastic piece to the first extension portion, and when the ratio of the first distance to the second distance ranges from 0.5 to 2, in the thickness direction of the electronic device, the distance between the first elastic piece and the first screen region is increased to a greater extent. In this way, in the thickness direction of the electronic device, the antenna clearance area between the first elastic piece and the first screen region can be increased to a greater extent, and the performance of the antenna is also improved to a greater extent. In addition, when the ratio of the first distance to the second distance ranges from 0.5 to 2, the distance from the contact point between the first conductive member and the radiator to the second screen region is relatively moderate, and in this case, the second screen region has less influence on the performance of the antenna receiving and transmitting electromagnetic waves.

In addition, by bringing the first elastic piece into elastic contact with the radiator, the transmission of radio frequency signals between the first elastic piece and the radiator is ensured to be more stable. Specifically, because the first elastic piece has an elastic force, the first elastic piece can always be in contact with the radiator when the first elastic piece is in elastic contact with the radiator, so that the connection stability between the first elastic piece and the radiator is better.

In a possible implementation according to the third aspect, the electronic device further includes a radio frequency path. The radio frequency path can be configured to transmit radio frequency signals to the radiator of the antenna, so that the radiator of the antenna transmits electromagnetic wave signals according to the radio frequency signals. In addition, when the radiator of the antenna converts the received electromagnetic wave signals into radio frequency signals, the radio frequency path can further be configured to receive the radio frequency signals transmitted by the radiator of the antenna. In this case, the first elastic piece is electrically connected between the radio frequency path and the radiator.

In another possible implementation, the first elastic piece is electrically connected between the radiator and a ground layer of the first extension portion.

In another possible implementation, the first elastic piece is electrically connected to the ground layer of the first extension portion through a matching circuit.

According to a third aspect, or any one of the implementations of the third aspect described above, the first elastic piece is fixed to one side of the first extension portion facing the first screen region. In this case, the first elastic piece, the elevating board, and the second board are located on the same side of the first board. In the thickness direction of the electronic device, there is an overlapping region between the first elastic piece and the elevating board. The first elastic piece utilizes a space of the elevating board facing the side of the radiator. In this way, in the thickness direction of the electronic device, the circuit board assembly does not thicken due to the configuration of the first elastic piece.

In addition, the space between a surface of the first extension portion facing the first screen region and the radiator is generally small. General chips or electronic components are not easy to be disposed in this region. In this case, the space is unused, which easily results in a waste of space. In this implementation, by fixing the first elastic piece with a small size to one side of the first extension portion facing the first screen region, on the one hand, the space of this part can be effectively utilized to improve the internal space utilization of the electronic device; and on the other hand, compared with a case in which the first elastic piece is disposed on one side of the first board facing the rear cover, in this implementation, a space occupied by at least one first elastic piece can be saved by a space between the first board and the rear cover, and in this case, the space saved can be used for arranging more electronic components, thereby improving the space utilization of the circuit board assembly to a greater extent.

According to a third aspect, or any one of the implementations of the third aspect described above, a first distance from the contact point between the first elastic piece and the radiator to the first screen region is greater than or equal to 2 mm. For example, L1 equals 2 mm, 2.5 mm, 3 mm, 3.5 mm or 4 mm.

It may be understood that, when the first distance L1 from the contact point between the first elastic piece and the radiator to the first screen region is greater than or equal to 2 mm, the first elastic piece can be disposed away from the first screen region to a greater extent. In this case, in the thickness direction of the electronic device, the antenna clearance area between the first elastic piece and the first screen region can be increased to a greater extent, and the performance of the antenna is also better.

In addition, the first distance L1 from the contact point between the first elastic piece and the radiator to the first screen region is less than or equal to 4.7 mm.

It may be understood that, when the first distance L1 from the contact point between the first elastic piece and the radiator to the first screen region is less than or equal to 4.7 mm, on the one hand, it can be ensured that the first elastic piece is disposed away from the first screen region; and on the other hand, it can be ensured that a thickness of the electronic device is not great, which is conducive to the thinning configuration of the electronic device.

According to a third aspect, or any one of the implementations of the third aspect described above, a distance between the first elastic piece and the elevating board is between 0.15 mm and 30 mm.

It may be understood that, when the distance between the first elastic piece and the elevating board ranges from 0.15 mm to 30 mm, the size of the first extension portion located between the first elastic piece and the elevating board is relatively moderate. In this way, when the first elastic piece is in elastic contact with the radiator, the first elastic piece receives a reaction force of the radiator. The first elastic piece transmits the reaction force to the first extension portion. In this case, the first extension portion located between the first elastic piece and the elevating board is not easy to fracture or crack. In other words, the reaction force received by the first extension portion can be rapidly transmitted to the elevating board, thereby counteracting the reaction force with an internal stress of the elevating board.

According to a third aspect, or any one of the implementations of the third aspect described above, the circuit board assembly further includes a first strengthening board. The first strengthening board is located on one side of the first elastic piece and fixedly connected to a board surface of the first extension portion facing the first screen region.

It may be understood that, by stacking the first strengthening board on one side of the first elastic piece and on the first extension portion, a thickness of a part of the first extension portion is significantly increased, which further significantly improves the structural strength of the first board. In this way, when the first elastic piece is in elastic contact with the radiator, the first elastic piece receives a reaction force of the radiator of the antenna. The first elastic piece transmits the reaction force to the first extension portion of the first board. In this case, with the cooperation of the first strengthening board, the first extension portion can effectively counteract the force, thereby avoiding the first extension portion from being damaged or cracked due to an external force, and thus avoiding the disconnection of the circuit of the antenna.

According to a third aspect, or any one of the implementations of the third aspect described above, the first strengthening board includes a first portion and a second portion connected to the first portion. The first portion is fixedly connected to the board surface of the first extension portion facing the first screen region, and the first portion is fixedly connected to the elevating board. The second portion is fixedly connected to the second board. In the thickness direction of the electronic device, a thickness of the first strengthening board is greater than a thickness of the elevating board.

It may be understood that, the first portion and the second portion are sequentially stacked on the first extension portion, the first portion is fixedly connected to the elevating board, and the second portion is fixedly connected to the second board, thereby significantly improving the structural strength of the first board. In this way, when the first elastic piece is in elastic contact with the radiator of the antenna, the first elastic piece receives a reaction force of the radiator of the antenna. The first elastic piece transmits the reaction force to the first extension portion of the first board. In this case, with the cooperation of the first strengthening board, the elevating board, and the second board, the first extension portion can effectively counteract the force, thereby avoiding the first extension portion from being damaged or cracked due to an external force, and thus avoiding the disconnection of the circuit of the antenna.

In another possible implementation, the first strengthening board is fixedly connected to the elevating board. In a thickness direction of the electronic device, a thickness of the first strengthening board is less than or equal to a thickness of the elevating board.

It may be understood that, the first strengthening board is stacked on the first extension portion, and the first strengthening board is fixedly connected to the elevating board, thereby significantly improving the structural strength of the first board. In this way, when the first elastic piece is in elastic contact with the radiator of the antenna, the first elastic piece receives a reaction force of the radiator of the antenna. The first elastic piece transmits the reaction force to the first extension portion of the first board. In this case, with the cooperation of the first strengthening board and the elevating board, the first extension portion can effectively counteract the force, thereby avoiding the first extension portion from being damaged or cracked due to an external force.

According to a third aspect, or any one of the implementations of the third aspect described above, the first portion and the elevating board are of an integrally formed structure, and the second portion and the second board are of an integrally formed structure. In other words, the first portion and the elevating board are an integral board. In this case, the connection between the first portion and the elevating board is firmer. In this way, the first portion and the elevating board are not easy to fracture or crack when receiving an external force. In addition, the second portion and the second board are an integral board. In this case, the connection between the second portion and the second board is firmer. In this way, the second portion and the second board are not easy to fracture or crack when subjected to an external force.

In another possible implementation, the first portion can alternatively be fixedly connected to the elevating board by a soldering process. the second portion can alternatively be fixedly connected to the second board by a soldering process.

According to a third aspect, or any one of the implementations of the third aspect described above, the first portion is provided with a first strengthening solder pad. The first extension portion is provided with a second strengthening solder pad. The first strengthening solder pad is soldered to the second strengthening solder pad.

It may be understood that, when the first portion and the first extension portion are soldered together through the first strengthening solder pad and the second strengthening solder pad, the connection between the first portion and the first extension portion is firmer, and the integral strength of the circuit board assembly is better. In addition, after the first strengthening solder pad and the second strengthening solder pad are soldered together, the first strengthening solder pad and the second strengthening solder pad can effectively protect a solder pad (the solder pad of this part is mainly configured for the electrical connection between wiring of the first board and wiring of the elevating board) between the first main body portion of the first board and the elevating board. That is, the solder pad between the first main body portion and the elevating board is avoided from easily breaking due to an external force.

According to a third aspect, or any one of the implementations of the third aspect described above, a distance between the first elastic piece and the first portion ranges from 0.15 mm to 30 mm. In this case, the size of the first extension portion located between the first elastic piece and the first portion is relatively moderate. In this way, when the first elastic piece is in elastic contact with the radiator of the antenna, the first elastic piece receives a reaction force of the radiator. The first elastic piece transmits the reaction force to the first extension portion. In this case, the first extension portion located between the first elastic piece and the first portion is not easy to fracture or crack. In other words, the reaction force received by the first extension portion can be rapidly transmitted to the first portion, thereby counteracting the reaction force by an internal stress of the first portion.

According to a third aspect, or any one of the implementations of the third aspect described above, the circuit board assembly further includes a second strengthening board. The second strengthening board is located on one side of the first elastic piece away from the first strengthening board, and is fixedly connected to the board surface of the first extension portion facing the first screen region.

It may be understood that, by stacking the first strengthening board on one side of the first elastic piece and on the first extension portion, and stacking the second strengthening board on the other side of the first elastic piece and on the first extension portion, a thickness of a part of the first extension portion is significantly increased, which further significantly improves the structural strength of the first board. In this way, when the first elastic piece is in elastic contact with the radiator, the first elastic piece receives a reaction force of the radiator of the antenna. The first elastic piece transmits the reaction force to the first extension portion of the first board. In this case, with the cooperation of the first strengthening board and the second strengthening board, the first extension portion can effectively counteract the force, thereby avoiding the first extension portion from being damaged or cracked due to an external force, and thus avoiding the disconnection of the circuit of the antenna.

According to a third aspect, or any one of the implementations of the third aspect described above, the second strengthening board includes a third portion and a fourth portion connected to the third portion. The third portion is fixedly connected to the board surface of the first extension portion facing the first screen region, and the third portion is fixedly connected to the elevating board. The fourth portion is fixedly connected to the second board. In the thickness direction of the electronic device, a thickness of the second strengthening board is greater than a thickness of the elevating board.

It may be understood that, the third portion and the fourth portion connected to the third portion are sequentially stacked on the first extension portion, the third portion is fixedly connected to the elevating board, and the fourth portion is fixedly connected to the second board, thereby significantly improving the structural strength of the first board. In this way, when the first elastic piece is in elastic contact with the radiator of the antenna, the first elastic piece receives a reaction force of the radiator of the antenna. The first elastic piece transmits the reaction force to the first extension portion of the first board. In this case, with the cooperation of the first strengthening board, the second strengthening board, the elevating board, and the second board, the first extension portion can effectively counteract the force, thereby avoiding the first extension portion from being damaged or cracked due to an external force, and thus avoiding the disconnection of the circuit of the antenna.

In another possible implementation, the second strengthening board is fixedly connected to the elevating board. In a thickness direction of the electronic device, a thickness of the second strengthening board is less than or equal to a thickness of the elevating board.

According to a third aspect, or any one of the implementations of the third aspect described above, the third portion and the elevating board are of an integrally formed structure. The fourth portion and the second board are of an integrally formed structure. In other words, the third portion and the elevating board are an integral board. In this case, the connection between the third portion and the elevating board is firmer. In this way, the third portion and the elevating board are not easy to fracture or crack when receiving an external force. In addition, the fourth portion and the second board are an integral board. In this case, the connection between the fourth portion and the second board is firmer. In this way, the fourth portion and the second board are not easy to fracture or crack when receiving an external force.

In another possible implementation, the third portion can alternatively be fixedly connected to the elevating board by a soldering process. The fourth portion can alternatively be fixedly connected to the second board by a soldering process.

According to a third aspect, or any one of the implementations of the third aspect described above, a distance $d_3$ between the first elastic piece and the third portion ranges from 0.15 mm to 30 mm.

In this case, the size of the first extension portion located between the first elastic piece and the third portion is relatively moderate. In this way, when the first elastic piece is in elastic contact with the radiator of the antenna, the first elastic piece receives a reaction force of the radiator. The first elastic piece transmits the reaction force to the first extension portion. In this case, the first extension portion located between the first elastic piece and the third portion is not easy to fracture or crack. In other words, the reaction force received by the first extension portion can be rapidly transmitted to the third portion, thereby counteracting the reaction force by an internal stress of the third portion.

According to a third aspect, or any one of the implementations of the third aspect described above, a conductive piece is disposed on a surface of the radiator facing the first elastic piece. The first elastic piece is in elastic contact with the conductive piece.

It may be understood that, when the conductive piece is disposed on the radiator, the conductive piece can improve the surface flatness of the radiator. In this way, when the first elastic piece is in elastic contact with the radiator through the conductive piece, the elastic contact between the first elastic piece and the radiator is more stable. In this way, the radio frequency signals are also more stable in the process of transmission between the radiator and the first elastic piece, thereby ensuring better antenna performance of the electronic device.

According to a third aspect, or any one of the implementations of the third aspect described above, the oxidation resistance of the conductive piece is better than that of the radiator. It may be understood that, under an environment with the same temperature and humidity, the conductive piece is not easy to be oxidized compared with the radiator. In this way, compared with a solution in which the first elastic piece directly comes into elastic contact with the radiator, a contact resistance between the first elastic piece and the conductive piece is smaller, that is, the contact resistance between the first elastic piece and the conductive piece is more stable, and the transmission loss of the radio frequency signals is smaller. In this case, the performance of the antenna of the electronic device is better.

According to a third aspect, or any one of the implementations of the third aspect described above, the electronic device includes a fastener. The radiator is provided with a blind hole. The fastener is fixed into the blind hole. The first elastic piece is in elastic contact with the fastener.

It may be understood that, compared with a solution of soldering the conductive piece on the radiator, this implementation saves the process of soldering the conductive piece on the radiator by disposing the fastener in the blind hole of the radiator, and electrically connecting the first elastic piece to the radiator of the antenna through the fastener. Therefore, on the one hand, the cost investment of the electronic device is reduced, and there is no need to further increase the input cost of the soldering process; and on the other hand, the case that the performance of the radiator in transmitting and receiving electromagnetic waves is affected by the generation of gas holes, slag inclusions, solder joints, or cracks in the soldering process in the radiator is avoided.

According to a third aspect, or any one of the implementations of the third aspect described above, the radiator has an inner side surface facing the circuit board assembly. The first elastic piece is in elastic contact with the inner side surface. In this way, the radiator may not need to be provided with a protrusion to come into contact with the first elastic piece, and in this case, in the thickness direction of the electronic device, the space omitting the protrusion may also be used for the clearance area of the antenna. In this way, the clearance area of the antenna is larger, and the performance of the antenna is better.

According to a third aspect, or any one of the implementations of the third aspect described above, the first elastic piece includes a first fixed piece, an elastic member, and a second fixed piece. The elastic member is connected between the first fixed piece and the second fixed piece. It may be understood that, the elastic member may be, but is not limited to, an elastic piece or a spring. In addition, the first fixed piece may be, but is not limited to, a copper piece, an aluminum piece, or a gold piece. The second fixed piece may be, but is not limited to, a copper piece, an aluminum piece, or a gold piece.

In addition, the first fixed piece is fixedly connected to the radiator. The second fixed piece is fixedly connected to the first extension portion of the first board.

It may be understood that, the first elastic piece has a simple structure and is easy to assemble, which can reduce the assembly difficulty of the electronic device.

According to a third aspect, or any one of the implementations of the third aspect described above, the electronic device further includes a middle plate. The middle plate is located on the inner side of the frame. The middle plate is grounded. The frame further includes a connection segment. One end of the connection segment is connected to the radiator and the other end is connected to the middle plate.

It may be understood that, the radiator is grounded in a relatively simple manner and has a simple structure and relatively low cost investment.

According to a third aspect, or any one of the implementations of the third aspect described above, the circuit board assembly further includes a second conductive member. The second conductive member may be, but is not limited to, an elastic piece or a spring. The second conductive member is disposed on the first extension portion of the first board. The second conductive member is electrically connected between the ground layer of the first board and the radiator. In other words, the second conductive member is configured to ground the radiator.

It may be understood that, the radiator is grounded in a relatively simple manner and has a simple structure and relatively low cost investment.

According to a third aspect, or any one of the implementations of the third aspect described above, the first board is provided with a second matching circuit. The second matching circuit includes an inductor, a capacitor, a resistor, or an antenna switch. A second elastic piece is electrically connected to the second matching circuit and is electrically connected to the ground layer of the first board through the second matching circuit. The second matching circuit is configured to tune the frequency bands of the antenna for receiving and transmitting electromagnetic waves and the impedance matching for the antenna. In this way, the antenna is more widely applied to transmit and receive electromagnetic waves and has better performance.

According to a third aspect, or any one of the implementations of the third aspect described above, the electronic device further includes a middle plate. The middle plate is grounded. The middle plate is located on the inner side of the frame. The circuit board assembly further includes a second conductive member and a third conductive member. The second conductive member is fixed to the first extension portion of the first board. The second conductive member is in elastic contact with the radiator. The third conductive member is fixed to the second board. The third conductive member is in elastic contact with the middle plate, and is electrically connected to the second conductive member.

It may be understood that, by disposing the second conductive member on the first extension portion, disposing the third conductive member on the second conductive member, and utilizing the third conductive member for grounding, a ground path of the radiator is increased. In this case, in the ground path of the radiator, a matching circuit may be disposed on the circuit board assembly to tune the frequency bands of the antenna for receiving and transmitting electromagnetic waves, so that the frequency bands of the antenna for receiving and transmitting are wider.

According to a fourth aspect, an electronic device is provided. The electronic device may be a mobile phone, a watch, or other forms of a device capable of transmitting and receiving electromagnetic wave signals. The electronic device includes a frame, a screen, and a circuit board assembly.

The screen is mounted on the frame and is disposed around the frame. In an implementation, the screen includes a protective cover plate and a display screen. The protective cover plate is stacked on the display screen. The display screen is disposed close to the circuit board assembly relative to the protective cover plate. The protective cover plate may be mainly configured to protect the display screen and prevent dust.

In addition, the screen includes a first screen region and a second screen region disposed opposite to each other.

A part of the frame forms a radiator of an antenna, or the radiator of the antenna is fixed on an inner side of the frame.

The circuit board assembly is located on the inner side of the frame. The circuit board assembly includes a first board, an elevating board, a second board, and a first conductive member. The first board and the elevating board are both located on one side of the second board away from the first screen region. In other words, the first board and the elevating board are disposed away from the first screen region relative to the second board. The first board includes a first main body portion and a first extension portion connected to the first main body portion. The elevating board includes a second main body portion and a second extension portion connected to the second main body portion. The first main body portion, the second main body portion, and the second board are sequentially stacked. In other words, the second main body portion is located between the first main body portion and the second board. The first extension portion and the second extension portion are stacked, and both the first extension portion and the second extension portion protrude relative to the second board and are disposed close to the radiator. The first conductive member is fixed to the second extension portion, and is in elastic contact with the radiator.

A distance from the contact point between the first conductive member and the radiator to the first screen region is a first distance. A distance from the contact point between the first conductive member and the radiator to the second screen region is a second distance. A ratio of the first distance to the second distance ranges from 0.5 to 2.

It should be noted that, the first conductive member may be an elastic piece having electrical conductivity or may alternatively be a spring having electrical conductivity, which is not limited in this application. In each of the solutions that can be implemented below, the first conductive member is described by taking a first elastic piece as an example.

It may be understood that, when the first elastic piece is fixed to the second board, in the thickness direction of the electronic device, a distance between the first elastic piece and the first screen region is relatively small, that is, the first elastic piece is disposed close to the first screen region. In this implementation, by fixedly connecting the first elastic piece to the second extension portion, and when the ratio of the first distance to the second distance ranges from 0.5 to 2, in the thickness direction of the electronic device, the distance between the first elastic piece and the first screen region is increased to a greater extent. In this way, in the thickness direction of the electronic device, the antenna clearance area between the first elastic piece and the first screen region can be increased to a greater extent, and the performance of the antenna is also improved to a greater extent. In addition, when the ratio of the first distance to the second distance ranges from 0.5 to 2, the distance from the contact point between the first conductive member and the radiator to the second screen region is relatively moderate, and in this case, the second screen region has less influence on the performance of the antenna receiving and transmitting electromagnetic waves.

In addition, by bringing the first elastic piece into elastic contact with the radiator, the transmission of radio frequency signals between the first elastic piece and the radiator is ensured to be more stable. Specifically, because the first elastic piece has an elastic force, the first elastic piece can always be in contact with the radiator when the first elastic piece is in elastic contact with the radiator, so that the connection stability between the first elastic piece and the radiator is better.

In a possible implementation according to the fourth aspect, the electronic device further includes a radio frequency path. The radio frequency path can be configured to transmit radio frequency signals to the radiator of the antenna, so that the radiator of the antenna transmits electromagnetic wave signals according to the radio frequency signals. In addition, when the radiator of the antenna converts the received electromagnetic wave signals into radio frequency signals, the radio frequency path can further be configured to receive the radio frequency signals transmitted by the radiator of the antenna. In this case, the first elastic piece is electrically connected between the radio frequency path and the radiator.

In another possible implementation, the first elastic piece is electrically connected between the radiator and a ground layer of the second extension portion.

In another possible implementation, the first elastic piece is electrically connected to the ground layer of the second extension portion through a matching circuit.

According to the fourth aspect, or any implementation of the fourth aspect described above, the first elastic piece is fixed to one side of the second extension portion facing the first screen region. In this case, the first elastic piece and the second board are on the same side of the elevating board. In the thickness direction of the electronic device, there is an overlapping region between the first elastic piece and the second board. The first elastic piece utilizes a space of the second board facing one side of the radiator. In this way, in the thickness direction of the electronic device, the circuit board assembly does not thicken due to the configuration of the first elastic piece.

In addition, a space between a surface of the second extension portion facing the first screen region and the radiator is generally small. General chips or electronic components are not easy to be disposed in this region. In this case, the space is unused, which easily results in a waste of space. In this implementation, the first elastic piece with a relatively small size is fixed on the side of the second extension portion facing the first screen region. On the one hand, the space of this part can be effectively utilized, to improve the internal space utilization of the electronic device. On the other hand, compared with a case in which the first elastic piece is disposed on one side of the first board facing a rear cover, in this implementation, a space between the first board and the rear cover can save the space occupied by at least one first elastic piece. In this case, the saved space can be used for arranging more electronic components, thereby greatly improving the space utilization of the circuit board assembly.

According to the fourth aspect, or any implementation of the fourth aspect described above, a distance L from a contact point between the first elastic piece and the radiator to the first screen region is greater than or equal to 2 mm. For example, L equals 2 mm, 2.5 mm, 3 mm, 3.5 mm or 4 mm.

It may be understood that, when the distance L from the contact point between the first elastic piece and the radiator to the first screen region is greater than or equal to 2 mm, the first elastic piece can be disposed away from the first screen region to a greater extent. In this way, an antenna clearance area between the first elastic piece and the first screen region can be greatly increased, and the performance of the antenna is also better.

According to the fourth aspect, or any implementation of the fourth aspect described above, the distance L from the contact point between the first elastic piece and the radiator to the first screen region is less than or equal to 4.7 mm.

It may be understood that, when the distance L from the contact point between the first elastic piece and the radiator to the first screen region is less than or equal to 4.7 mm, on the one hand, it can be ensured that the first elastic piece is disposed away from the first screen region; and on the other hand, it can be ensured that a thickness of the electronic device in a Z direction is not great, which is conducive to thinning configuration.

According to the fourth aspect, or any implementation of the fourth aspect described above, a distance between the first elastic piece and the second board is between 0.15 mm and 30 mm.

It may be understood that, when the distance between the first elastic piece and the second board ranges from 0.15 mm to 30 mm, the size of the second extension portion located between the first elastic piece and the second board is relatively moderate. In this way, when the first elastic piece is in elastic contact with the radiator, the first elastic piece receives a reaction force of the radiator. The first elastic piece transmits the reaction force to the second extension portion. In this case, the second extension portion located between the first elastic piece and the second board is not easy to fracture or crack. In other words, the reaction force received by the second extension portion can be rapidly transmitted to the second board, thereby counteracting the reaction force by an internal stress of the second board.

According to the fourth aspect, or any implementation of the fourth aspect described above, the circuit board assembly further includes a third strengthening board. The third strengthening board is located on one side of the first elastic piece, and is fixedly connected to a board surface of the second extension portion facing the first screen region.

It may be understood that, by stacking the third strengthening board on one side of the first elastic piece and on the second extension portion, a thickness of a part of the second extension portion is significantly increased, which further significantly improves the structural strength of the elevating board. In this way, when the first elastic piece is in elastic contact with the radiator, the first elastic piece receives a reaction force of the radiator of the antenna. The first elastic piece transmits the reaction force to the second extension portion of the elevating board. In this case, with the cooperation of the third strengthening board, the second extension portion can effectively counteract the force, thereby avoiding the second extension portion from being damaged or cracked due to an external force, and thus avoiding the disconnection of the circuit of the antenna.

According to the fourth aspect, or any implementation of the fourth aspect described above, the third strengthening board and the second board are of an integrally formed structure. In other words, the third strengthening board and the second board are an integral board. In this case, the integral structural strength of the third strengthening board and the second board is better. In this way, the third strengthening board and the second board are not easy to fracture or crack when receiving an external force.

In another possible implementation, the third strengthening board may be connected to the second board by a soldering process, or the third strengthening board may be disposed separately from the second board.

According to the fourth aspect, or any implementation of the fourth aspect described above, a distance between the first elastic piece and the third strengthening board ranges from 0.15 mm to 30 mm. In this case, the size of the second extension portion located between the first elastic piece and the third strengthening board is relatively moderate. In this way, when the first elastic piece is in elastic contact with the radiator of the antenna, the first elastic piece receives a reaction force of the radiator. The first elastic piece transmits the reaction force to the second extension portion. In this case, the second extension portion located between the first elastic piece and the third strengthening board is not easy to fracture or crack. In other words, the reaction force received by the first extension portion can be rapidly transmitted to the third strengthening board, thereby counteracting the reaction force by an internal stress of the third strengthening board.

According to the fourth aspect, or any implementation of the fourth aspect described above, the circuit board assembly further includes a fourth strengthening board. The fourth strengthening board is located on one side of the first elastic piece away from the third strengthening board, and is fixedly connected to the board surface of the second extension portion facing the first flat screen region.

It may be understood that, by stacking the fourth strengthening board on one side of the first elastic piece and on the second extension portion, a thickness of a part of the second extension portion is significantly increased, which further significantly improves the structural strength of the elevating board. In this way, when the first elastic piece is in elastic contact with the radiator, the first elastic piece receives a reaction force of the radiator of the antenna. The first elastic piece transmits the reaction force to the second extension portion of the elevating board. In this case, with the cooperation of the fourth strengthening board, the second extension portion can effectively counteract the force, thereby avoiding the second extension portion from being damaged or cracked due to an external force, and thus avoiding the disconnection of the circuit of the antenna.

According to the fourth aspect, or any implementation of the fourth aspect described above, the fourth strengthening board and the second board are of an integrally formed structure. In other words, the fourth strengthening board and the second board are an integral board. In this case, the integral structural strength of the fourth strengthening board and the second board is better. In this way, the fourth strengthening board and the second board are not easy to fracture or crack when receiving an external force.

In another possible implementation, the fourth strengthening board may be connected to the second board by a soldering process, or the fourth strengthening board may be disposed separately from the second board.

According to the fourth aspect, or any implementation of the fourth aspect described above, a distance between the first elastic piece and the fourth strengthening board ranges from 0.15 mm to 30 mm. In this case, the size of the second extension portion located between the first elastic piece and the fourth strengthening board is relatively moderate. In this way, when the first elastic piece is in elastic contact with the radiator of the antenna, the first elastic piece receives a reaction force of the radiator. The first elastic piece transmits the reaction force to the second extension portion. In this case, the second extension portion located between the first elastic piece and the fourth strengthening board is not easy to fracture or crack. In other words, a reaction force received by the second extension portion can be quickly transmitted to the fourth strengthening board. Therefore, the reaction force is counteracted by an internal stress of the fourth strengthening board.

According to the fourth aspect, or any implementation of the fourth aspect described above, a surface of the radiator facing the first elastic piece is provided with a conductive piece. The first elastic piece is in elastic contact with the conductive piece.

It may be understood that, when the conductive piece is disposed on the radiator, the conductive piece can improve the surface flatness of the radiator. In this way, when the first elastic piece is in elastic contact with the radiator through the conductive piece, the elastic contact between the first elastic piece and the radiator is more stable. In this way, the radio frequency signals are also more stable in the process of transmission between the radiator and the first elastic piece, thereby ensuring better antenna performance of the electronic device.

According to the fourth aspect, or any implementation of the fourth aspect described above, the oxidation resistance of the conductive piece is higher than that of the radiator. It may be understood that, under an environment with the same temperature and humidity, the conductive piece is not easy to be oxidized compared with the radiator. In this way, compared with a solution in which the first elastic piece directly comes into elastic contact with the radiator, a contact resistance between the first elastic piece and the conductive piece is smaller, that is, the contact resistance between the first elastic piece and the conductive piece is more stable, and the transmission loss of the radio frequency signals is smaller. In this case, the performance of the antenna of the electronic device is better.

According to the fourth aspect, or any implementation of the fourth aspect described above, the electronic device includes a fastener. The radiator is provided with a blind hole. The fastener is fixed into the blind hole. The first elastic piece is in elastic contact with the fastener.

It may be understood that, compared with a solution of soldering the conductive piece on the radiator, this implementation saves the process of soldering the conductive piece on the radiator by disposing the fastener in the blind hole of the radiator, and electrically connecting the first elastic piece to the radiator of the antenna through the fastener. Therefore, on the one hand, the cost investment of the electronic device is reduced, and there is no need to further increase the input cost of the soldering process; and on the other hand, the case that the performance of the radiator in transmitting and receiving electromagnetic waves is affected by the generation of gas holes, slag inclusions, solder joints, or cracks in the soldering process in the radiator is avoided.

According to the fourth aspect, or any implementation of the fourth aspect described above, the radiator includes an inner side surface facing the circuit board assembly. The first elastic piece is in elastic contact with the inner side surface. In this way, the radiator may not need to be provided with a protrusion to come into contact with the first elastic piece, and in this case, in the thickness direction of the electronic device, the space omitting the protrusion may also be used for the clearance area of the antenna. In this way, the clearance area of the antenna is larger, and the performance of the antenna is better.

According to the fourth aspect, or any implementation of the fourth aspect described above, the first elastic piece includes a first fixed piece, an elastic member, and a second fixed piece. The elastic member is connected between the first fixed piece and the second fixed piece. It may be understood that, the elastic member may be, but is not limited to, an elastic piece or a spring. In addition, the first fixed piece may be, but is not limited to, a copper piece, an aluminum piece, or a gold piece. The second fixed piece may be, but is not limited to, a copper piece, an aluminum piece, or a gold piece.

In addition, the first fixed piece is fixedly connected to the radiator. The second fixed piece is fixedly connected to the second extension portion of the elevating board.

It may be understood that, the first elastic piece has a simple structure and is easy to assemble, which can reduce the assembly difficulty of the electronic device.

According to the fourth aspect, or any implementation of the fourth aspect described above, the electronic device further includes a middle plate. The middle plate is located on the inner side of the frame. The middle plate is grounded. The frame further includes a connection segment. One end of the connection segment is connected to the radiator and the other end is connected to the middle plate.

It may be understood that, the radiator is grounded in a relatively simple manner and has a simple structure and relatively low cost investment.

According to the fourth aspect, or any implementation of the fourth aspect described above, the circuit board assembly further includes a second conductive member. The second conductive member may be, but is not limited to, an elastic piece or a spring. The second conductive member is disposed on the second extension portion of the elevating board. The second conductive member is electrically connected between the ground layer of the elevating board and the radiator. In other words, the second conductive member is configured to ground the radiator.

It may be understood that, the radiator is grounded in a relatively simple manner and has a simple structure and relatively low cost investment.

According to the fourth aspect, or any implementation of the fourth aspect described above, the first board is provided with a second matching circuit. The second matching circuit includes an inductor, a capacitor, a resistor, or an antenna switch. A second elastic piece is electrically connected to the second matching circuit, and is electrically connected to the ground layer of the elevating board through the second matching circuit. The second matching circuit is configured to tune the frequency bands of the antenna for receiving and transmitting electromagnetic waves and the impedance matching for the antenna. In this way, the antenna is more widely applied to transmit and receive electromagnetic waves and has better performance.

According to the fourth aspect, or any implementation of the fourth aspect described above, the electronic device further includes a middle plate. The middle plate is grounded. The middle plate is located on the inner side of the frame. The circuit board assembly further includes a second conductive member and a third conductive member. The second conductive member is fixed to the second extension portion of the elevating board. The second conductive member is in elastic contact with the radiator. The third conductive member is fixed to the second board. The third conductive member is in elastic contact with the middle plate, and is electrically connected to the second conductive member.

It may be understood that, by disposing the second conductive member on the second extension portion, disposing the third conductive member on the second conductive member, and utilizing the third conductive member for grounding, a ground path of the radiator is increased. In this case, in the ground path of the radiator, a matching circuit may be disposed on the circuit board assembly to tune the frequency bands of the antenna for receiving and transmitting electromagnetic waves, so that the frequency bands of the antenna for receiving and transmitting are wider.

In a fifth aspect, an antenna apparatus is provided. The antenna apparatus can transmit and receive electromagnetic wave signals. The antenna apparatus includes a radiator and a circuit board assembly.

The circuit board assembly is located on the inner side of the frame. The circuit board assembly includes a first conductive member, and a first board, an elevating board, and a second board sequentially stacked. In other words, the elevating board is located between the first board and the second board. The first board includes a first main body portion and a first extension portion connected to the first main body portion. The first main body portion is fixedly connected to the elevating board. The first extension portion protrudes relative to the elevating board and the second board, and is disposed close to the radiator. The first conductive member is fixed to the first extension portion, and the first conductive member, the elevating board, and the second board are located on the same side of the first board. The first conductive member is in elastic contact with the radiator.

It should be noted that, the first conductive member may be an elastic piece having electrical conductivity or may alternatively be a spring having electrical conductivity, which is not limited in this application. In each of the solutions that can be implemented below, the first conductive member is described by taking a first elastic piece as an example.

In this implementation, by disposing the first extension portion that protrudes relative to the elevating board and the second board, and fixedly connecting the first elastic piece to the first extension portion, and the first elastic piece, the elevating board, and the second board are located on the same side of the first board, in a thickness direction of the circuit board assembly, there is an overlapping region between the first elastic piece and the elevating board. The first elastic piece utilizes a space of the elevating board facing the side of the radiator. In this way, in a thickness direction of the antenna apparatus, the circuit board assembly is not thickened due to the configuration of the first elastic piece.

In addition, compared with a solution of fixing the first elastic piece on the second board, in this implementation, by fixing the first elastic piece on the first extension portion, there are no longer any antenna-related components or wiring (for example, antenna switches, inductances, capacitors, or resistors) disposed on the elevating board and the second board. In this way, on the one hand, the structure of the circuit board assembly is simpler, that is, the assembly difficulty of the circuit board assembly is reduced, and the cost investment of the circuit board assembly is lower; and on the other hand, more space can be freed up on the second board to arrange more electronic components.

In addition, by bringing the first elastic piece into elastic contact with the radiator, the transmission of radio frequency signals between the first elastic piece and the radiator is ensured to be more stable. Specifically, because the first elastic piece has an elastic force, the first elastic piece can always be in contact with the radiator when the first elastic piece is in elastic contact with the radiator, so that the connection stability between the first elastic piece and the radiator is better.

In addition, a space between the radiator and a surface of the first extension portion facing the radiator is generally small. General chips or electronic components are not easy to be disposed in this region. In this case, the space is unused, which easily results in a waste of space. In this implementation, by fixing the first elastic piece with a relatively small size on one side of the first extension portion facing the radiator, the space of this part can be effectively utilized, to improve the internal space utilization of the antenna apparatus.

In addition, by sequentially stacking the first board, the elevating board, and the second board, the board area of the circuit board assembly can be significantly increased, thereby increasing the number of electronic components arranged on the circuit board assembly. Specifically, when the first board and the second board are elevated by the elevating board, on the circuit board assembly, electronic components (for example, a CPU, a battery management chip, or the like) not only can be arranged on a surface of the first board facing away from the second board and a surface of the second board facing away from the first board, but also can be arranged in a space between the first board and the second board (on a surface of the first board facing the second board and a surface of the second board facing the first board). In other words, on the circuit board assembly of this implementation, more electronic components can be arranged.

In a possible implementation according to the fifth aspect, the antenna apparatus further includes a radio frequency path. The radio frequency path can be configured to transmit radio frequency signals to the radiator of the antenna, so that the radiator of the antenna transmits electromagnetic wave signals according to the radio frequency signals. In addition, when the radiator of the antenna converts the received electromagnetic wave signals into radio frequency signals, the radio frequency path can further be configured to receive the radio frequency signals transmitted by the radiator of the antenna. In this case, the first elastic piece is electrically connected between the radio frequency path and the radiator.

In another possible implementation, the first elastic piece is electrically connected between the radiator and a ground layer of the first extension portion.

In another possible implementation, the first elastic piece is electrically connected to the ground layer of the first extension portion through a matching circuit.

According to the fifth aspect, or any implementation of the fifth aspect described above, a distance between the first elastic piece and the elevating board is between 0.15 mm and 30 mm.

It may be understood that, when the distance between the first elastic piece and the elevating board ranges from 0.15 mm to 30 mm, the size of the first extension portion located between the first elastic piece and the elevating board is relatively moderate. In this way, when the first elastic piece is in elastic contact with the radiator, the first elastic piece receives a reaction force of the radiator. The first elastic piece transmits the reaction force to the first extension portion. In this case, the first extension portion located between the first elastic piece and the elevating board is not easy to fracture or crack. In other words, the reaction force received by the first extension portion can be rapidly transmitted to the elevating board, thereby counteracting the reaction force with an internal stress of the elevating board.

According to the fifth aspect, or any implementation of the fifth aspect described above, the circuit board assembly further includes a first strengthening board. The first strengthening board is located on one side of the first elastic piece, and is fixedly connected to a board surface of the first extension portion facing the second board.

It may be understood that, by stacking the first strengthening board on one side of the first elastic piece and on the first extension portion, a thickness of a part of the first extension portion is significantly increased, which further significantly improves the structural strength of the first board. In this way, when the first elastic piece is in elastic contact with the radiator, the first elastic piece receives a reaction force of the radiator of the antenna. The first elastic piece transmits the reaction force to the first extension portion of the first board. In this case, with the cooperation of the first strengthening board, the first extension portion can effectively counteract the force, thereby avoiding the first extension portion from being damaged or cracked due to an external force, and thus avoiding the disconnection of the circuit of the antenna.

According to the fifth aspect, or any implementation of the fifth aspect described above, the first strengthening board includes a first portion and a second portion connected to the first portion. The first portion is fixedly connected to the board surface of the first extension portion facing the second board, and the first portion is fixedly connected to the elevating board. The second portion is fixedly connected to the second board. In a thickness direction of the antenna apparatus, a thickness of the first strengthening board is greater than a thickness of the elevating board.

It may be understood that, the first portion and the second portion are sequentially stacked on the first extension portion, the first portion is fixedly connected to the elevating board, and the second portion is fixedly connected to the second board, thereby significantly improving the structural strength of the first board. In this way, when the first elastic piece is in elastic contact with the radiator of the antenna, the first elastic piece receives a reaction force of the radiator of the antenna. The first elastic piece transmits the reaction force to the first extension portion of the first board. In this case, with the cooperation of the first strengthening board, the elevating board, and the second board, the first extension portion can effectively counteract the force, thereby avoiding the first extension portion from being damaged or cracked due to an external force, and thus avoiding the disconnection of the circuit of the antenna.

In another possible implementation, the first strengthening board is fixedly connected to the elevating board. In the thickness direction of the antenna apparatus, the thickness of the first strengthening board is less than or equal to the thickness of the elevating board.

It may be understood that, the first strengthening board is stacked on the first extension portion, and the first strengthening board is fixedly connected to the elevating board, thereby significantly improving the structural strength of the first board. In this way, when the first elastic piece is in elastic contact with the radiator of the antenna, the first elastic piece receives a reaction force of the radiator of the antenna. The first elastic piece transmits the reaction force to the first extension portion of the first board. In this case, with the cooperation of the first strengthening board and the elevating board, the first extension portion can effectively counteract the force, thereby avoiding the first extension portion from being damaged or cracked due to an external force.

According to the fifth aspect, or any implementation of the fifth aspect described above, the first portion and the elevating board are of an integrally formed structure, and the second portion and the second board are of an integrally formed structure. In other words, the first portion and the elevating board are an integral board. In this case, the connection between the first portion and the elevating board is firmer. In this way, the first portion and the elevating board are not easy to fracture or crack when receiving an external force. In addition, the second portion and the second board are an integral board. In this case, the connection between the second portion and the second board is firmer. In this way, the second portion and the second board are not easy to fracture or crack when subjected to an external force.

In another possible implementation, the first portion can alternatively be fixedly connected to the elevating board by a soldering process. the second portion can alternatively be fixedly connected to the second board by a soldering process.

According to the fifth aspect, or any implementation of the fifth aspect described above, the first portion is provided with a first strengthening solder pad. The first extension portion is provided with a second strengthening solder pad. The first strengthening solder pad is soldered to the second strengthening solder pad.

It may be understood that, when the first portion and the first extension portion are soldered together through the first strengthening solder pad and the second strengthening solder pad, the connection between the first portion and the first extension portion is firmer, and the integral strength of the circuit board assembly is better. In addition, after the first strengthening solder pad and the second strengthening solder pad are soldered together, the first strengthening solder pad and the second strengthening solder pad can effectively protect a solder pad (the solder pad of this part is mainly configured for the electrical connection between wiring of the first board and wiring of the elevating board) between the first main body portion of the first board and the elevating board. That is, the solder pad between the first main body portion and the elevating board is avoided from easily breaking due to an external force.

According to the fifth aspect, or any implementation of the fifth aspect described above, a distance between the first elastic piece and the first portion ranges from 0.15 mm to 30 mm. In this case, the size of the first extension portion located between the first elastic piece and the first portion is relatively moderate. In this way, when the first elastic piece is in elastic contact with the radiator of the antenna, the first elastic piece receives a reaction force of the radiator. The first elastic piece transmits the reaction force to the first extension portion. In this case, the first extension portion located between the first elastic piece and the first portion is not easy to fracture or crack. In other words, the reaction force received by the first extension portion can be rapidly transmitted to the first portion, thereby counteracting the reaction force by an internal stress of the first portion.

According to the fifth aspect, or any implementation of the fifth aspect described above, the circuit board assembly further includes a second strengthening board. The second strengthening board is located on one side of the first elastic piece away from the first strengthening board, and is fixedly connected to a board surface of the first extension portion facing the second board.

It may be understood that, by stacking the first strengthening board on one side of the first elastic piece and on the first extension portion, and stacking the second strengthening board on the other side of the first elastic piece and on the first extension portion, a thickness of a part of the first extension portion is significantly increased, which further significantly improves the structural strength of the first board. In this way, when the first elastic piece is in elastic contact with the radiator, the first elastic piece receives a reaction force of the radiator of the antenna. The first elastic piece transmits the reaction force to the first extension portion of the first board. In this case, with the cooperation of the first strengthening board and the second strengthening board, the first extension portion can effectively counteract the force, thereby avoiding the first extension portion from being damaged or cracked due to an external force, and thus avoiding the disconnection of the circuit of the antenna.

According to the fifth aspect, or any implementation of the fifth aspect described above, the second strengthening board includes a third portion and a fourth portion connected to the third portion. The third portion is fixedly connected to the board surface of the first extension portion facing the second board, and the third portion is fixedly connected to the elevating board. The fourth portion is fixedly connected to the second board. In the thickness direction of the antenna apparatus, a thickness of the second strengthening board is greater than the thickness of the elevating board.

It may be understood that, the third portion and the fourth portion connected to the third portion are sequentially stacked on the first extension portion, the third portion is fixedly connected to the elevating board, and the fourth portion is fixedly connected to the second board, thereby significantly improving the structural strength of the first board. In this way, when the first elastic piece is in elastic contact with the radiator of the antenna, the first elastic piece receives a reaction force of the radiator of the antenna. The first elastic piece transmits the reaction force to the first extension portion of the first board. In this case, with the cooperation of the first strengthening board, the second strengthening board, the elevating board, and the second board, the first extension portion can effectively counteract the force, thereby avoiding the first extension portion from being damaged or cracked due to an external force, and thus avoiding the disconnection of the circuit of the antenna.

In another possible implementation, the second strengthening board is fixedly connected to the elevating board. In the thickness direction of the antenna apparatus, the thickness of the second strengthening board is less than or equal to the thickness of the elevating board.

According to the fifth aspect, or any implementation of the fifth aspect described above, the third portion and the elevating board are of an integrally formed structure. The fourth portion and the second board are of an integrally formed structure. In other words, the third portion and the elevating board are an integral board. In this case, the connection between the third portion and the elevating board is firmer. In this way, the third portion and the elevating board are not easy to fracture or crack when receiving an external force. In addition, the fourth portion and the second board are an integral board. In this case, the connection between the fourth portion and the second board is firmer. In this way, the fourth portion and the second board are not easy to fracture or crack when receiving an external force.

In another possible implementation, the third portion can alternatively be fixedly connected to the elevating board by a soldering process. The fourth portion can alternatively be fixedly connected to the second board by a soldering process.

According to the fifth aspect, or any implementation of the fifth aspect described above, a distance d3 between the first elastic piece and the third portion ranges from 0.15 mm to 30 mm.

In this case, the size of the first extension portion located between the first elastic piece and the third portion is relatively moderate. In this way, when the first elastic piece is in elastic contact with the radiator of the antenna, the first elastic piece receives a reaction force of the radiator. The first elastic piece transmits the reaction force to the first extension portion. In this case, the first extension portion located between the first elastic piece and the third portion is not easy to fracture or crack. In other words, the reaction force received by the first extension portion can be rapidly transmitted to the third portion, thereby counteracting the reaction force by an internal stress of the third portion.

According to the fifth aspect, or any implementation of the fifth aspect described above, the first extension portion is provided with a groove. The groove is located between the first strengthening board and the second strengthening board, and an opening of the groove is located on a surface of the first extension portion facing the radiator. A part of the first elastic piece is mounted in the groove.

It may be understood that, when a part of the first elastic piece is mounted in the groove, in a thickness direction of the circuit board assembly, there is an overlapping region between the first elastic piece and the first extension portion. In this case, there is an overlapping region between the first elastic piece and the first board as well. In this way, in a thickness direction of the antenna apparatus, the circuit board assembly is not thickened due to the configuration of the first elastic piece.

In addition, when the first extension portion is provided with the first strengthening board and the second strengthening board, the first strengthening board and the second strengthening board can improve the strength of the first extension portion, thereby avoiding the first extension portion from being reduced in strength due to the opening of the groove.

According to the fifth aspect, or any implementation of the fifth aspect described above, a surface of the radiator facing the first elastic piece is provided with a conductive piece. The first elastic piece is in elastic contact with the conductive piece.

It may be understood that, when the conductive piece is disposed on the radiator, the conductive piece can improve the surface flatness of the radiator. In this way, when the first elastic piece is in elastic contact with the radiator through the conductive piece, the elastic contact between the first elastic piece and the radiator is more stable. In this way, radio frequency signals are also relatively stably transmitted between the radiator and the first elastic piece, thereby ensuring that the antenna apparatus has better antenna performance.

According to the fifth aspect, or any implementation of the fifth aspect described above, the oxidation resistance of the conductive piece is higher than that of the radiator. It may be understood that, under an environment with the same temperature and humidity, the conductive piece is not easy to be oxidized compared with the radiator. In this way, compared with a solution in which the first elastic piece directly comes into elastic contact with the radiator, a contact resistance between the first elastic piece and the conductive piece is smaller, that is, the contact resistance between the first elastic piece and the conductive piece is more stable, and the transmission loss of the radio frequency signals is smaller. In this case, the antenna performance of the antenna apparatus is better.

According to the fifth aspect, or any implementation of the fifth aspect described above, the antenna apparatus includes a fastener. The radiator is provided with a blind hole. The fastener is fixed into the blind hole. The first elastic piece is in elastic contact with the fastener.

It may be understood that, compared with a solution of soldering the conductive piece on the radiator, this implementation saves the process of soldering the conductive piece on the radiator by disposing the fastener in the blind hole of the radiator, and electrically connecting the first elastic piece to the radiator of the antenna through the fastener. Therefore, on the one hand, the cost investment of the antenna apparatus is reduced, and there is no need to increase the input cost of a soldering process. and on the other hand, the case that the performance of the radiator in transmitting and receiving electromagnetic waves is affected by the generation of gas holes, slag inclusions, solder joints, or cracks in the soldering process in the radiator is avoided.

According to the fifth aspect, or any implementation of the fifth aspect described above, the radiator includes an inner side surface facing the circuit board assembly. The first elastic piece is in elastic contact with the inner side surface. In this way, the radiator can be in contact with the first elastic piece without disposing a protrusion. In this case, in the thickness direction of the antenna apparatus, the space omitting the protrusion can be used for an antenna clearance area. In this way, the clearance area of the antenna is larger, and the performance of the antenna is better. In addition, the radiator of the antenna also has a relatively simple structure, and is easy to mass-produce.

According to the fifth aspect, or any implementation of the fifth aspect described above, the first elastic piece includes a first fixed piece, an elastic member, and a second fixed piece. The elastic member is connected between the first fixed piece and the second fixed piece. It may be understood that, the elastic member may be, but is not limited to, an elastic piece or a spring. In addition, the first fixed piece may be, but is not limited to, a copper piece, an aluminum piece, or a gold piece. The second fixed piece may be, but is not limited to, a copper piece, an aluminum piece, or a gold piece.

In addition, the first fixed piece is fixedly connected to the radiator. The second fixed piece is fixedly connected to the first extension portion of the first board.

It may be understood that, the first elastic piece has a simple structure and is easy to assemble, which can reduce the assembly difficulty of the antenna apparatus.

According to the fifth aspect, or any implementation of the fifth aspect described above, the circuit board assembly further includes a second conductive member. The second conductive member may be, but is not limited to, an elastic piece or a spring. The second conductive member is disposed on the first extension portion of the first board. The second conductive member is electrically connected between the ground layer of the first board and the radiator. In other words, the second conductive member is configured to ground the radiator.

It may be understood that, the radiator of this implementation is grounded in a relatively simple manner and has a simple structure and low cost investment.

According to the fifth aspect, or any implementation of the fifth aspect described above, the first board is provided with a second matching circuit. The second matching circuit includes an inductor, a capacitor, a resistor, or an antenna switch. A second elastic piece is electrically connected to the second matching circuit and is electrically connected to the ground layer of the first board through the second matching circuit. The second matching circuit is configured to tune the frequency bands of the antenna for receiving and transmitting electromagnetic waves and the impedance matching for the antenna. In this way, the antenna is more widely applied to transmit and receive electromagnetic waves and has better performance.

In a sixth aspect, an antenna apparatus is provided. The antenna apparatus can transmit and receive electromagnetic wave signals. The antenna apparatus includes a radiator and a circuit board assembly.

The circuit board assembly is located on the inner side of the frame. The circuit board assembly includes a first board, an elevating board, a second board, and a first conductive member. The first board includes a first main body portion and a first extension portion connected to the first main body portion. The elevating board includes a second main body portion and a second extension portion connected to the second main body portion. The first main body portion, the second main body portion, and the second board are sequentially stacked. In other words, the second main body portion is located between the first main body portion and the second board. The first extension portion and the second extension portion are stacked, and both the first extension portion and the second extension portion protrude relative to the second board and are disposed close to the radiator. The first conductive member is fixed to the second extension portion, and the first conductive member and the second board are located on the same side of the elevating board. The second conductive member is in elastic contact with the radiator.

It should be noted that, the first conductive member may be an elastic piece having electrical conductivity or may alternatively be a spring having electrical conductivity, which is not limited in this application. In each of the solutions that can be implemented below, the first conductive member is described by taking a first elastic piece as an example.

In this implementation, by disposing the second extension portion that protrudes relative to the second board, and fixedly connecting the first elastic piece to the second extension portion, and the first conductive member and the second board are located on the same side of the elevating board in a thickness direction of the circuit board assembly, there is an overlapping region between the first elastic piece and the second board. The first elastic piece utilizes a space of the second board facing one side of the radiator. In this way, in a thickness direction of the antenna apparatus, the circuit board assembly is not thickened due to the configuration of the first elastic piece.

In addition, by stacking the second extension portion on the first extension portion, and in this case, by the cooperation of the second extension portion and the first extension portion, the integral strength of this part can be improved. In this way, when the first elastic piece is in elastic contact with the radiator of the antenna, the first elastic piece receives a reaction force of the radiator. The first elastic piece transmits the reaction force to the second extension portion. In this case, with the cooperation of the first extension portion, the second extension portion can effectively counteract the force, thereby avoiding the second extension portion from being damaged or cracked due to an external force, and thus avoiding the disconnection of the circuit of the antenna.

In addition, by bringing the first elastic piece into elastic contact with the radiator, the transmission of radio frequency signals between the first elastic piece and the radiator is ensured to be more stable. Specifically, because the first elastic piece has an elastic force, the first elastic piece can always be in contact with the radiator when the first elastic piece is in elastic contact with the radiator, so that the connection stability between the first elastic piece and the radiator is better.

In addition, a space between a surface of the second extension portion facing the radiator and the radiator is generally small. General chips or electronic components are not easy to be disposed in this region. In this case, the space is unused, which easily results in a waste of space. In this implementation, by fixing the first elastic piece with a relatively small size fixed on one side of the second extension portion facing the radiator, the space of this part can be effectively utilized, to improve the internal space utilization of the antenna apparatus.

In a possible implementation according to the sixth aspect, the antenna apparatus further includes a radio frequency path. The radio frequency path can be configured to transmit radio frequency signals to the radiator of the antenna, so that the radiator of the antenna transmits electromagnetic wave signals according to the radio frequency signals. In addition, when the radiator of the antenna converts the received electromagnetic wave signals into radio frequency signals, the radio frequency path can further be configured to receive the radio frequency signals transmitted by the radiator of the antenna. In this case, the first elastic piece is electrically connected between the radio frequency path and the radiator.

In another possible implementation, the first elastic piece is electrically connected between the radiator and a ground layer of the second extension portion.

In another possible implementation, the first elastic piece is electrically connected to the ground layer of the second extension portion through a matching circuit.

According to the sixth aspect, or any implementation of the sixth aspect described above, a distance between the first elastic piece and the second board is between 0.15 mm and 30 mm.

It may be understood that, when the distance between the first elastic piece and the second board ranges from 0.15 mm to 30 mm, the size of the second extension portion located between the first elastic piece and the second board is relatively moderate. In this way, when the first elastic piece is in elastic contact with the radiator, the first elastic piece receives a reaction force of the radiator. The first elastic piece transmits the reaction force to the second extension portion. In this case, the second extension portion located between the first elastic piece and the second board is not easy to fracture or crack. In other words, the reaction force received by the second extension portion can be rapidly transmitted to the second board, thereby counteracting the reaction force by an internal stress of the second board.

According to the sixth aspect, or any implementation of the sixth aspect described above, the circuit board assembly further includes a third strengthening board. The third strengthening board is located on one side of the first elastic piece, and is fixedly connected to a board surface of the second extension portion facing the second board.

It may be understood that, by stacking the third strengthening board on one side of the first elastic piece and on the second extension portion, a thickness of a part of the second extension portion is significantly increased, which further significantly improves the structural strength of the elevating board. In this way, when the first elastic piece is in elastic contact with the radiator, the first elastic piece receives a reaction force of the radiator of the antenna. The first elastic piece transmits the reaction force to the second extension portion of the elevating board. In this case, with the cooperation of the third strengthening board, the second extension portion can effectively counteract the force, thereby avoiding the second extension portion from being damaged or cracked due to an external force, and thus avoiding the disconnection of the circuit of the antenna.

According to the sixth aspect, or any implementation of the sixth aspect described above, the third strengthening board and the second board are of an integrally formed structure. In other words, the third strengthening board and the second board are an integral board. In this case, the integral structural strength of the third strengthening board and the second board is better. In this way, the third strengthening board and the second board are not easy to fracture or crack when receiving an external force.

In another possible implementation, the third strengthening board may be connected to the second board by a soldering process, or the third strengthening board may be disposed separately from the second board.

According to the sixth aspect, or any implementation of the sixth aspect described above, a distance between the first elastic piece and the third strengthening board ranges from 0.15 mm to 30 mm. In this case, the size of the second extension portion located between the first elastic piece and the third strengthening board is relatively moderate. In this way, when the first elastic piece is in elastic contact with the radiator of the antenna, the first elastic piece receives a reaction force of the radiator. The first elastic piece transmits the reaction force to the second extension portion. In this case, the second extension portion located between the first elastic piece and the third strengthening board is not easy to fracture or crack. In other words, the reaction force received by the first extension portion can be rapidly transmitted to the third strengthening board, thereby counteracting the reaction force by an internal stress of the third strengthening board.

According to the sixth aspect, or any implementation of the sixth aspect described above, the circuit board assembly further includes a fourth strengthening board. The fourth strengthening board is located on one side of the first elastic piece away from the third strengthening board, and is fixedly connected to the board surface of the second extension portion facing the second board.

It may be understood that, by stacking the fourth strengthening board on one side of the first elastic piece and on the second extension portion, a thickness of a part of the second extension portion is significantly increased, which further significantly improves the structural strength of the elevating board. In this way, when the first elastic piece is in elastic contact with the radiator, the first elastic piece receives a reaction force of the radiator of the antenna. The first elastic piece transmits the reaction force to the second extension portion of the elevating board. In this case, with the cooperation of the fourth strengthening board, the second extension portion can effectively counteract the force, thereby avoiding the second extension portion from being damaged or cracked due to an external force, and thus avoiding the disconnection of the circuit of the antenna.

According to the sixth aspect, or any implementation of the sixth aspect described above, the fourth strengthening board and the second board are of an integrally formed structure. In other words, the fourth strengthening board and the second board are an integral board. In this case, the integral structural strength of the fourth strengthening board and the second board is better. In this way, the fourth strengthening board and the second board are not easy to fracture or crack when receiving an external force.

In another possible implementation, the fourth strengthening board may be connected to the second board by a soldering process, or the fourth strengthening board may be disposed separately from the second board.

According to the sixth aspect, or any implementation of the sixth aspect described above, a distance between the first elastic piece and the fourth strengthening board ranges from 0.15 mm to 30 mm. In this case, the size of the second extension portion located between the first elastic piece and the fourth strengthening board is relatively moderate. In this way, when the first elastic piece is in elastic contact with the radiator of the antenna, the first elastic piece receives a reaction force of the radiator. The first elastic piece transmits the reaction force to the second extension portion. In this case, the second extension portion located between the first elastic piece and the fourth strengthening board is not easy to fracture or crack. In other words, a reaction force received by the second extension portion can be quickly transmitted to the fourth strengthening board. Therefore, the reaction force is counteracted by an internal stress of the fourth strengthening board.

According to the sixth aspect, or any implementation of the sixth aspect described above, the second extension portion is provided with a groove, the groove is located between the third strengthening board and the fourth strengthening board, an opening of the groove is located on a surface of the second extension portion facing the radiator, and a part of the first elastic piece is mounted in the groove.

It may be understood that, when a part of the first elastic piece is mounted in the groove, in a thickness direction of the circuit board assembly, there is an overlapping region between the first elastic piece and the second extension portion. In this case, there is an overlapping region between the first elastic piece and the first board as well. In this way, in a thickness direction of the antenna apparatus, the circuit board assembly is not thickened due to the configuration of the first elastic piece.

In addition, when the second extension portion is provided with the first strengthening board and the second strengthening board, the first strengthening board and the second strengthening board can improve the strength of the second extension portion, thereby avoiding the second extension portion from being reduced in strength due to the opening of the groove.

According to the sixth aspect, or any implementation of the sixth aspect described above, a surface of the radiator facing the first elastic piece is provided with a conductive piece. The first elastic piece is in elastic contact with the conductive piece.

It may be understood that, when the conductive piece is disposed on the radiator, the conductive piece can improve the surface flatness of the radiator. In this way, when the first elastic piece is in elastic contact with the radiator through the conductive piece, the elastic contact between the first elastic piece and the radiator is more stable. In this way, radio frequency signals are also relatively stably transmitted between the radiator and the first elastic piece, thereby ensuring that the antenna apparatus has better antenna performance.

According to the sixth aspect, or any implementation of the sixth aspect described above, the oxidation resistance of the conductive piece is higher than that of the radiator. It may be understood that, under an environment with the same temperature and humidity, the conductive piece is not easy to be oxidized compared with the radiator. In this way, compared with a solution in which the first elastic piece directly comes into elastic contact with the radiator, a contact resistance between the first elastic piece and the conductive piece is smaller, that is, the contact resistance between the first elastic piece and the conductive piece is more stable, and the transmission loss of the radio frequency signals is smaller. In this case, the antenna performance of the antenna apparatus is better.

According to the sixth aspect, or any implementation of the sixth aspect described above, the antenna apparatus includes a fastener. The radiator is provided with a blind hole. The fastener is fixed into the blind hole. The first elastic piece is in elastic contact with the fastener.

It may be understood that, compared with a solution of soldering the conductive piece on the radiator, this implementation saves the process of soldering the conductive piece on the radiator by disposing the fastener in the blind hole of the radiator, and electrically connecting the first elastic piece to the radiator of the antenna through the fastener. Therefore, on the one hand, the cost investment of the antenna apparatus is reduced, and there is no need to increase the input cost of a soldering process. and on the other hand, the case that the performance of the radiator in transmitting and receiving electromagnetic waves is affected by the generation of gas holes, slag inclusions, solder joints, or cracks in the soldering process in the radiator is avoided.

According to the sixth aspect, or any implementation of the sixth aspect described above, the radiator includes an inner side surface facing the circuit board assembly. The first elastic piece is in elastic contact with the inner side surface. In this way, the radiator can be in contact with the first elastic piece without disposing a protrusion. In this case, in the thickness direction of the circuit board assembly, the space omitting the protrusion can also be used for an antenna clearance area. In this way, the clearance area of the antenna is larger, and the performance of the antenna is better.

According to the sixth aspect, or any implementation of the sixth aspect described above, the first elastic piece includes a first fixed piece, an elastic member, and a second fixed piece. The elastic member is connected between the first fixed piece and the second fixed piece. It may be understood that, the elastic member may be, but is not limited to, an elastic piece or a spring. In addition, the first fixed piece may be, but is not limited to, a copper piece, an aluminum piece, or a gold piece. The second fixed piece may be, but is not limited to, a copper piece, an aluminum piece, or a gold piece.

In addition, the first fixed piece is fixedly connected to the radiator. The second fixed piece is fixedly connected to the second extension portion of the elevating board.

It may be understood that, the first elastic piece has a simple structure and is easy to assemble, which can reduce the assembly difficulty of the antenna apparatus.

According to the sixth aspect, or any implementation of the sixth aspect described above, the circuit board assembly further includes a second conductive member. The second conductive member may be, but is not limited to, an elastic piece or a spring. The second conductive member is disposed on the second extension portion of the elevating board. The second conductive member is electrically connected between the ground layer of the elevating board and the radiator. In other words, the second conductive member is configured to ground the radiator.

It may be understood that, the radiator of this implementation is grounded in a relatively simple manner and has a simple structure and low cost investment.

According to the sixth aspect, or any implementation of the sixth aspect described above, the first board is provided with a second matching circuit. The second matching circuit includes an inductor, a capacitor, a resistor, or an antenna switch. A second elastic piece is electrically connected to the second matching circuit, and is electrically connected to the ground layer of the elevating board through the second matching circuit. The second matching circuit is configured to tune the frequency bands of the antenna for receiving and transmitting electromagnetic waves and the impedance matching for the antenna. In this way, the antenna is more widely applied to transmit and receive electromagnetic waves and has better performance.

DESCRIPTION OF EMBODIMENTS

Figure 1:
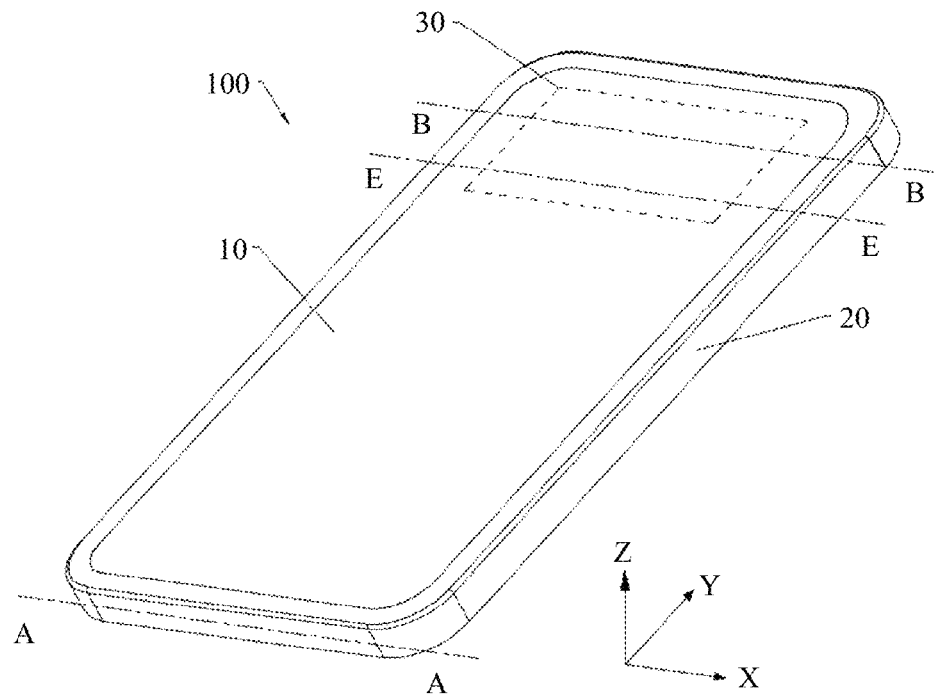
FIG. 1 is a schematic structural view of an electronic device in an optional manner provided by an embodiment of this application.

FIG. 1 is a schematic structural view of an electronic device in an optional manner provided by an embodiment of this application. An electronic device 100 may be a mobile phone, a watch, a tablet personal computer (tablet personal computer), a laptop computer (laptop computer), a personal digital assistant (personal digital assistant, PDA), a personal computer, a notebook computer, an in-vehicle device, a wearable device, augmented reality (augmented reality, AR) glasses, an AR helmet, virtual reality (virtual reality, VR) glasses, a VR helmet, or another device capable of transmitting and receiving electromagnetic wave signals in other forms. The electronic device 100 of an embodiment shown in FIG. 1 is described by taking a mobile phone as an example. For the convenience of description, a width direction of the electronic device 100 is defined as the X axis. A length direction of the electronic device 100 is the Y axis. A thickness direction of the electronic device 100 is the Z axis.

In this application, structures of three electronic devices 100 are mainly described below. One is an electronic device 100 in which a screen is a flat screen. The other is an electronic device 100 in which a screen is a curved screen. Another is an electronic device in which a screen is a 360° curved screen. First, the electronic device 100 in which a screen is a flat screen according to a first embodiment is described in detail below with reference to the related accompanying drawings.

Figure 2:
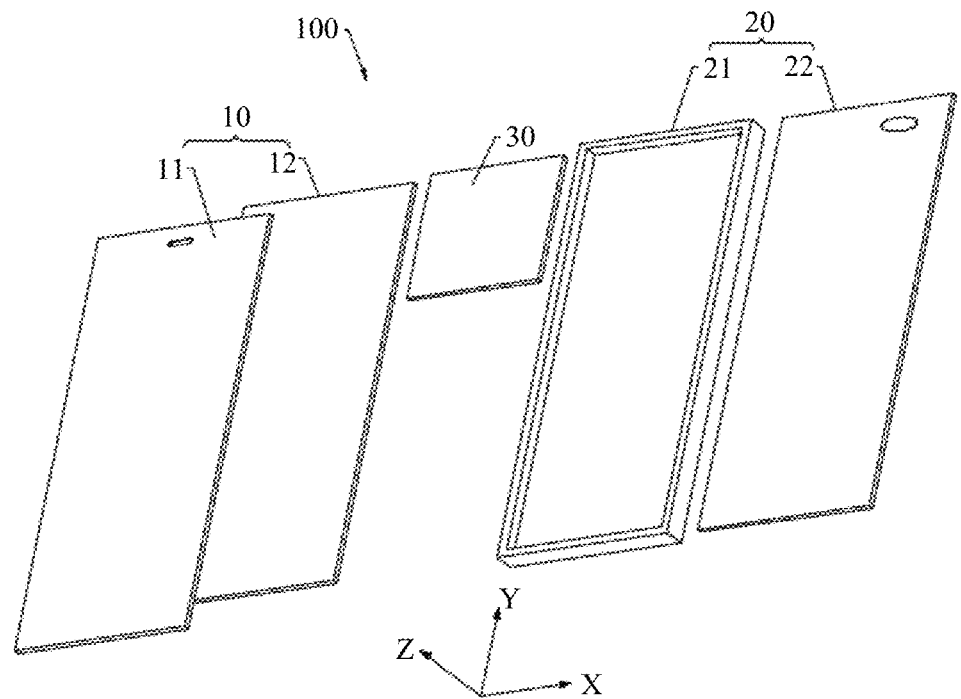
FIG. 2 is a schematic exploded view of an electronic device shown in FIG. 1.

First embodiment: With reference to FIG. 1, FIG. 2 is a schematic exploded view of an electronic device shown in FIG. 1. The electronic device 100 includes a screen 10, a housing 20, and a circuit board assembly 30. It may be understood that, FIG. 1 and FIG. 2 merely schematically show some components included in the electronic device 100, and the actual shapes, actual sizes, and actual structures of these components are not limited by FIG. 1 and FIG. 2.

The screen 10 may be configured to display images, texts, or the like. The screen 10 is a flat screen. In addition, the screen 10 includes a protective cover plate 11 and a display screen 12. The protective cover plate 11 is stacked on the display screen 12. The protective cover plate 11 may be disposed close to the display screen 12, and may be mainly configured to protect the display screen 12 and prevent dust. The material of the protective cover plate 11 may be, but not limited to, glass. The display screen 12 may be an organic light-emitting diode (organic light-emitting diode, OLED) display screen, an active-matrix organic light-emitting diode (active-matrix organic light-emitting diode, AMOLED) display screen, a quantum dot light emitting diodes (quantum dot light emitting diodes, QLED) display screen, or the like.

The housing 20 may be configured to support the screen 10. The housing 20 includes a frame 21 and a rear cover 22. The rear cover 22 is disposed opposite to the screen 10. The rear cover 22 and the screen 10 are mounted on opposite sides of the frame 21 respectively. In this case, the rear cover 22, the frame 21, and the screen 10 together enclose an interior of the electronic device 100. The interior of the electronic device 100 may be used for accommodating components of the electronic device 100, such as a battery, a receiver, a microphone, or the like.

In an optional manner, the rear cover 22 is fixedly connected to the frame 21 by adhesive. In another optional manner, the rear cover 22 and the frame 21 form an integral structure, that is, the rear cover 22 and the frame 21 is of an integral structure.

In addition, the housing 20 may further be used as a part of the radiator of the antenna, or an inner side of the housing 20 may be used for fixing the radiator of the antenna.

It may be understood that, the electronic device 100 may utilize the antenna and communicate with a network or another device through one or more of the following communication technologies. The communication technologies include the bluetooth (bluetooth, BT) communication technology, global positioning system (global positioning system, GPS) communication technology, wireless fidelity (wireless fidelity, Wi-Fi) communication technology, global system for mobile communications (global system for mobile communications, GSM) communication technology, wideband code division multiple access (wideband code division multiple access, WCDMA) communication technology, long term evolution (long term evolution, LTE) communication technology, 5G communication technology, SUB-6G communication technology, another future communication technology, or the like.

In addition, the electronic device 100 may share mobile data traffic or wireless network sharing with other devices (for example, mobile phones, watches, tablet computers, or other devices capable of transmitting and receiving electromagnetic wave signals) through the antenna. For example, when other devices enable the data traffic sharing network, the electronic device 100 may access the data traffic sharing network of other devices by receiving the antenna signals of the other devices. In this way, the electronic device 100 does not affect the user experience of the electronic device 100 because the traffic thereof is insufficient or has stopped being used.

The radiator of the antenna is configured to transmit and receive electromagnetic wave signals. There are a plurality of configuration manners for the radiator of the antenna. Two optional manners are described in detail below with reference to the relevant accompanying drawings.

Figure 3:
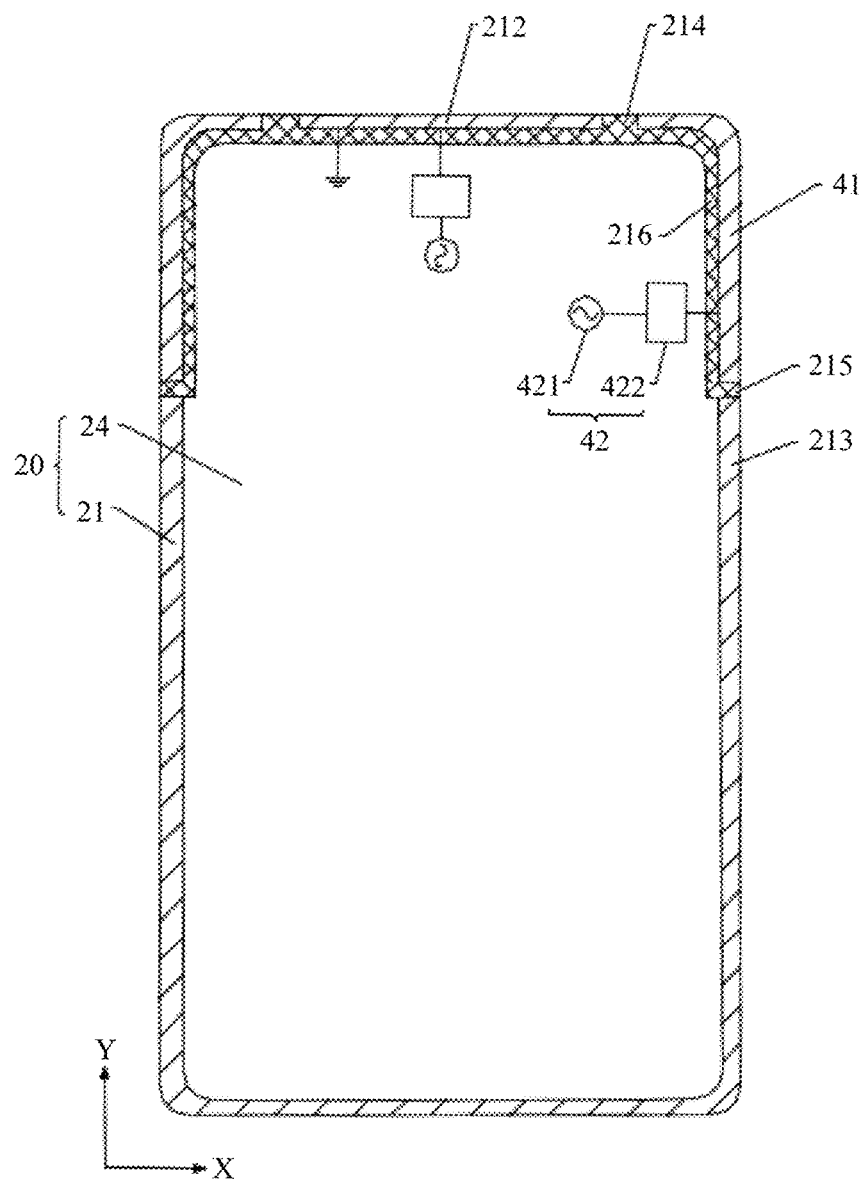
FIG. 3 is a partial cross-sectional view of an electronic device shown in FIG. 1 in an optional manner taken along a line A-A.

First optional manner: FIG. 3 is a partial cross-sectional view of an electronic device shown in FIG. 1 in an optional manner taken along a line A-A. It may be understood that, the cross-sectional view illustrated in FIG. 3 is a cross-sectional view of the electronic device of FIG. 1 taken along the line A-A and viewed along the negative direction of the Z axis. The frame 21 of the housing 20 is made of a metal material, for example, steel. In this case, a metal segment is isolated on the frame 21, and the metal segment forms the radiator 41 of the antenna. Specifically, the frame 21 includes a first short frame 212 and a first long frame 213 connecting the first short frame 212. The first short frame 212 includes a first gap 214. The first long frame 213 includes a second gap 215. In this way, an independent metal segment is isolated on the frame 21 by the first gap 214 and the second gap 215, to form the radiator 41 of the antenna.

In this implementation, the housing 20 further includes a middle plate 24. The middle plate 24 is made of a metal material, for example, steel. The middle plate 24 is connected to an inner surface of the frame 21. There is a third gap 216 among a part of the middle plate 24, the first short frame 212, and the first long frame 213. The third gap 216 is in communication with the first gap 214 and the second gap 215. In this way, the first gap 214, the second gap 215, and the third gap 216 can form an antenna clearance area. In another optional manner, the housing 20 may alternatively not include the middle plate 24.

In addition, the first gap 214, the second gap 215, and the third gap 216 may alternatively be filled with insulating materials. For example, the insulating materials may be polymers, glass, ceramics, or the like, or a combination of these materials. In another optional manner, the first gap 214, the second gap 215, and the third gap 216 may be in a hollow state, that is, the first gap 214, the second gap 215, and the third gap 216 are not filled with other substances.

It may be understood that, the position of the radiator 41 of the antenna is not limited to the position illustrated in FIG. 3. For example, an independent metal segment is isolated on the first short frame 212, to form the radiator 41 of the antenna. Alternatively, an independent metal segment is isolated on the first long frame 213, to form the radiator 41 of the antenna. Certainly, the radiator 41 of the antenna may alternatively be formed in another part of the frame 21. Details are not limited in this embodiment.

Figure 4:
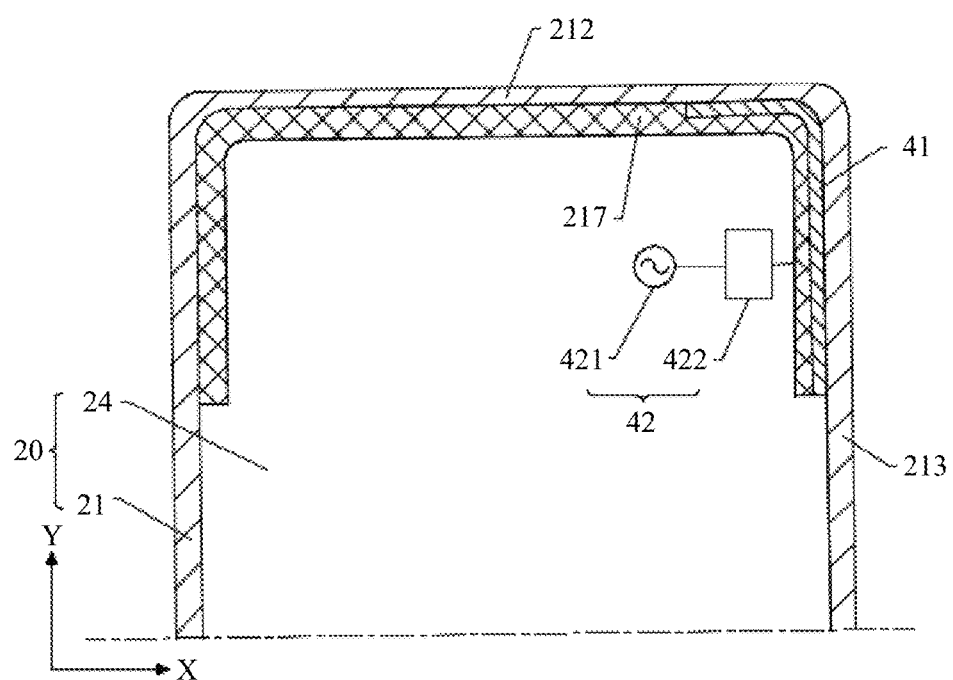
FIG. 4 is a partial cross-sectional view of an electronic device shown in FIG. 1 in another optional manner taken along a line A-A.

Second optional manner: FIG. 4 is a partial cross-sectional view of an electronic device shown in FIG. 1 in another optional manner taken along a line A-A. It may be understood that, the cross-sectional view illustrated in FIG. 4 is a cross-sectional view of the electronic device of FIG. 1 taken along the line A-A and viewed along the negative direction of the Z axis. The frame 21 of the housing 20 is made of an insulating material. For example, the insulating material may be polymer, glass, or a combination of these materials. In this case, a conductive conductor is formed on an inner surface of the frame 21 by a laser direct structuring (laser direct structuring, LDS) or a printing direct structuring technique. A conductive conductor may be made of, but is not limited to, a copper, gold, or graphene material. The conductive conductor forms the radiator 41 of the antenna. It may be understood that, the position of the radiator 41 is not limited to inner surfaces of the first short frame 212 and the first long frame 213 illustrated in FIG. 4. For example, the radiator 41 may be located on the inner surface of the first short frame 212. The radiator 41 may alternatively be located on the inner surface of the first long frame 213, or on an inner surface of another part of the frame 21.

In addition, the housing 20 further includes a middle plate 24. The middle plate 24 is made of a metal material, for example, steel. The middle plate 24 is connected to an inner surface of the frame 21. There is a fourth gap 217 among a part of the middle plate 24, the first short frame 212, and the first long frame 213. In this way, the fourth gap 217 can form an antenna clearance area. In another optional manner, the housing 20 may alternatively not include the middle plate 24.

It may be understood that, the radiator 41 of the antenna may alternatively be implemented in another manner. For example, a flexible circuit board is fixedly connected to the inner surface of the frame 21. The flexible circuit board forms the radiator 41 of the antenna. The configuration manner of the radiator 41 of the antenna is not described herein again. In the following embodiments, the structure of the radiator 41 of the antenna is described by taking the first optional manner as an example.

Figure 5:
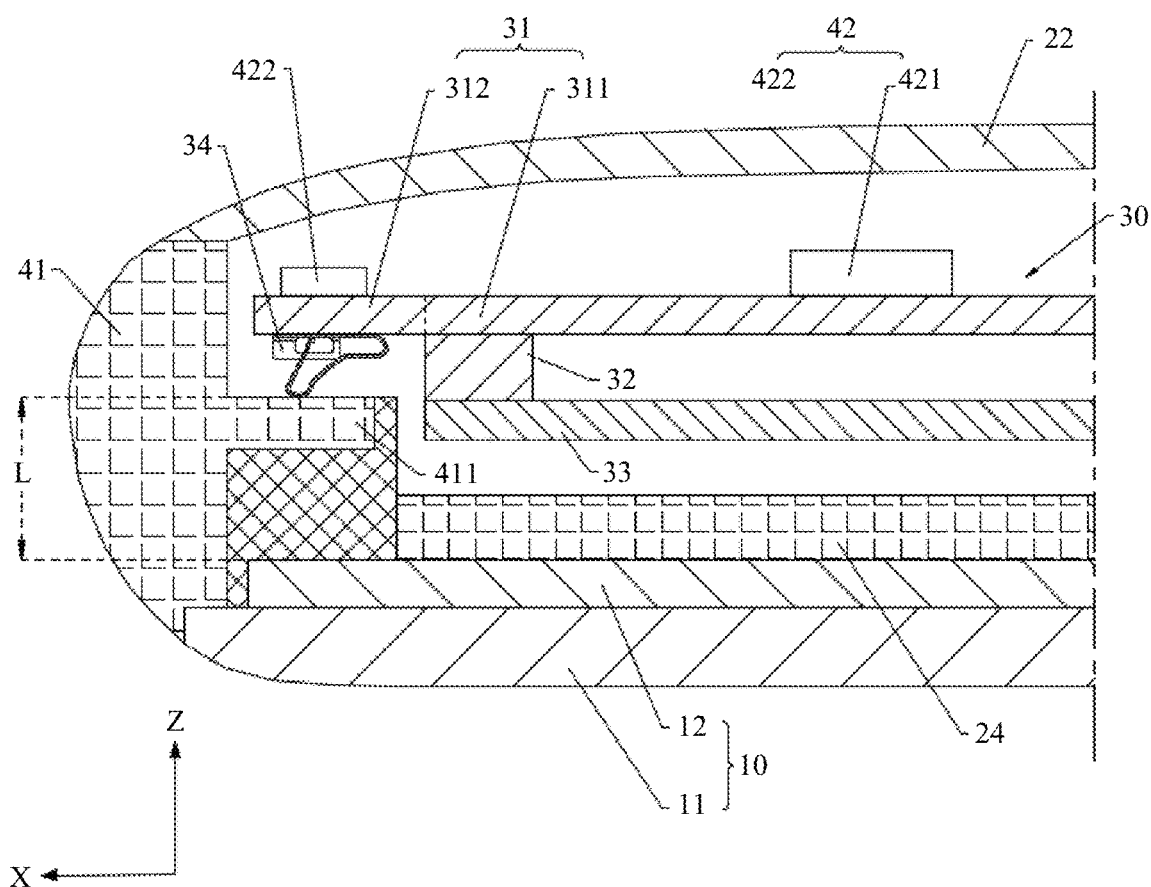
FIG. 5 is a partial cross-sectional view of an electronic device shown in FIG. 1 in an optional manner taken along a line B-B.

FIG. 5 is a partial cross-sectional view of an electronic device shown in FIG. 1 in an optional manner taken along a line B-B; It may be understood that, the cross-sectional view illustrated in FIG. 5 is a cross-sectional view formed by taking a cross section from the electronic device of FIG. 1 along a line B-B and viewing along the positive direction of the Y axis, and then rotating the obtained cross-sectional view by 180° with the Y axis as the rotation axis. The circuit board assembly 30 is located in an interior of the electronic device 100. The circuit board assembly 30 may be fixed on the middle plate 24 by screws, pins, or rivets to ensure stability. The circuit board assembly 30 may be configured to mount a radio frequency path 42 of the antenna. The radio frequency path 42 may be configured to transmit radio frequency signals to the radiator 41 of the antenna, so that the radiator 41 of the antenna transmits electromagnetic wave signals according to the radio frequency signals. In addition, when the radiator 41 of the antenna converts the received electromagnetic wave signals into radio frequency signals, the radio frequency path 42 may further be configured to receive the radio frequency signals transmitted by the radiator 41 of the antenna.

The radio frequency path 42 includes a radio frequency transceiver chip 421 and a first matching circuit 422. It may be understood that, FIG. 3 to FIG. 5 only schematically show the radio frequency transceiver chip 421 and the first matching circuit 422. However, the actual shapes, actual sizes, and actual structures of the radio frequency transceiver chip 421 and the first matching circuit 422 are not limited by FIG. 3 to FIG. 5.

The radio frequency transceiver chip 421 is configured to transmit the radio frequency signals to the radiator 41 of the antenna, and is further configured to receive the radio frequency signals transmitted by the radiator 41 of the antenna. It may be understood that, when functions of transmitting and receiving radio frequency signals are integrated on an independent module (the radio frequency transceiver chip 421), the radio frequency transceiver chip 421 can operate independently to transmit and receive radio frequency signals. In this case, the transmission efficiency and processing efficiency of the radio frequency signals are significantly improved.

In another optional manner, the functions of transmitting and receiving radio frequency signals may alternatively be integrated on a central processing unit (central processing unit, CPU) of the electronic device 100, or on another chip of the electronic device 100, such as a battery management chip. In this case, because the CPU or the another chip of the electronic device 100 also have the functions of transmitting and receiving radio frequency signals, the space occupied by one chip (the radio frequency transceiver chip 421) can be saved inside the electronic device 100, thereby improving the utilization of the internal space of the electronic device 100.

The first matching circuit 422 is electrically connected between the radio frequency transceiver chip 421 and the radiator 41. In other words, the radio frequency signals transmitted by the radio frequency transceiver chip 421 can be transmitted to the radiator 41 via the first matching circuit 422. In addition, after the radiator 41 converts the received electromagnetic wave signals into radio frequency signals, the radio frequency signals can further be transmitted to the radio frequency transceiver chip 421 via the first matching circuit 422. The first matching circuit 422 may be electrically connected to the radio frequency transceiver chip 421 through wiring in the circuit board assembly 30. The first matching circuit 422 may be configured to perform signal processing, such as signal amplification, filtering, or the like, on the radio frequency signals. The first matching circuit 422 may include electronic components such as antenna switches, capacitors, inductors, or resistors.

It may be understood that, the general structure of the electronic device 100 and the general structure of the antenna in the electronic device 100 are described above in detail with reference to the related accompanying drawings.

In order to bring a more comfortable visual experience to the user, the electronic device 100 may adopt a full-screen industry design (industry design, ID). A full screen means a huge screen-to-body ratio (usually above 90%). In this case, a width of the frame 21 of the electronic device 100 is greatly reduced, and internal components, such as a battery, receiver, microphone, antenna, or the like, of the electronic device 100 need to be rearranged. In particular, for the design of the antenna, when the width of the frame 21 of the electronic device 100 is greatly reduced, the antenna clearance area is also greatly reduced. The size, bandwidth, and efficiency of the antenna are interrelated and affect each other. In addition, if the size (space) of the antenna is reduced, the efficiency-bandwidth product of the antenna is bound to decrease. However, in this embodiment, under the circumstance in which the arrangement of the antenna is tight, a circuit board assembly 30 structure is arranged and the related components of the antenna are rearranged, so that the antenna has a wider clearance area, thereby significantly improving the antenna performance of the electronic device 100.

Figure 6:
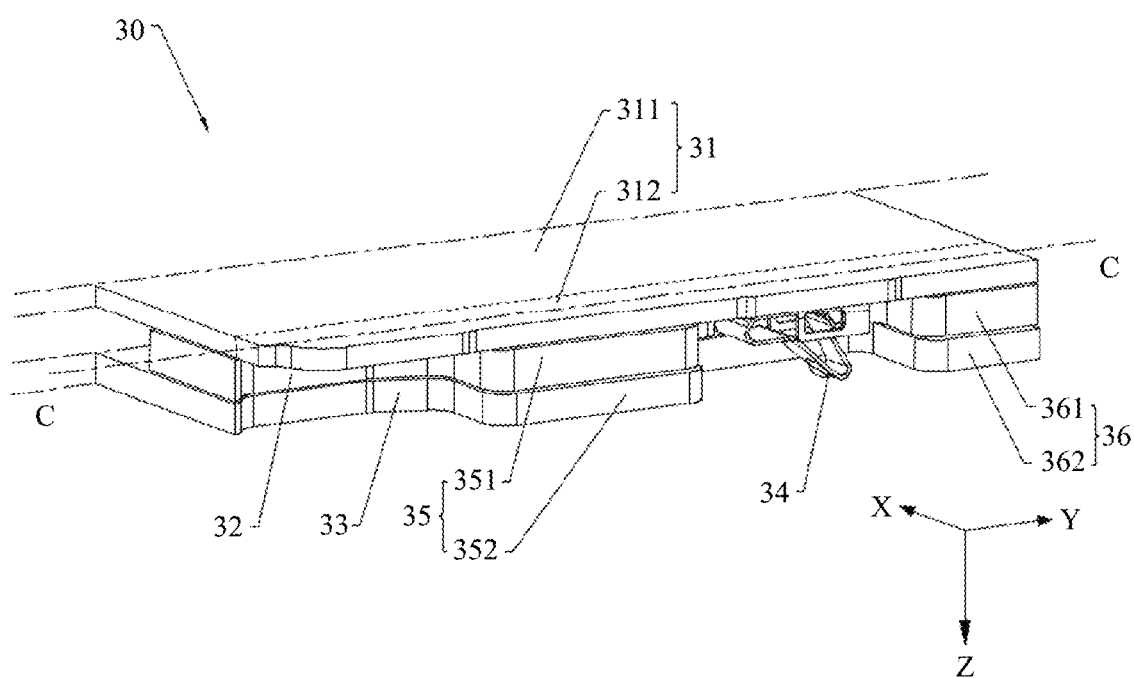
FIG. 6 is a partial schematic structural view of a circuit board assembly of an electronic device shown in FIG. 1 in an optional manner.
Figure 7:
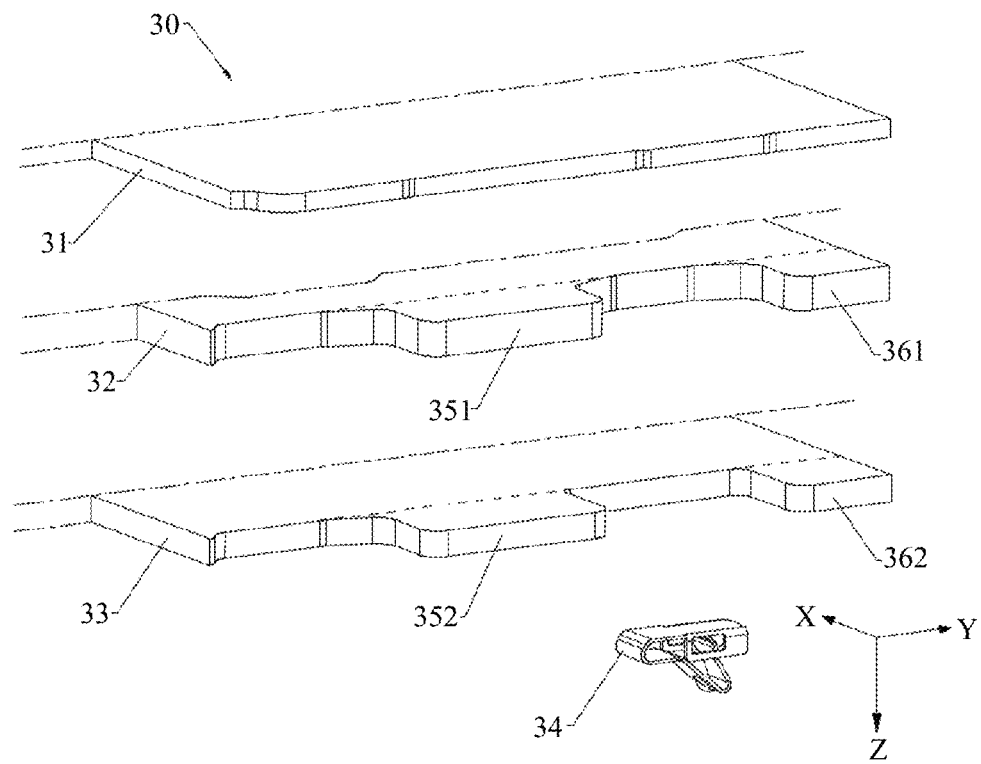
FIG. 7 is a schematic exploded view of a circuit board assembly shown in FIG. 6.

FIG. 6 is a partial schematic structural view of a circuit board assembly of an electronic device shown in FIG. 1 in an optional manner. FIG. 7 is a schematic exploded view of a circuit board assembly shown in FIG. 6. The circuit board assembly 30 includes a first board 31, an elevating board 32, a second board 33, and a first conductive member 34. It may be understood that, in order to be able to clearly see a part of the detailed structure of the circuit board assembly 30, FIG. 6 and FIG. 7 merely schematically illustrate the part of the structure of the circuit board assembly 30. In optional manners below, the accompanying drawings of the optional manners also schematically illustrate a partial structural view of the circuit board assembly 30. Details are not described below. In addition, the first conductive member 34 may be an elastic piece with electrical conductivity or a spring with electrical conductivity. which is not limited in this application. In the following embodiments, the first conductive member 34 is described by taking the first elastic piece 34 as an example.

The first board 31, the elevating board 32, and the second board 33 are sequentially stacked. In other words, the elevating board 32 is fixed between the first board 31 and the second board 33. FIG. 6 illustrates that the first board 31, the elevating board 32, and the second board 33 are sequentially stacked along the Z-axis direction. In another optional manner, when the electronic device 100 is in other forms, the first board 31, the elevating board 32, and the second board 33 may alternatively be sequentially stacked and disposed along the X axis, the Y axis or another direction.

In an optional manner, the first board 31 and the elevating board 32 may be fixed to each other by a soldering process. In another optional manner, the first board 31 and the elevating board 32 may be bonded and fixed to each other by conductive glue.

In an optional manner, the second board 33 and the elevating board 32 may be fixed to each other by a soldering process. In another optional manner, the second board 33 and the elevating board 32 may be bonded and fixed to each other by conductive glue.

In this embodiment, with reference to FIG. 5, by sequentially stacking the first board 31, the elevating board 32, and the second board 33 along the Z-axis direction, the board surface area of the circuit board assembly 30 can be significantly increased, thereby increasing the number of electronic components arranged on the circuit board assembly 30. Specifically, when the first board 31 and the second board 33 are elevated in the Z-axis direction by the elevating board 32, on the circuit board assembly 30, electronic components (for example, a CPU, a battery management chip, or the like) can not only be arranged on a surface of the first board 31 facing the rear cover 22 and a surface of the second board 33 facing the display screen 12, but also can be arranged in a space between the first board 31 and the second board 33 (on a surface of the first board 31 facing the second board 33 and a surface of the second board 33 facing the first board 31). In other words, more electronic components can be arranged on the circuit board assembly 30 of this embodiment. In this way, on the one hand, the electronic device 100 has more and more functions, and the user experience is also better. On the other hand, when the internal environment of the electronic device 100 is tense, by arranging a large number of electronic components of the electronic device 100 on the circuit board assembly 30, more space can be freed up inside the electronic device 10. When this part of space is applied to the clearance area of the antenna, the clearance area of the antenna can be significantly increased, thereby significantly improving the performance of the antenna.

Figure 8A:
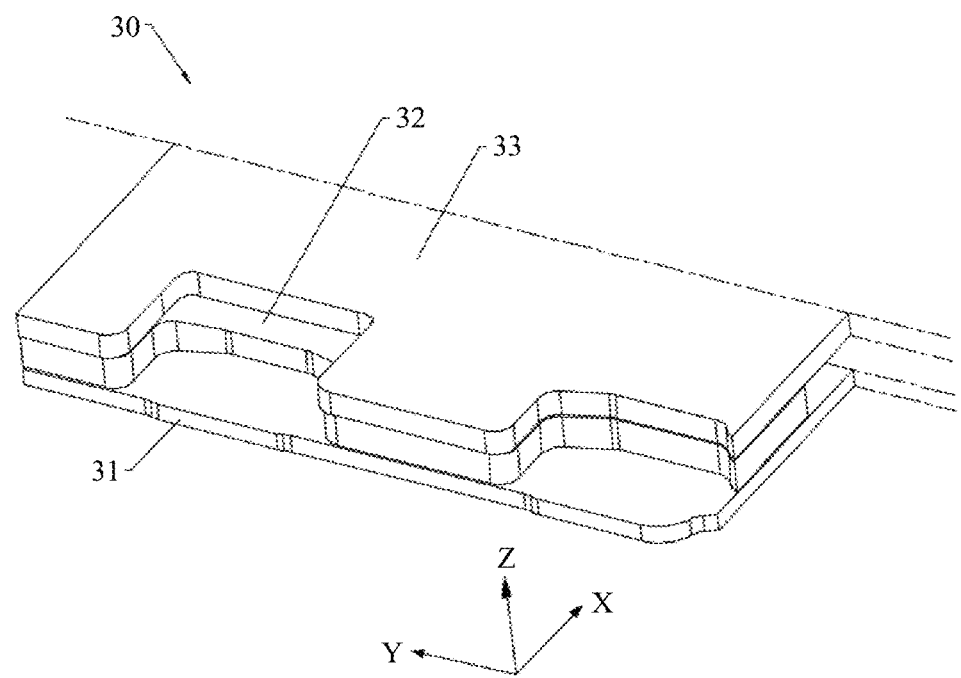
FIG. 8a is a partial schematic structural view of a circuit board assembly of an electronic device shown in FIG. 1 in another optional manner.

It may be understood that, FIG. 5 and FIG. 6 illustrate that the elevating board 32 and the second board 33 are disposed flush with each other. In another optional manner, the elevating board 32 and second board 33 may alternatively be staggered. Specifically, FIG. 8a is a partial schematic structural view of a circuit board assembly of an electronic device shown in FIG. 1 in another optional manner. A part of the elevating board 32 is staggered with the second board 33, that is, the part of the elevating board 32 protrudes relative to the second board 33. In this case, the elevating board 32 and the second board 33 form a stepped shape. It may be understood that, FIG. 8a illustrates that a part of the elevating board 32 protrudes along the X-axis direction relative to the second board 33. In another optional manner, a part of the elevating board 32 may alternatively protrude along the Y-axis direction relative to the second board 33.

Further referring to FIG. 5, the first board 31 is disposed away from the display screen 12 relative to the second board 33, that is, the first board 31 is located on one side of the second board 33 away from the display screen 12. In this case, the first board 31 is disposed close to the rear cover 22. The second board 33 is disposed close to the display screen 12.

The first board 31, the elevating board 32, and the second board 33 may all be rigid boards, flexible boards, or boards combining soft and hard characteristics. In addition, the first board 31, the elevating board 32, and the second board 33 may be FR-4 dielectric boards, Rogers (Rogers) dielectric boards, Rogers and FR-4 mixed media boards, or the like. FR-4 is the code name for a flame-resistant material grade, and the Rogers dielectric board is a high-frequency board.

In addition, the radio frequency transceiver chip 421 and the first matching circuit 422 are both located on the first board 31. It may be understood that, the first board 31 is disposed away from the display screen 12 relative to the second board 33. Therefore, compared with the solution of disposing the radio frequency transceiver chip 421 and the first matching circuit 422 on the second board 33, in this embodiment, both the radio frequency transceiver chip 421 and the first matching circuit 422 are disposed on the first board 31, so that distances from the radio frequency transceiver chip 421 and the first matching circuit 422 to the display screen 12 are longer. In this way, the internal circuit of the display screen 12 has less influence on the radio frequency transceiver chip 421 and the first matching circuit 422, that is, the performance of the antenna is better.

In addition, it should be noted that the positions of the radio frequency transceiver chip 421 and the first matching circuit 422 are not limited to the surface of the first board 31 facing the rear cover 22 illustrated in FIG. 5. For example, the radio frequency transceiver chip 421 and the first matching circuit 422 may alternatively be disposed inside the first board 31.

In another optional manner, the radio frequency transceiver chip 421 and the first matching circuit 422 may alternatively both be located on the elevating board 32 or the second board 33.

Figure 8B:
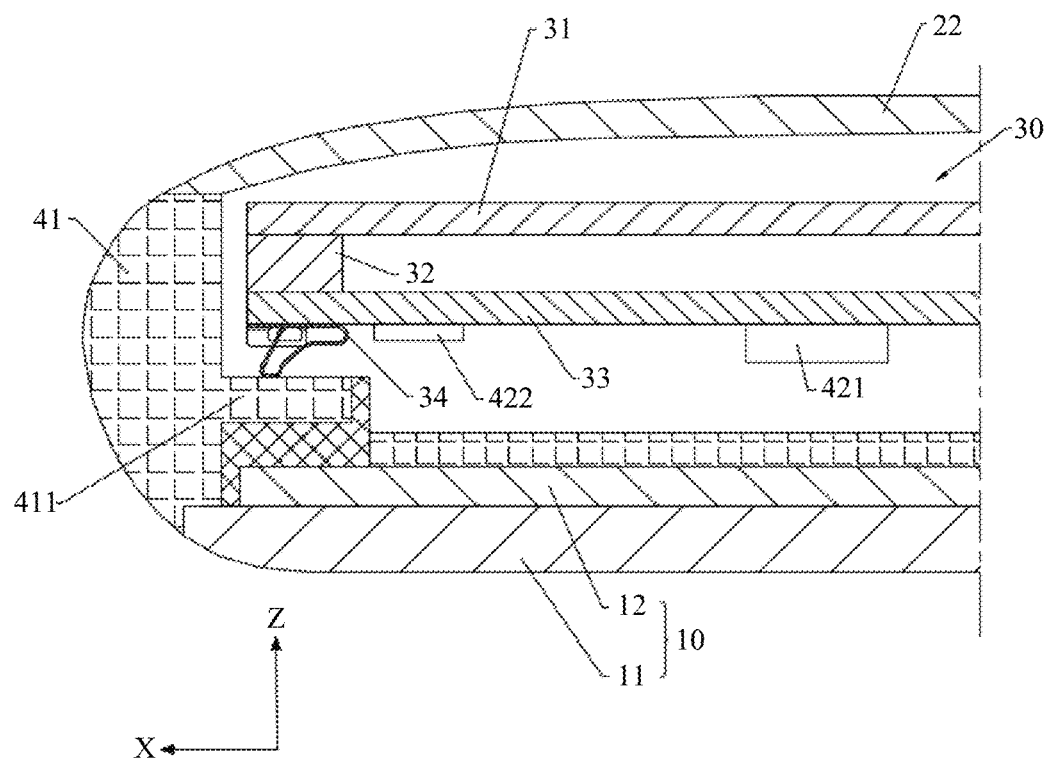
FIG. 8b is a partial cross-sectional view of an electronic device shown in FIG. 1 in another optional manner taken along a line B-B.

FIG. 8b is a partial cross-sectional view of an electronic device shown in FIG. 1 in another optional manner taken along a line B-B. It may be understood that, the schematic cross-sectional view illustrated in FIG. 8b is a cross-sectional view taken along a line B-B in the electronic device of FIG. 1 and viewed along the positive direction of the Y axis, and the cross-sectional view is rotated by 180° with the Y axis as the rotation axis to form a cross-sectional view illustrated in FIG. 8b. The first elastic piece 34 is fixed on the surface of the second board 33 facing the screen 10. The first elastic piece 34 is in elastic contact with the radiator 41 of the antenna. In this implementation, the radiator 41 includes a protrusion 411 facing the inside of the electronic device 100. In this case, the first elastic piece 34 is in elastic contact with the protrusion 411. In addition, the first elastic piece 34 is electrically connected between the first matching circuit 422 and the radiator 41. In this case, a contact point between the first elastic piece 34 and the radiator 41 is a feed point. In this way, the radio frequency signals transmitted by the radio frequency transceiver chip 421 can be transmitted to the radiator 41 via the first matching circuit 422 and the first elastic piece 34. In addition, after the radiator 41 converts the received electromagnetic wave signals into radio frequency signals, the radio frequency signals can further be transmitted to the radio frequency transceiver chip 421 via the first elastic piece 34 and the first matching circuit 422.

The drawbacks of the solution shown in FIG. 8b are as follows:

1. The first elastic piece 34 is disposed close to the display screen 12, that is, in the Z-axis direction, the distance between the first elastic piece 34 and the display screen 12 is relatively close. In this case, in the Z-axis direction, the protrusion 411 configured to be in contact with the first elastic piece 34 may alternatively be disposed close to the display screen 12 to a greater extent. In this way, the antenna clearance area between the bottom of the protrusion 411 and the display screen 12 is largely compressed. In this way, the display screen 12 may extremely easily affect the radiator 41 to transmit and receive electromagnetic wave signals, and the antenna performance is poor.
2. When both the first elastic piece 34 and the protrusion 411 are disposed close to the display screen 12, the contact point of the first elastic piece 34 in contact with the protrusion 411 is also arranged close to the display screen 12. In this way, the contact point (feed point) of the first elastic piece 34 in contact with the protrusion 411 is extremely easily affected by the display screen 12.
3. When the first elastic piece 34 is fixed on the surface of the second board 33 facing the screen 10, in the Z-axis direction, the thickness of the circuit board assembly 30 includes a thickness of the first elastic piece 34. In this case, the thickness of the circuit board assembly 30 is relatively large. When the circuit board assembly 30 is applied to the electronic device 100, the thickness of the electronic device 100 is also extremely easy to increase, which is not conducive to thinning design.
4. The radio frequency transceiver chip 421 and the first matching circuit 422 are disposed on the third board 33. The radio frequency transceiver chip 421 and the first matching circuit 422 are disposed close to the display screen 12, and are easily affected by the display screen 12.

In this embodiment, by arranging a structure of the circuit board assembly 30 and rearranging the related components of the antenna, the antenna has a wider clearance area, thereby significantly improving the antenna performance of the electronic device 100. Details are described as follows:

Further referring to FIG. 5 and FIG. 6, the first board 31 includes a first main body portion 311 and a first extension portion 312. The first main body portion 311, the elevating board 32, and the second board 33 are sequentially stacked along the Z-axis direction. The first extension portion 312 protrudes relative to the elevating board 32 and the second board 33. FIG. 5 illustrates that the first extension portion 312 protrudes along the X-axis direction relative to the elevating board 32 and the second board 33. The first extension portion 312 is disposed close to the radiator 41 relative to the first main body portion 311. In another optional manner, the first extension portion 312 may alternatively protrude along another direction, such as the Y-axis direction, relative to the elevating board 32 and the second board 33. which is not limited in this application.

In addition, the first elastic piece 34 is fixed to the first extension portion 312. Specifically, the first elastic piece 34 is fixed to one side of the first extension portion 312 facing the display screen 12. In this case, the first elastic piece 34, the elevating board 32, and the second board 33 are located on the same side of the first board 31. In addition, the first elastic piece 34 is in elastic contact with the radiator 41 of the antenna. In this implementation, the radiator 41 includes a protrusion 411 facing the inside of the electronic device 100. In this case, the first elastic piece 34 is in elastic contact with the protrusion 411. It may be understood that, a thickness of the protrusion 411 in the Z-axis direction in this optional manner may be correspondingly reduced according to actual needs, thereby avoiding the reduction of a clearance area between the protrusion 411 and the display screen 12 due to a relatively large size of the protrusion 411. In another optional manner, the radiator 41 may alternatively not be provided with a protrusion 411. Specifically, details are described below according to the corresponding accompanying drawing (FIG. 20a), which are not described herein again. In addition, in another embodiment, the first elastic piece 34 may alternatively be disposed on one side of the first board 31 facing the rear cover 22.

In addition, in an optional manner, by deoxidizing a surface of the protrusion 411 in contact with the first elastic piece 34 by the laser forming technology, it can be ensured that a position at which the protrusion 411 is in contact with the first elastic piece 34 has better electrical connection stability.

In addition, the first elastic piece 34 is electrically connected between the first matching circuit 422 of the radio frequency path 42 and the radiator 41. In this case, a contact point between the first elastic piece 34 and the radiator 41 is a feed point. In this way, the radio frequency signals transmitted by the radio frequency transceiver chip 421 can be transmitted to the radiator 41 via the first matching circuit 422 and the first elastic piece 34. In addition, after the radiator 41 converts the received electromagnetic wave signals into radio frequency signals, the radio frequency signals can further be transmitted to the radio frequency transceiver chip 421 via the first elastic piece 34 and the first matching circuit 422. In another optional manner, the position at which the first elastic piece 34 is in contact with the radiator 41 may alternatively be an antenna ground tuning point. Details are described below, which are not described herein again.

In this embodiment, by disposing the first extension portion 312 that protrudes relative to the elevating board 32 and the second board 33, and fixedly connecting the first elastic piece 34 to the first extension portion 312, the first elastic piece 34 is disposed away from the display screen 12, that is, in the Z-axis direction, the distance between the first elastic piece 34 and the display screen 12 becomes larger. In this case, in the Z-axis direction, the protrusion 411 configured to be in contact with the first elastic piece 34 may also be disposed away from the display screen 12 to a greater extent. In this way, the antenna clearance area between the bottom of the protrusion 411 and the display screen 12 is greatly increased, and the performance of the antenna is also better.

In addition, when both the first elastic piece 34 and the protrusion 411 are disposed away from the display screen 12, the contact point of the first elastic piece 34 in contact with the protrusion 411 may also be arranged away from the display screen 12. In this way, the contact point (feed point) of the first elastic piece 34 in contact with the protrusion 411 is less affected by the display screen 12.

In addition, the first elastic piece 34 is fixed to the first extension portion 312, so that the circuit between the first elastic piece 34 and the radio frequency transceiver chip 421 disposed on the first board 31 is made shorter. In this way, the transmission path of the radio frequency signals is shorter, and the transmission loss of the radio frequency signals is smaller, that is, the performance of the antenna is better.

In addition, compared with the solution of fixing the first elastic piece 34 on the second board 33, in this embodiment, the first elastic piece 34 is fixed on the first extension portion 312. Therefore, components and wiring (for example, antenna switches, inductors, capacitors or resistors) related to the antenna are no longer disposed on the elevating board 32 and the second board 33. In this way, on the one hand, the structure of the circuit board assembly 30 is more concise, that is, the assembly difficulty of the circuit board assembly 30 is reduced, and the cost investment of the circuit board assembly 30 is lower. On the other hand, more space can be freed up on the second board 33 to arrange more electronic components.

In addition, the radio frequency path 42 is electrically connected to the radiator 41 by the first elastic piece 34, which can ensure that the connection between the radio frequency path 42 and the radiator 41 is more stable. Specifically, because the first elastic piece 34 has an elastic force, when the first elastic piece 34 is in elastic contact with the radiator 41, the first elastic piece 34 can always be in contact with the radiator 41, thereby ensuring better connection stability between the radio frequency path 42 and the radiator 41.

In addition, it may be understood that, a space between a surface of the first extension portion 312 facing the display screen 12 and the radiator 41 is generally small. General chips or electronic components are not easy to be disposed in this region. In this case, the space is unused, which easily results in a waste of space. However, in this embodiment, the first elastic piece 34 with a relatively small size is fixed on the side of the first extension portion 312 facing the display screen 12. On the one hand, the space of this part can be effectively utilized, to improve the internal space utilization of the electronic device 100. On the other hand, compared with a case in which the first elastic piece 34 is disposed on the surface of the first board 31 facing the rear cover 22, in this embodiment, the space between the first board 31 and the rear cover 22 can save the space occupied by at least one first elastic piece 34. In this way, the saved space can be used for arranging more electronic components, thereby greatly improving the space utilization of the circuit board assembly 30.

Further referring to FIG. 5, a distance L from the contact point between the first elastic piece 34 and the radiator 41 to the display screen 12 is greater than or equal to 2 mm. For example, L equals 2 mm, 2.5 mm, 3 mm, 3.5 mm or 4 mm.

It may be understood that, when the distance L from the contact point between the first elastic piece 34 and the radiator 41 to the display screen 12 is greater than or equal to 2 mm, the first elastic piece 34 may be disposed away from the display screen 12 to a greater extent. In this case, in the Z-axis direction, the protrusion 411 may also be disposed away from the display screen 12 to a greater extent. In this way, the antenna clearance area between the bottom of the protrusion 411 and the display screen 12 is greatly increased, and the performance of the antenna is also better.

In addition, the distance L from the contact point between the first elastic piece 34 and the radiator 41 to the display screen 12 is less than or equal to 4.7 mm.

It may be understood that, when the distance L from the contact point between the first elastic piece 34 and the radiator 41 to the display screen 12 is less than or equal to 4.7 mm, on the one hand, it can be ensured that the first elastic piece 34 is disposed away from the display screen 12; and on the other hand, it can be ensured that the thickness of the electronic device 100 in the Z-axis direction is not too large, which is conducive for thinning configuration.

In this embodiment, there are a plurality of configuration manners for the circuit board assembly 30. Several configuration manners for the circuit board assembly 30 are described in detail below with reference to the related accompanying drawings.

First optional manner: Further referring to FIG. 6 and FIG. 7, the circuit board assembly 30 further includes a first strengthening board 35 and a second strengthening board 36. The first strengthening board 35 and the second strengthening board 36 are located on two sides of the first elastic piece 34 respectively. In the Z-axis direction, thicknesses of the first strengthening board 35 and the second strengthening board 36 are both larger than the thickness of the elevating board 32.

The first strengthening board 35 includes a first portion 351 and a second portion 352 connected to the first portion 351. The first portion 351 is fixedly connected to the board surface of the first extension portion 312 facing the screen 10. In this case, the first extension portion 312, the first portion 351, and the second portion 352 of the first board 31 are sequentially stacked along the Z-axis direction. The second strengthening board 36 includes a third portion 361 and a fourth portion 362 connected to the third portion 361. The third portion 361 is fixedly connected to the board surface of the first extension portion 312 facing the screen 10. In this case, the first extension portion 312, the third portion 361, and the fourth portion 362 of the first board 31 are sequentially stacked along the Z-axis direction. In addition, in FIG. 7, the first portion 351, the third portion 361, and the elevating board 32 are schematically distinguished by dashed lines, and the second portion 352, the fourth portion 362, and the second board 33 are schematically distinguished by dashed lines.

It may be understood that, by sequentially stacking the first portion 351 and the second portion 352 on one side of the first elastic piece 34 and on the first extension portion 312, and sequentially stacking the third portion 361 and the fourth portion 362 on the other side of the first elastic piece 34 and on the first extension portion 312, a thickness of a part of the first extension portion 312 in the Z-axis direction is increased, thereby significantly improving the structural strength of the first board 31. In this way, when the first elastic piece 34 is in elastic contact with the radiator 41, the first elastic piece 34 receives a reaction force of the radiator 41 of the antenna. The first elastic piece 34 transmits the reaction force to the first extension portion 312 of the first board 31. In this case, the first extension portion 312 may effectively counteract the force under the cooperation of the first portion 351, the second portion 352, the third portion 361, and the fourth portion 362, thereby avoiding the first extension portion 312 from being damaged or cracked due to an external force, and thus avoiding the disconnection of the circuit of the antenna.

Further referring to FIG. 7, the first portion 351 and the third portion 361 are fixedly connected to the elevating board 32.

In an optional manner, the first portion 351, the third portion 361, and the elevating board 32 are of an integrally formed structure. In other words, the first portion 351, the third portion 361, and the elevating board 32 are an integral board. In this case, the overall structural strength of the first portion 351, the third portion 361, and the elevating board 32 is better. In this way, the first portion 351, the third portion 361, and the elevating board 32 are not easy to fracture or crack when receiving an external force. In another optional manner, the first portion 351 and the third portion 361 may alternatively be fixedly connected to the elevating board 32 by a soldering process.

Further referring to FIG. 7, the second portion 352 and the fourth portion 362 are fixedly connected to the second board 33.

In an optional manner, the second portion 352, the fourth portion 362, and the second board 33 are of an integrally formed structure. In other words, the second portion 352, the fourth portion 362, and the second board 33 are an integral board. In this case, the connection of the second portion 352, the fourth portion 362, and the second board 33 is firmer. In this way, the second portion 352, the fourth portion 362, and the second board 33 are not easy to fracture or crack when receiving an external force. In another optional manner, the second portion 352 and the fourth portion 362 may alternatively be connected to the second board 33 by a soldering process.

Figure 9:
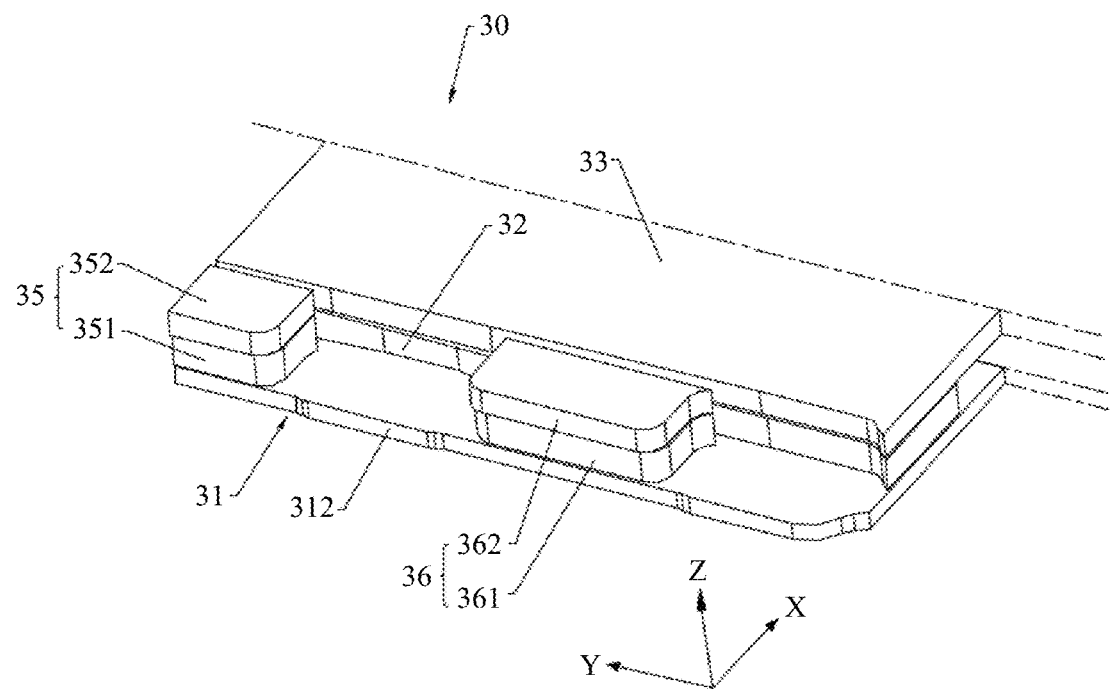
FIG. 9 is a partial schematic structural view of a circuit board assembly of an electronic device shown in FIG. 1 in still another optional manner.

FIG. 9 is a partial schematic structural view of a circuit board assembly of an electronic device shown in FIG. 1 in still another optional manner. The first portion 351 of the first strengthening board 35 and the third portion 361 of the second strengthening board 36 may be disposed separately from the elevating board 32. That is, the first portion 351 and the third portion 361 are directly fixed to the first extension portion 312 of the first board 31, and do not need to be fixedly connected to the elevating board 32.

In addition, the second portion 352 of the first strengthening board 35 and the fourth portion 362 of the second strengthening board 36 may be disposed separately from the second board 33. That is, the second portion 352 and the fourth portion 362 are directly fixed to the first extension portion 312 of the first board 31, and do not need to be fixedly connected to the second board 33.

In this implementation, by sequentially stacking the first portion 351 and the second portion 352 on the first extension portion 312, and sequentially stacking the third portion 361 and the fourth portion 362 on the first extension portion 312, the structural strength of the first board 31 is significantly improved.

In addition, the first portion 351, the third portion 361, and the elevating board 32 are disposed separately. Therefore, the selection of materials of the first portion 351 and the third portion 361 are not limited to the same material as the elevating board 32. For example, the first portion 351 and the third portion 361 may be made of low-cost rigid plastic plates.

In addition, the second portion 352, the fourth portion 362, and the second board 33 are disposed separately. Therefore, the selection of materials of the second portion 352 and the fourth portion 362 are not limited to the same material as the second board 33. For example, the second portion 352 and the fourth portion 362 may be made of lower cost rigid plastic plates.

Figure 10:
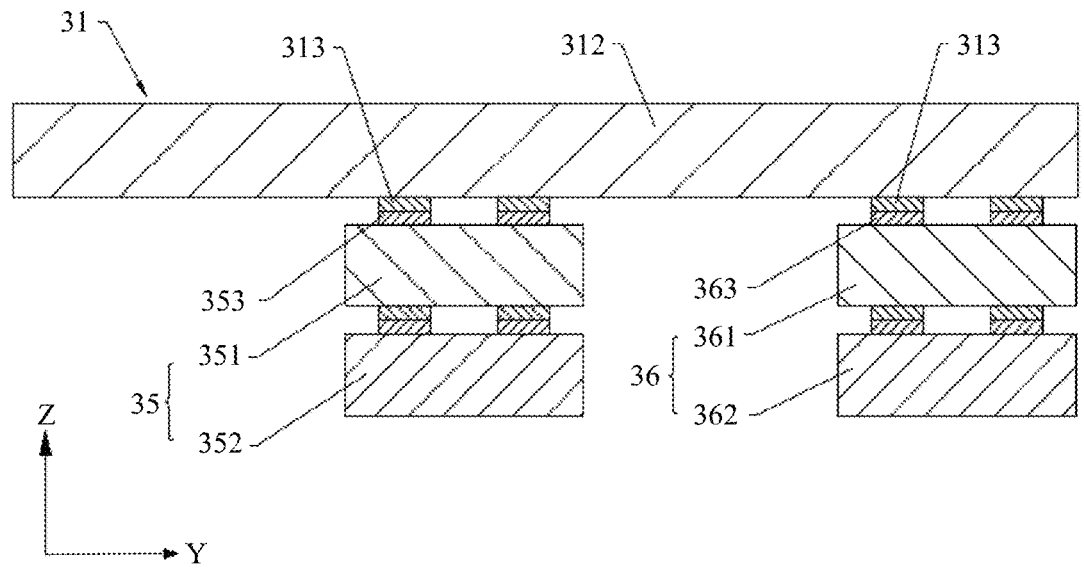
FIG. 10 is a schematic cross-sectional view of a circuit board assembly shown in FIG. 6 taken along a line C-C.

With reference to FIG. 6, FIG. 10 is a schematic cross-sectional view of a circuit board assembly shown in FIG. 6 taken along a line C-C. It may be understood that, the cross-sectional view illustrated in FIG. 10 is a cross-sectional view taken along a line C-C in the circuit board assembly of FIG. 6 and viewed along the negative direction of the X axis. The first portion 351 of the first strengthening board 35 is provided with a first strengthening solder pad 353. The first extension portion 312 of the first board 31 is provided with a second strengthening solder pad 313. The first strengthening solder pad 353 is soldered to the second strengthening solder pad 313. It may be understood that, when the first portion 351 and the first extension portion 312 are soldered together by the first strengthening solder pad 353 and the second strengthening solder pad 313, the connection between the first portion 351 and the first extension portion 312 is firmer, and the overall strength of the circuit board assembly 30 is better. In addition, after the first strengthening solder pad 353 and the second strengthening solder pad 313 are soldered together, the first strengthening solder pad 353 and the second strengthening solder pad 313 can effectively protect a solder pad (the solder pad of this part is mainly configured for the electrical connection between wiring of the first board 31 and wiring of the elevating board 32) between the first main body portion 311 of the first board 31 and the elevating board 32. That is, the solder pad between the first main body portion 311 and the elevating board 32 is avoided from easily breaking due to an external force.

In addition, the third portion 361 of the second strengthening board 36 is further provided with a third strengthening solder pad 363. The third strengthening solder pad 363 is soldered to the second strengthening solder pad 313. It may be understood that, when the third portion 361 and the first extension portion 312 are soldered together by the third strengthening solder pad 363 and the second strengthening solder pad 313, the connection between the third portion 361 and the first extension portion 312 is firmer, and the overall strength of the circuit board assembly 30 is better. In addition, after the third strengthening solder pad 363 and the second strengthening solder pad 313 are soldered together, the third strengthening solder pad 363 and the second strengthening solder pad 313 can effectively protect a solder pad (the solder pad of this part is mainly configured for the electrical connection between wiring of the first board 31 and wiring of the elevating board 32) between the first main body portion 311 of the first board 31 and the elevating board 32. That is, the solder pad between the first main body portion 311 and the elevating board 32 is avoided from easily breaking due to an external force.

In another optional manner, the first portion 351 and the second portion 352 of the first strengthening board 35 may alternatively be soldered together by a solder pad. In this case, the connection between the first portion 351 and the second portion 352 is firmer, and the overall strength of the circuit board assembly 30 is better. In addition, after the first portion 351 and the second portion 352 are soldered together by a solder pad, a solder pad (the solder pad of this part is mainly configured for the electrical connection between the wiring of the elevating board 32 and the wiring of the second board 33) located between the elevating board 32 and the second board 33 is not easily broken due to an external force.

In addition, the third portion 361 and the fourth portion 362 of the second strengthening board 36 may alternatively be soldered together by a solder pad. In this case, the connection between the third portion 361 and the fourth portion 362 is firmer, and the overall strength of the circuit board assembly 30 is better. In addition, after the third portion 361 and the fourth portion 362 are soldered together by a solder pad, a solder pad (the solder pad of this part is mainly configured for the electrical connection between the wiring of the elevating board 32 and the wiring of the second board 33) located between the elevating board 32 and the second board 33 is not easily broken due to an external force.

Figure 11:
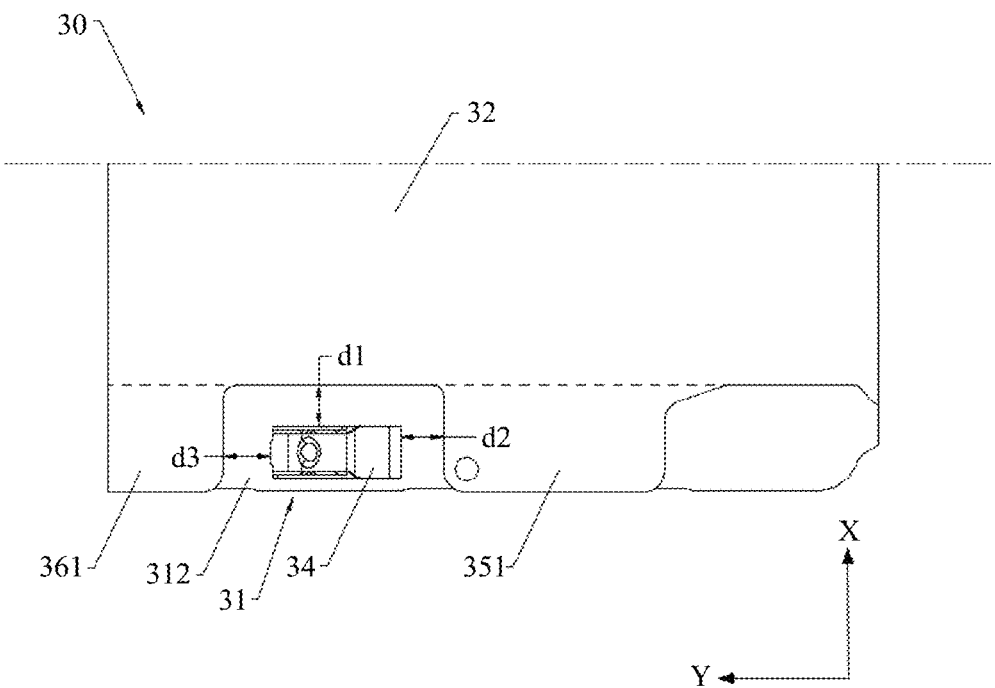
FIG. 11 is a partial schematic structural view of a circuit board assembly shown in FIG. 6 from another angle.

FIG. 11 is a partial schematic structural view of a circuit board assembly shown in FIG. 6 from another angle. A distance d1 between the first elastic piece 34 and the elevating board 32 ranges from 0.15 mm to 30 mm. It may be understood that, in FIG. 6, the elevating board 32 and the second board 33 are disposed flush with each other. In this case, the elevating board 32 is just blocked by the second board 33 at an angle of FIG. 11. In this case, in order to be able to clearly see the elevating board 32, the second board 33 is no longer illustrated in FIG. 11.

In this implementation, when the distance d1 between the first elastic piece 34 and the elevating board 32 ranges from 0.15 mm to 30 mm, the size of the first extension portion 312 located between the first elastic piece 34 and the elevating board 32 is relatively moderate. In this way, when the first elastic piece 34 is in elastic contact with the radiator 41, the first elastic piece 34 receives a reaction force of the radiator 41. The first elastic piece 34 transmits the reaction force to the first extension portion 312. In this case, the first extension portion 312 located between the first elastic piece 34 and the elevating board 32 is not easy to fracture or crack. In other words, the reaction force received by the first extension portion 312 can be rapidly transmitted to the elevating board 32, so that the reaction force is counteracted by an internal stress of the elevating board 32.

Referring to FIG. 11 again, a distance d2 between the first elastic piece 34 and the first portion 351 ranges from 0.15 mm to 30 mm. It may be understood that, the second portion 352 is also not illustrated in FIG. 11. In this case, the size of the first extension portion 312 located between the first elastic piece 34 and the first portion 351 is relatively moderate. In this way, when the first elastic piece 34 is in elastic contact with the radiator 41 of the antenna, the first elastic piece 34 receives a reaction force of the radiator 41. The first elastic piece 34 transmits the reaction force to the first extension portion 312. In this case, the first extension portion 312 located between the first elastic piece 34 and the first portion 351 is not easy to fracture or crack. In other words, the reaction force received by the first extension portion 312 can be rapidly transmitted to the first portion 351, so that the reaction force is counteracted by an internal stress of the first portion 351.

Referring to FIG. 11 again, a distance d3 between the first elastic piece 34 and the third portion 361 ranges from 0.15 mm to 30 mm. It may be understood that, the fourth portion 362 is also not illustrated in FIG. 11. In this case, the size of the first extension portion 312 located between the first elastic piece 34 and the third portion 361 is relatively moderate. In this way, when the first elastic piece 34 is in elastic contact with the radiator 41 of the antenna, the first elastic piece 34 receives a reaction force of the radiator 41. The first elastic piece 34 transmits the reaction force to the first extension portion 312. In this case, the first extension portion 312 located between the first elastic piece 34 and the third portion 361 is not easy to fracture or crack. In other words, the reaction force received by the first extension portion 312 can be rapidly transmitted to the third portion 361, so that the reaction force is counteracted by an internal stress of the third portion 361.

Figure 12:
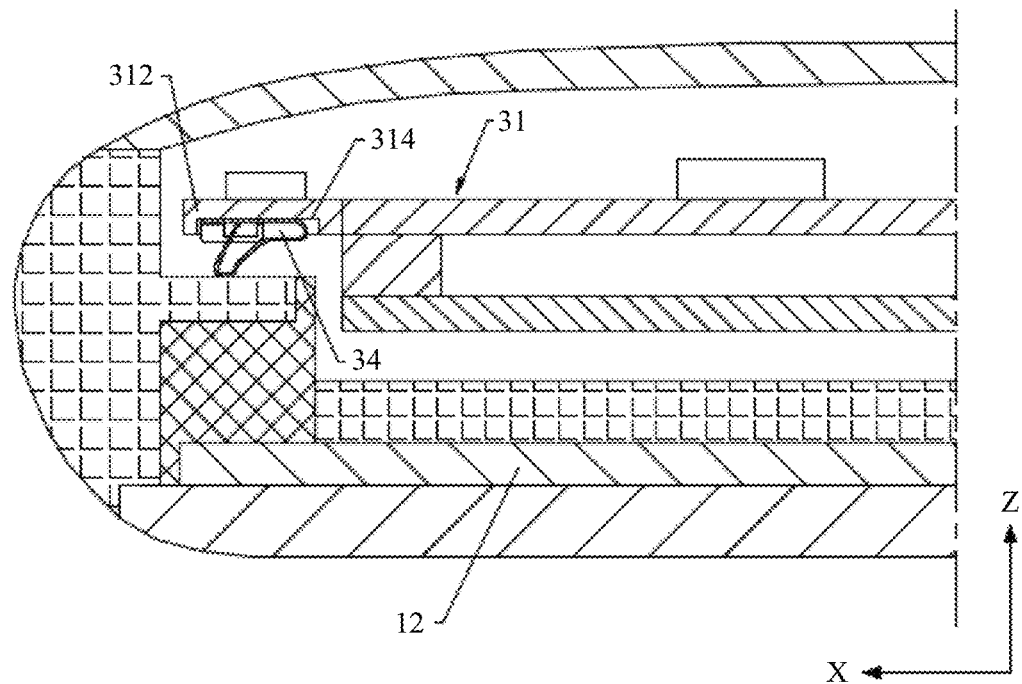
FIG. 12 is a partial cross-sectional view of an electronic device shown in FIG. 1 in still another optional manner taken along a line B-B.

FIG. 12 is a partial cross-sectional view of an electronic device shown in FIG. 1 in still another optional manner taken along a line B-B. It may be understood that, the cross-sectional view illustrated in FIG. 12 is a cross-sectional view formed by taking a cross section from the electronic device of FIG. 1 along a line B-B and viewing along the positive direction of the Y axis, and then rotating the obtained cross-sectional view by 180° with the Y axis as the rotation axis. The first extension portion 312 of the first board 31 is provided with a groove 314. An opening of the groove 314 is located on a surface of the first extension portion 312 facing the display screen 12. A part of the first elastic piece 34 is mounted in the groove 314.

It may be understood that, when a part of the first elastic piece 34 is mounted in the groove 314, in the Z-axis direction, there is an overlapping region between the first elastic piece 34 and the first extension portion 312. In this case, the first elastic piece 34 can be disposed further away from the display screen 12, that is, in the Z-axis direction, the distance between the first elastic piece 34 and the display screen 12 can be significantly increased. In this case, the distance from the contact point between the first elastic piece 34 and the radiator 41 to the display screen 12 is significantly increased. In this way, in the Z-axis direction, the protrusion 411 of the radiator 41 can also be disposed in a direction away from the display screen 12, that is, the antenna clearance area between the bottom of the protrusion 411 and the display screen 12 can be made larger, and the performance of the antenna is also better.

In an optional manner, when the first extension portion 312 is provided with the first strengthening board 35 and the second strengthening board 36, the groove 314 is located between the first strengthening board 35 and the second strengthening board 36. In this case, the first strengthening board 35 and the second strengthening board 36 may improve the strength of the first extension portion 312, thereby avoiding the strength of the first extension portion 312 from being reduced due to the groove 314 being opened.

Figure 13A:
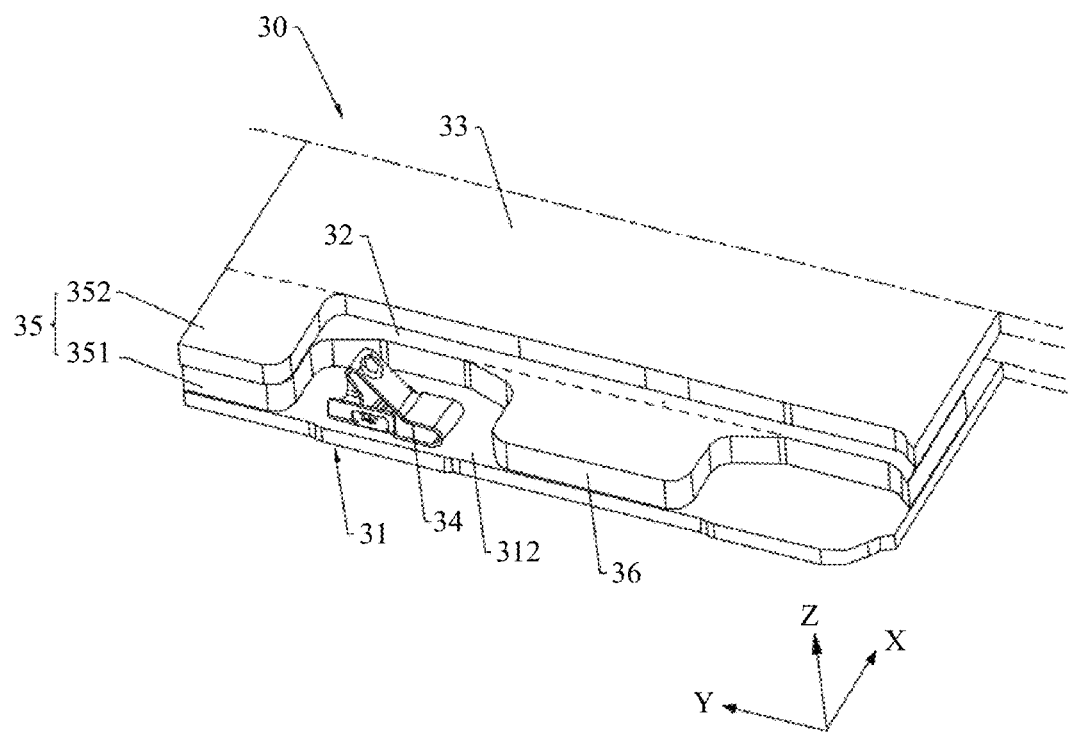
FIG. 13a is a partial schematic structural view of a circuit board assembly of an electronic device shown in FIG. 1 in still another optional manner.

Second optional manner: The same technical contents of the second optional manner as in the first optional manner are not repeated again. FIG. 13a is a partial schematic structural view of a circuit board assembly of an electronic device shown in FIG. 1 in yet another optional manner. The circuit board assembly 30 further includes a first strengthening board 35 and a second strengthening board 36. The first strengthening board 35 and the second strengthening board 36 are located on two sides of the first elastic piece 34 respectively. The thickness of the first strengthening board 35 is greater than that of the elevating board 32 in the Z-axis direction. The thickness of the second strengthening board 36 is less than or equal to the thickness of the elevating board 32.

The first strengthening board 35 includes a first portion 351 and a second portion 352 connected to the first portion 351. The first portion 351 is fixedly connected to the board surface of the first extension portion 312 facing the screen 10. In this case, the first extension portion 312, the first portion 351, and the second portion 352 of the first board 31 are sequentially stacked along the Z-axis direction. In this way, the thickness of a part of the first extension portion 312 in the Z-axis direction is increased.

In addition, different from the first optional manner, the second strengthening board 36 no longer includes the fourth portion 362, that is, the second strengthening board 36 includes only the third portion 361 in the first optional manner. The second strengthening board 36 is fixedly connected to a board surface of the first extension portion 312 facing the screen 10. In this case, the first extension portion 312 of the first board 31 and the second strengthening board 36 are stacked in the Z-axis direction.

It may be understood that, by sequentially stacking the first portion 351 and the second portion 352 on one side of the first elastic piece 34 and on the first extension portion 312, and stacking the second strengthening board 36 on the other side of the first elastic piece 34 and on the first extension portion 312, the structural strength of the first board 31 is significantly improved. In this way, when the first elastic piece 34 is in elastic contact with the radiator 41 of the antenna, the first elastic piece 34 receives a reaction force of the radiator 41. The first elastic piece 34 transmits the reaction force to the first extension portion 312. In this case, with the cooperation of the first strengthening board 35 and the second strengthening board 36, the first extension portion 312 can effectively counteract the force, thereby avoiding the first extension portion 312 from being damaged or cracked due to an external force, and thus avoiding the disconnection of the circuit of the antenna.

In this implementation, FIG. 13*a* shows that the elevating board 32 and the second board 33 are disposed staggered in the X-axis direction, that is, a part of the elevating board 32 protrudes in the X-axis direction relative to the second board 33. In another optional manner, the elevating board 32 may alternatively be disposed flush with the second board 33.

In another optional manner, the configuration manner for the circuit board assembly 30 may refer to the configuration manner for the circuit board assembly 30 in the first optional manner. In an example, the connection relationships of the first strengthening board 35 with the second strengthening board 36 and the first strengthening board 35 with the elevating board 32 may refer to the connection relationships of the first strengthening board 35 with the second strengthening board 36 and with the elevated board 32 in the first optional manner. In another example, the position relationships of the first elastic piece 34 respectively with the elevating board 32, the first strengthening board 35, and the second strengthening board 36 may also refer to the position relationships of the first elastic piece 34 respectively with the elevated board 32, the first strengthening board 35, and the second strengthening board 36 in the first optional manner. Details are not described herein again.

Figure 13B:
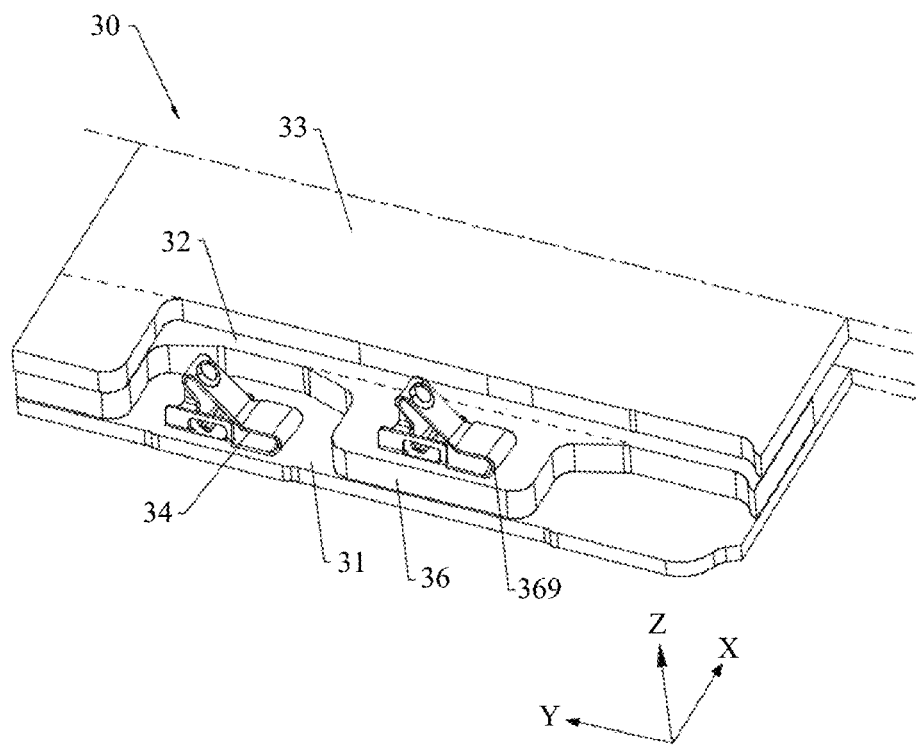
FIG. 13b is a partial schematic structural view of a circuit board assembly of an electronic device shown in FIG. 1 in still another optional manner.

FIG. 13*b* is a partial schematic structural view of a circuit board assembly of an electronic device shown in FIG. 1 in still yet another optional manner. In this implementation, the circuit board assembly 30 further includes a ground conductive member 369. The configuration manner for the ground conductive member 369 may refer to the configuration manner for the first elastic piece 34. The ground conductive member 369 is disposed on a surface of the second strengthening board 36 facing away from the first board 31. The ground conductive member 369 is electrically connected to a ground point, that is, the ground conductive member 369 is grounded. Certainly, in another optional manner, the ground conductive member 369 may also be used in other antennas.

In this implementation, the ground conductive member 369 is disposed on the second strengthening board 36, so that the ground conductive member 369 is used for grounding the radiator 41, or used in other antennas. In this way, the functions of the circuit board assembly 30 can be further increased. In addition, the space on the second strengthening board 36 can also be effectively used, that is, the space utilization of the circuit board assembly 30 is improved.

In an optional manner, when the second strengthening board 36 and the elevating board 32 are of an integrally formed structure, wiring is arranged in the second strengthening board 36, and thereby the wiring in the second strengthening board 36 is electrically connected to the wiring in the elevating board 32, or the wiring in the second strengthening board 36 is electrically connected to the wiring of the first board 31.

In another optional manner, when the second strengthening board 36 and the elevating board 32 are disposed separately, wiring is arranged in the second strengthening board 36, and thereby the wiring in the second strengthening board 36 is electrically connected to the wiring of the first board 31.

Figure 14:
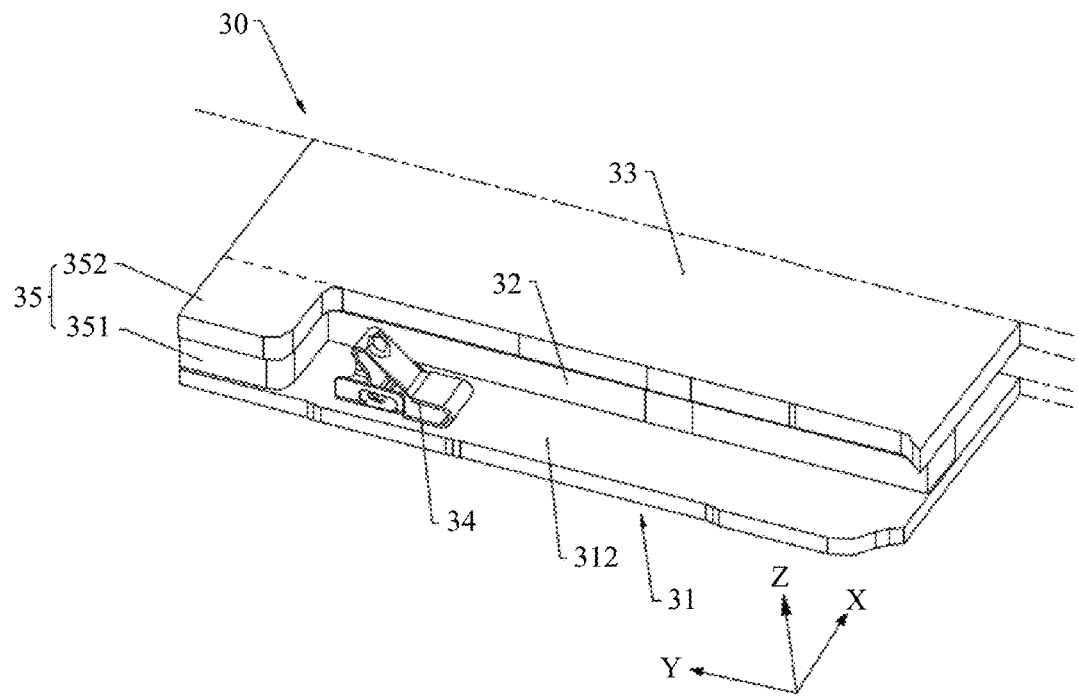
FIG. 14 is a partial schematic structural view of a circuit board assembly of an electronic device shown in FIG. 1 in still another optional manner.

Third optional manner: The same technical contents of the third optional manner as in the first optional manner and the second optional manner are not repeated again. FIG. 14 is a partial schematic structural view of a circuit board assembly of an electronic device shown in FIG. 1 in still another optional manner. The circuit board assembly 30 includes a first strengthening board 35. The first strengthening board 35 is located on one side of the first elastic piece 34. In the Z-axis direction, the thickness of the first strengthening board 35 is greater than that of the elevating board 32.

The first strengthening board 35 includes a first portion 351 and a second portion 352 connected to the first portion 351. The first portion 351 is fixedly connected to the board surface of the first extension portion 312 facing the screen 10. In this case, the first extension portion 312, the first portion 351, and the second portion 352 of the first board 31 are sequentially stacked along the Z-axis direction.

It may be understood that, the first strengthening board 35 is stacked on one side of the first elastic piece 34 and on the first extension portion 312, so that the structural strength of the first board 31 is significantly improved. In this way, when the first elastic piece 34 is in elastic contact with the radiator 41 of the antenna, the first elastic piece 34 receives a reaction force of the radiator 41 of the antenna. The first elastic piece 34 transmits the reaction force to the first extension portion 312 of the first board 31. In this case, with the cooperation of the first strengthening board 35, the first extension portion 312 can effectively counteract the force, thereby avoiding the first extension portion 312 from being damaged or cracked due to an external force, and thus avoiding the disconnection of the circuit of the antenna.

In this implementation, FIG. 0.14 shows that the elevating board 32 and the second board 33 are disposed flush with each other. In another optional manner, alternatively, a part of the elevating board 32 may be staggered from the second board 33 in the X-axis direction, that is, a part of the elevating board 32 protrudes in the X-axis direction relative to the second board 33.

In another optional manner, for the configuration manner for the circuit board assembly 30, reference may be made to the configuration manner for the circuit board assembly 30 in the first optional manner. In an example, the connection relationship of the first strengthening board 35 with the elevating board 32 may refer to the connection relationship of the first strengthening board 35 with the elevating board 32 in the first optional manner. In another example, the position relationships of the first elastic piece 34 respectively with the elevating board 32 and the first strengthening board 35 may also refer to the position relationships of the first elastic piece 34 respectively with the elevating board 32 and the first strengthening board 35 in the first optional manner. Details are not described herein again.

Figure 15:
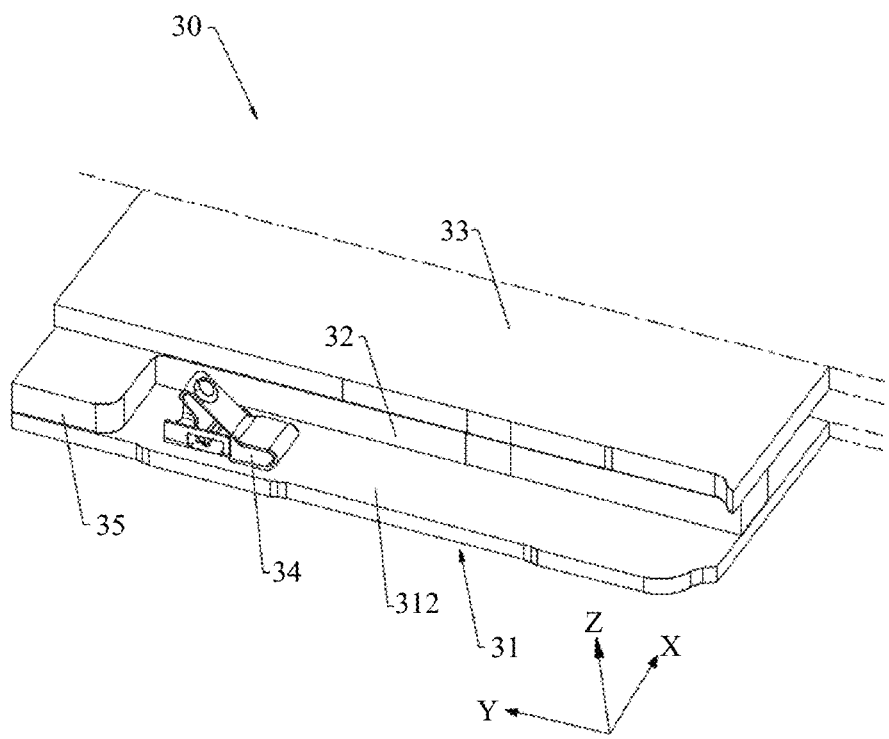
FIG. 15 is a partial schematic structural view of a circuit board assembly of an electronic device shown in FIG. 1 in still another optional manner.

Fourth optional manner: The same technical contents of the fourth optional manner as in the first optional manner are not repeated again. FIG. 15 is a partial schematic structural view of a circuit board assembly of an electronic device shown in FIG. 1 in still another optional manner. The circuit board assembly 30 includes a first strengthening board 35. The first strengthening board 35 is located on one side of the first elastic piece 34. In addition, the first extension portion 312 of the first board 31 and the first strengthening board 35 are stacked in the Z-axis direction. In the Z-axis direction, the thickness of the first strengthening board 35 is less than or equal to the thickness of the elevating board 32. It may be understood that, different from the foregoing optional manners, the first strengthening board 35 no longer includes the second portion 352, that is, the first strengthening board 35 includes only the first portion 351 in the first optional manner.

It may be understood that, by stacking the first strengthening board 35 on one side of the first elastic piece 34 and on the first extension portion 312, the structural strength of the first board 31 is significantly improved. In this way, when the first elastic piece 34 is in elastic contact with the radiator 41 of the antenna, the first elastic piece 34 receives a reaction force of the radiator 41 of the antenna. The first elastic piece 34 transmits the reaction force to the first extension portion 312 of the first board 31. In this case, with the cooperation of the first strengthening board 35, the first extension portion 312 can effectively counteract the force, thereby avoiding the first extension portion 312 from being damaged or cracked due to an external force.

In this implementation, FIG. 0.15 shows that the elevating board 32 and the second board 33 are disposed flush with each other. In another optional manner, a part of the elevating board 32 and the second board 33 may alternatively be disposed staggered in the X-axis direction, that is, a part of the elevating board 32 protrudes in the X-axis direction relative to the second board 33.

In another optional manner, for the configuration manner for the circuit board assembly 30, reference may be made to the configuration manner for the circuit board assembly 30 in the first optional manner. In an example, the connection relationship of the first strengthening board 35 with the elevating board 32 may refer to the connection relationship of the first strengthening board 35 with the elevating board 32 in the first optional manner. In another example, the position relationships of the first elastic piece 34 respectively with the elevating board 32 and the first strengthening board 35 may also refer to the position relationships of the first elastic piece 34 respectively with the elevating board 32 and the first strengthening board 35 in the first optional manner. Details are not described herein again.

Figure 16:
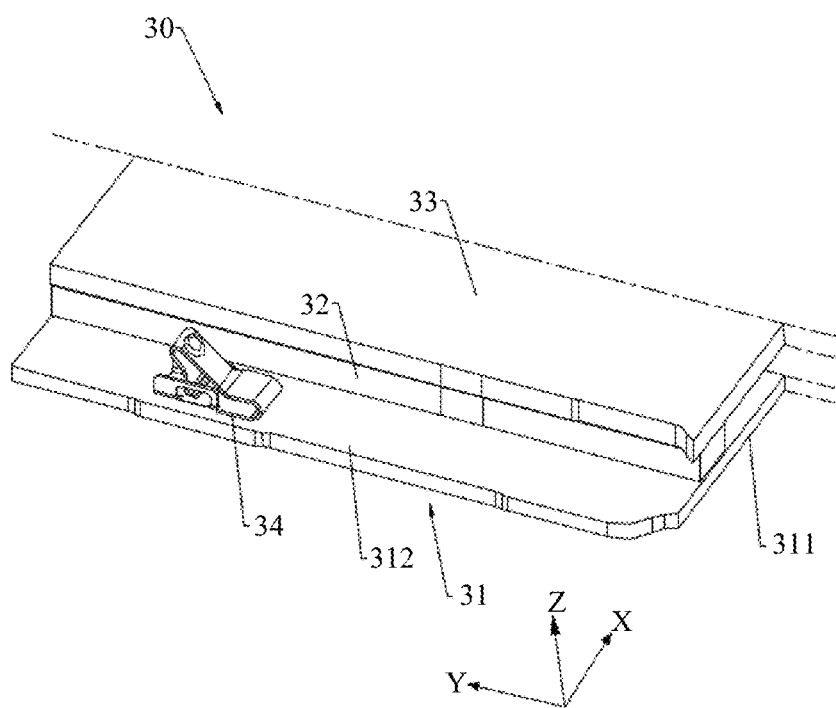
FIG. 16 is a partial schematic structural view of a circuit board assembly of an electronic device shown in FIG. 1 in still another optional manner.

Fifth optional manner: The same technical contents of the fifth optional manner as in the first optional manner are not repeated again. FIG. 16 is a partial schematic structural view of a circuit board assembly of an electronic device shown in FIG. 1 in still another optional manner. The circuit board assembly 30 no longer includes the first strengthening board 35 and the second strengthening board 36. In this way, the space of the first extension portion 312 is wider. In this case, a part of the first matching circuit 422 may be arranged on the first extension portion 312, so that the first main body portion 311 of the first board 31 can arrange more electronic components, thereby significantly improving the space utilization of the circuit board assembly 30.

In this implementation, FIG. 0.16 shows that the elevating board 32 and the second board 33 are disposed flush with each other. In another optional manner, alternatively, a part of the elevating board 32 may be staggered from the second board 33 in the X-axis direction, that is, a part of the elevating board 32 protrudes in the X-axis direction relative to the second board 33.

In another optional manner, for the configuration manner for the circuit board assembly 30, reference may be made to the configuration manner for the circuit board assembly 30 in the first optional manner. For example, the position relationship of the first elastic piece 34 with the elevating board 32 may also refer to the position relationship of the first elastic piece 34 with the elevating board 32 in the first optional manner. Details are not described herein again.

Figure 17:
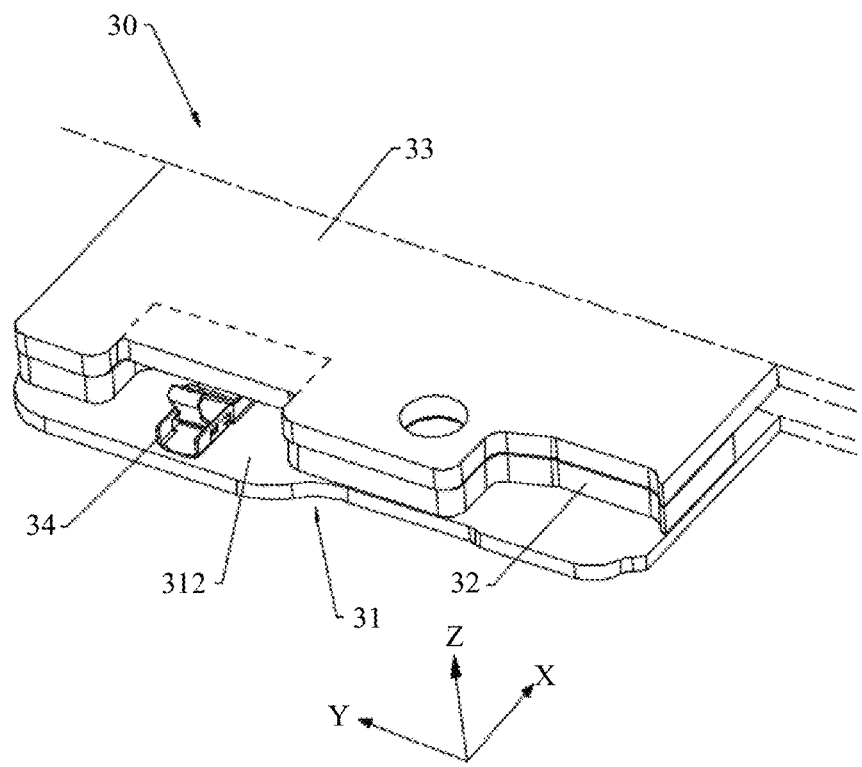
FIG. 17 is a partial schematic structural view of a circuit board assembly of an electronic device shown in FIG. 1 in still another optional manner.

Sixth optional manner: The same technical contents of the sixth optional manner as in the first optional manner are not repeated again. FIG. 17 is a partial schematic structural view of a circuit board assembly of an electronic device shown in FIG. 1 in still another optional manner. In this implementation, a part of the second board 33 protrudes relative to the elevating board 32. In this case, the protruding part of the second board 33 relative to the elevating board 32 (the region indicated by a dashed line in FIG. 17) is disposed opposite the first extension portion 312 of the first board 31.

In addition, a part of the first elastic piece 34 extends between the first board 31 and the second board 33, that is, a part of the first elastic piece 34 is located between the second board 33 and the first board 31. A part of the first elastic piece 34 protrudes relative to the second board 33. It may be understood that, a part of the first elastic piece 34 with a lower height in the Z-axis direction may extend between the first board 31 and the second board 33. A part of the first elastic piece 34 with a higher height in the Z-axis direction protrudes relative to the second board 33.

In this implementation, a part of the first elastic piece 34 extends between the first board 31 and the second board 33, so that the first elastic piece 34 is protected by using the second board 33, thereby avoiding the first elastic piece 34 from being collided with other components in the electronic device 100. In addition, when the second board 33 protrudes relative to the elevating board 32, the board surface area of the second board 33 is increased significantly. In this case, more electronic components can be arranged in the second board 33, that is, more electronic components can be arranged in the circuit board assembly 30, thereby facilitating the implementation of the multifunctional needs of the electronic device 100.

Several configuration manners for the circuit board assembly 30 are described above in detail with reference to the associated drawings, and in the following, several configuration manners for electrically connecting the first elastic piece 34 to the radiator 41 are described in detail with reference to the associated drawings.

Figure 18:
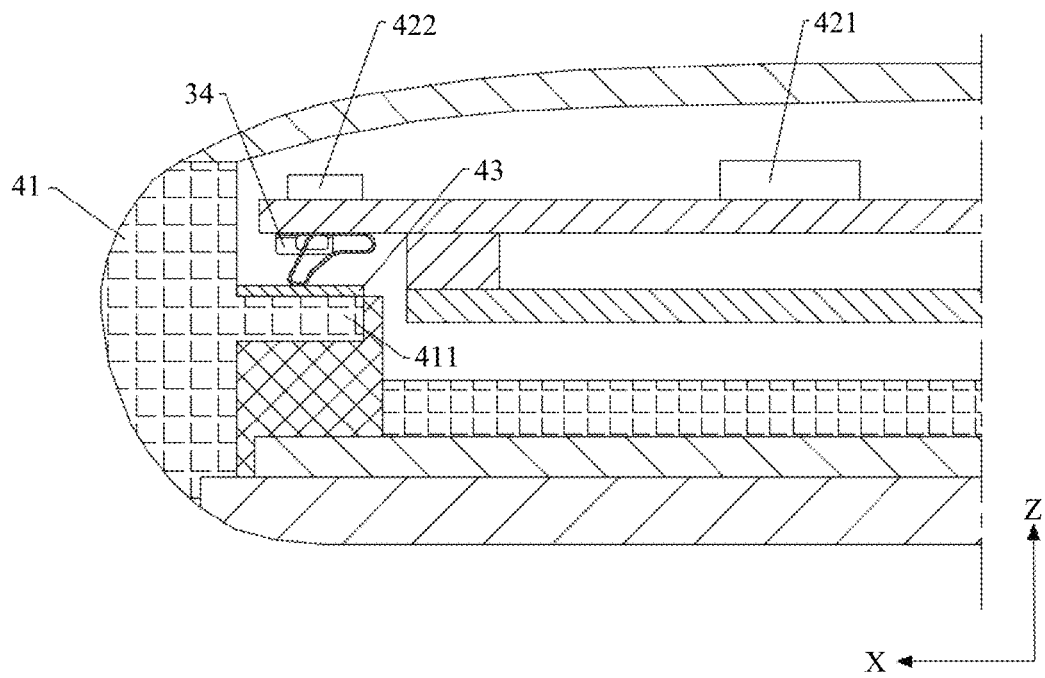
FIG. 18 is a partial cross-sectional view of an electronic device shown in FIG. 1 in still another optional manner taken along a line B-B.

FIG. 18 is a partial cross-sectional view of an electronic device shown in FIG. 1 in still another optional manner taken along a line B-B. It may be understood that, the cross-sectional view illustrated in FIG. 18 is a cross-sectional view formed by taking a cross section from the electronic device of FIG. 1 along a line B-B and viewing along the positive direction of the Y axis, and then rotating the obtained cross-sectional view by 180° with the Y axis as the rotation axis. A conductive piece 43 is disposed on a surface of the radiator 41 facing the first elastic piece 34. The conductive piece 43 may be, but is not limited to, a gold piece, a silver piece, or a copper piece. Specifically, the conductive piece 43 is disposed in the protrusion 411. In an optional manner, the conductive piece 43 may be connected to the radiator 41 by a soldering process. In this case, the connection between the conductive piece 43 and the radiator 41 is firmer. Certainly, in other optional manners, the conductive piece 43 may alternatively be fixedly connected to the radiator 41 by a conductive glue.

In addition, the first elastic piece 34 is in elastic contact with the conductive piece 43. In other words, the first elastic piece 34 is electrically connected to the radiator 41 through the conductive piece 43. In this way, when the radio frequency transceiver chip 421 transmits a radio frequency signal, the radio frequency signal is transmitted to the radiator 41 via the first matching circuit 422, the first elastic piece 34, and the conductive piece 43. In addition, when the radiator 41 receives an electromagnetic wave signal and converts the electromagnetic wave signal into a radio frequency signal, the radio frequency signal is transmitted to the radio frequency transceiver chip 421 via the conductive piece 43, the first elastic piece 34, and the first matching circuit 422.

It may be understood that, when the radiator 41 is provided with the conductive piece 43, the conductive piece 43 can increase the surface flatness of the radiator 41. In this case, when the first elastic piece 34 is in elastic contact with the radiator 41 through the conductive piece 43, the elastic contact of the first elastic piece 34 with the radiator 41 is stable. In this way, the radio frequency signal is also stable in the process of being transmitted between the radiator 41 and the first elastic piece 34, thereby ensuring better antenna performance of the electronic device 100.

In an optional manner, the oxidation resistance of the conductive piece 43 is higher than that of the radiator 41. It may be understood that, in an environment with the same temperature and humidity, the conductive piece 43 is not easy to be oxidized compared to the radiator 41. In this way, compared with the solution in which the first elastic piece 34 is in direct elastic contact with the radiator 41, the contact resistance of the first elastic piece 34 with the conductive piece 43 is less, that is, the contact resistance of the first elastic piece 34 with the conductive piece 43 is stable, and the transmission loss of the radio frequency signal is less. In this case, the antenna performance of the electronic device 100 is better.

In other optional manners, alternatively, the oxidation resistance of the conductive piece 43 may be equal to or lower than that of the radiator 41 of the antenna.

Figure 19:
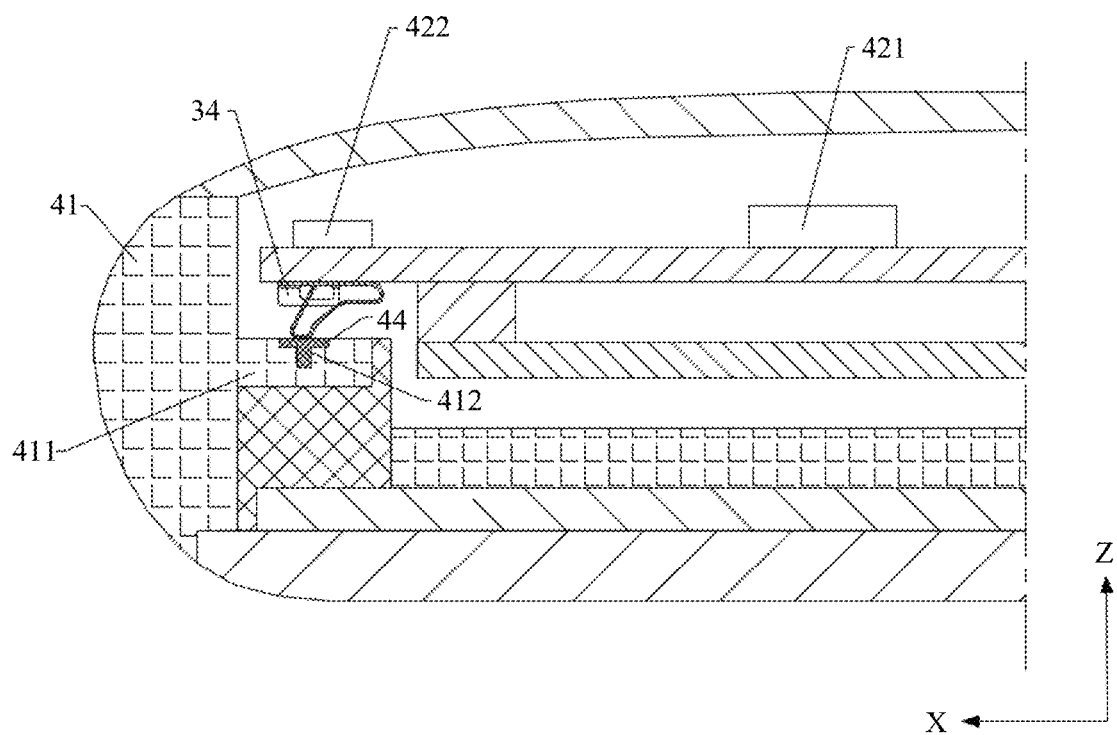
FIG. 19 is a partial cross-sectional view of an electronic device shown in FIG. 1 in still another optional manner taken along a line B-B.

FIG. 19 is a partial cross-sectional view of an electronic device shown in FIG. 1 in still another optional manner taken along a line B-B. It may be understood that, the cross-sectional view illustrated in FIG. 19 is a cross-sectional view formed by taking a cross section from the electronic device of FIG. 1 along a line B-B and viewing along the positive direction of the Y axis, and then rotating the obtained cross-sectional view by 180° with the Y axis as the rotation axis. The electronic device 100 includes a fastener 44. The fastener 44 may be, but is not limited to, a screw, a rivet, or a pin. The fastener 44 is made of a conductive material. In addition, the radiator 41 is provided with a blind hole 412. Specifically, the blind hole 412 is located on the protrusion 411. The fastener 44 is fixed into the blind hole 412. The first elastic piece 34 is in elastic contact with the fastener 44. In this way, when the radio frequency transceiver chip 421 emits the radio frequency signal, the radio frequency signal is transmitted to the radiator 41 via the first matching circuit 422, the first elastic piece 34, and the fastener 44. In addition, when the radiator 41 receives an electromagnetic wave signal and converts the electromagnetic wave signal into a radio frequency signal, the radio frequency signal is transmitted to the radio frequency transceiver chip 421 via the fastener 44, the first elastic piece 34, and the first matching circuit 422.

It may be understood that, compared with the solution in which the conductive piece 43 is soldered on the radiator 41, in this embodiment, the fastener 44 is disposed in the blind hole 412 of the radiator 41, and the first elastic piece 34 is electrically connected to the radiator 41 of the antenna through the fastener 44, thereby omitting the process of soldering the conductive piece 43 on the radiator 41. Therefore, on the one hand, the cost investment of the electronic device 100 is reduced, and there is no need to increase the investment cost of the soldering process; and on the other hand, the case that the performance of the radiator 41 in transmitting and receiving the electromagnetic wave is affected due to the generation of gas holes, slag inclusions, solder joints or cracks during the soldering process in the radiator 41 is avoided.

In an optional manner, the oxidation resistance of the fastener 44 is higher than that of the radiator 41. In this way, compared with the solution in which the first elastic piece 34 is in direct elastic contact with the radiator 41, the contact resistance of the first elastic piece 34 with the fastener 44 is less, that is, the contact resistance of the first elastic piece 34 with the fastener 44 is stable. In this case, the transmission loss of the radio frequency signal is less, and the antenna performance of the electronic device 100 is better. In other optional manners, the oxidation resistance of the fastener 44 may alternatively be equal to or lower than that of the radiator 41 of the antenna.

In an optional manner, the resistivity of the fastener 44 is less than that of the radiator 41. In this case, the conductive performance of the fastener 44 is better than that of the radiator 41, so that when the first elastic piece 34 is in elastic contact with the fastener 44, the transmission rate of the radio frequency signal between the fastener 44 and the first elastic piece 34 is faster and the loss is smaller, that is, the antenna performance of the electronic device 100 is better.

Figure 20A:
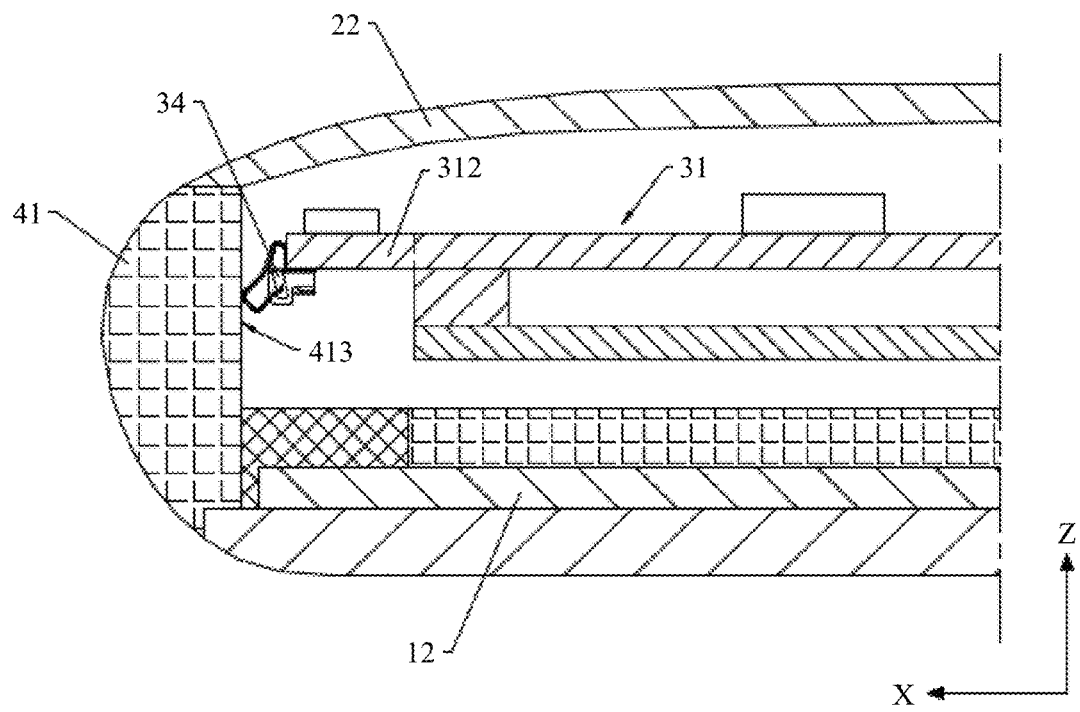
FIG. 20a is a partial cross-sectional view of an electronic device shown in FIG. 1 in still another optional manner taken along a line B-B.

FIG. 20a is a partial cross-sectional view of an electronic device shown in FIG. 1 in still another optional manner taken along a line B-B. It may be understood that, the cross-sectional view illustrated in FIG. 20a is a cross-sectional view formed by taking a cross section from the electronic device in FIG. 1 along a line B-B, viewing along a positive direction of the Y-axis, and then rotating the obtained cross-sectional view by 180° with the Y-axis as a rotational axis. In this implementation, the first elastic piece 34 is fixed to a side of the first extension portion 312 of the first board 31 facing the display screen 12. The first elastic piece 34 is in elastic contact with an inner side surface 413 of the radiator 41. In this case, the protrusion 411 may no longer be disposed in the radiator 41, that is, the first elastic piece 34 may not be in elastic contact with the protrusion 411 of the radiator 41. In this way, the first elastic piece 34 can be disposed relatively close to the rear cover 22, that is, the first elastic piece 34 can be disposed relatively far away from the display screen 12. In this way, in the Z-axis direction, the distance between the first elastic piece 34 and the display screen 12 can be significantly increased. In this way, in the Z-axis direction, the antenna clearance area between the first elastic piece 34 and the display screen 12 can be larger, and the performance of the antenna is also better.

In addition, the distance from the contact point between the first elastic piece 34 and the radiator 41 to the display screen 12 is significantly increased. In this case, the display screen 12 has less signal interference to the contact point of the first elastic piece 34 and the radiator 41.

In addition, in the Z-axis direction, the space omitting the protrusion 411 in this optional manner may also be used for the clearance area of the antenna. In this way, the clearance area of the antenna is larger, and the performance of the antenna is better.

In an optional manner, a part of the first elastic piece 34 is fixedly connected to a side surface of the first extension portion 312. In this case, the first board 31 may apply pressure onto the first elastic piece 34 in the negative direction of the X-axis, and thereby the first elastic piece 34 is in contact with the radiator 41 more stably.

In another optional manner, the inner side surface 413 of the radiator 41 may also be disposed with reference to the configuration manner of the protrusion 411 of the radiator 41 described above. For example, a conductive piece is disposed on the inner side surface 413 of the radiator 41, or the opening of the radiator 41 for opening the blind hole is located on the inner side surface 413 of the radiator 41. Details are not described herein again.

Figure 20B:
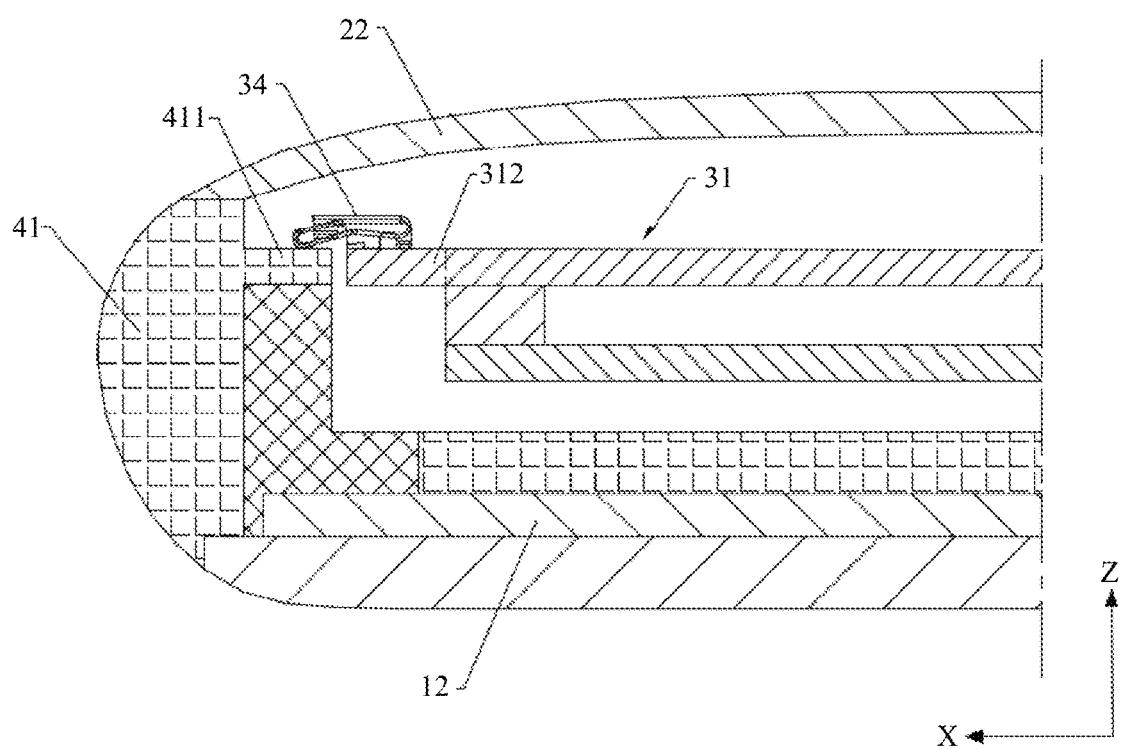
FIG. 20b is a partial cross-sectional view of an electronic device shown in FIG. 1 in still another optional manner taken along a line B-B.

FIG. 20b is a partial cross-sectional view of an electronic device shown in FIG. 1 in still another optional manner taken along a line B-B. It may be understood that, the schematic cross-sectional view illustrated in FIG. 20b is a cross-sectional view formed by taking a cross section from the electronic device of FIG. 1 along a line B-B and viewing along the positive direction of the Y axis, and then rotating the obtained cross-sectional view by 180° with the Y axis as the rotation axis. In this implementation, the first elastic piece 34 is fixed to a side of the first extension portion 312 of the first board 31 facing the rear cover 22. In addition, the first elastic piece 34 is in elastic contact with the protrusion 411 of the radiator 41.

In this implementation, the first elastic piece 34 is fixed to the side of the first extension portion 312 facing the rear cover 22, and is in elastic contact with the protrusion 411 of the radiator 41 by using the first elastic piece 34, so that the first elastic piece 34 can be disposed relatively close to the rear cover 22, that is, the first elastic piece 34 can be disposed relatively far from the display screen 12, that is, in the Z-axis direction, the distance between the first elastic piece 34 and the display screen 12 can be significantly increased. In this way, in the Z-axis direction, the protrusion 411 for contact with the first elastic piece 34 can also be disposed substantially away from the display screen 12. The antenna clearance area between the bottom of the protrusion 411 and the display screen 12 can be larger in the Z-axis direction, and the performance of the antenna is also better.

In addition, the distance from the contact point between the first elastic piece 34 and the radiator 41 to the display screen 12 is significantly increased. In this case, the display screen 12 has less signal interference to the contact point of the first elastic piece 34 and the radiator 41.

In another optional manner, the first elastic piece 34 may be a broken elastic piece. Specifically, by opening a through hole or groove in the first extension portion 312 of the first board 31, a part of the first elastic piece 34 is mounted in the through hole or groove, and a part of the first elastic piece 34 is exposed relative to the first extension portion 312. In this way, the contact position between the first elastic piece 34 and the protrusion 411 is not limited to the contact position illustrated in FIG. 20b, which is arranged flush with the surface of the first extension portion 312 facing the rear cover 22. The contact position between the first elastic piece 34 and the protrusion 411 may be flexibly arranged according to the position of the first elastic piece 34. For example, the contact position between the first elastic piece 34 and the protrusion 411 may be flush with the surface of the first extension portion 312 facing the display screen 12.

Figure 21:
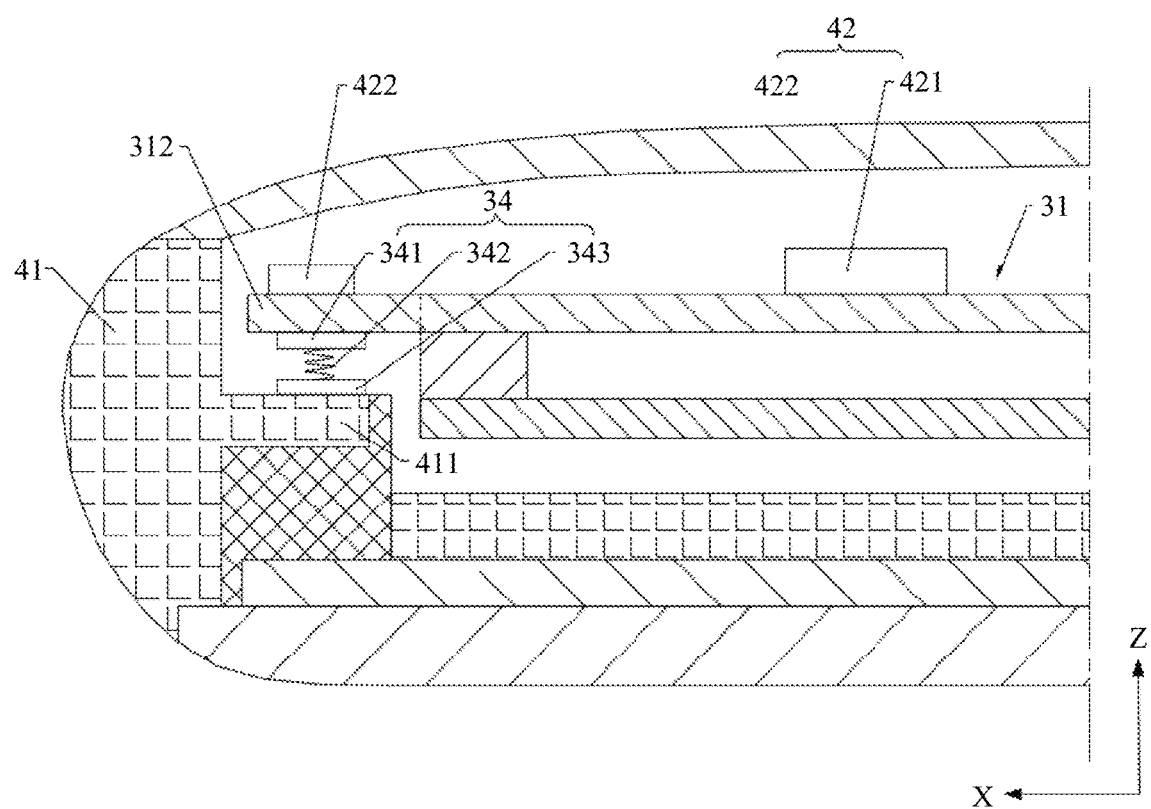
FIG. 21 is a partial cross-sectional view of an electronic device shown in FIG. 1 in still another optional manner taken along a line B-B.

FIG. 21 is a partial cross-sectional view of an electronic device shown in FIG. 1 in still another optional manner taken along a line B-B. It may be understood that, the cross-sectional view illustrated in FIG. 21 is a cross-sectional view formed by taking a cross section from the electronic device of FIG. 1 along a line B-B and viewing along the positive direction of the Y axis, and then rotating the obtained cross-sectional view by 180° with the Y axis as the rotation axis. In this implementation, another structure of the first conductive member 34 is described in detail with reference to FIG. 21. Specifically, the first conductive member 34 includes a first fixation piece 341, an elastic member 342, and a second fixation piece 343. The elastic member 342 is connected between the first fixation piece 341 and the second fixation piece 343. It may be understood that, the elastic member 342 may be, but is not limited to, an elastic piece or a spring. In addition, the first fixation piece 341 may be, but is not limited to, a copper piece, an aluminum piece, or a gold piece. The second fixation piece 343 may be, but is not limited to, a copper piece, an aluminum piece, or a gold piece.

In addition, the first fixation piece 341 is fixedly connected to the radiator 41. Specifically, the first fixation piece 341 is fixed to the protrusion 411 of the radiator 41. The second fixation piece 343 is fixedly connected to the first extension portion 312 of the first board 31. In this case, when the radio frequency transceiver chip 421 emits a radio frequency signal, the radio frequency signal is transmitted to the radiator 41 via the first matching circuit 422, the second fixation piece 343, the elastic member 342, and the first fixation piece 341. In addition, when the radiator 41 receives an electromagnetic wave signal and converts the electromagnetic wave signal into a radio frequency signal, the radio frequency signal is transmitted to the radio frequency transceiver chip 421 via the first fixation piece 341, the elastic member 342, the second fixation piece 343, and the first matching circuit 422.

In this implementation, the first conductive member 34 has a simple structure, and is easy to assemble, which may reduce the difficulty of assembling the electronic device 100.

Several manners of elastic contact of the first elastic piece 34 with the radiator 41 are described above in detail with reference to the associated drawings. In addition, the foregoing radiator 41 adopts an ungrounded solution. Several configuration manners in which the radiator 41 is grounded are described in detail below with reference to the associated drawings.

Figure 22:
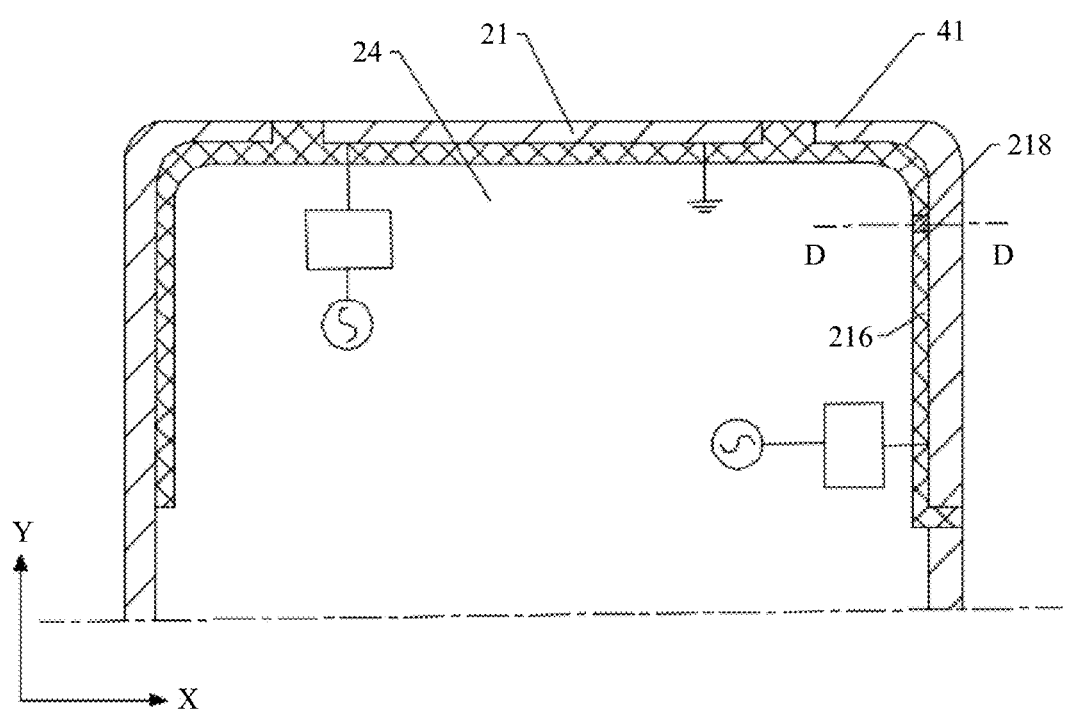
FIG. 22 is a partial cross-sectional view of an electronic device shown in FIG. 1 in another optional manner taken along a line A-A.
Figure 23:
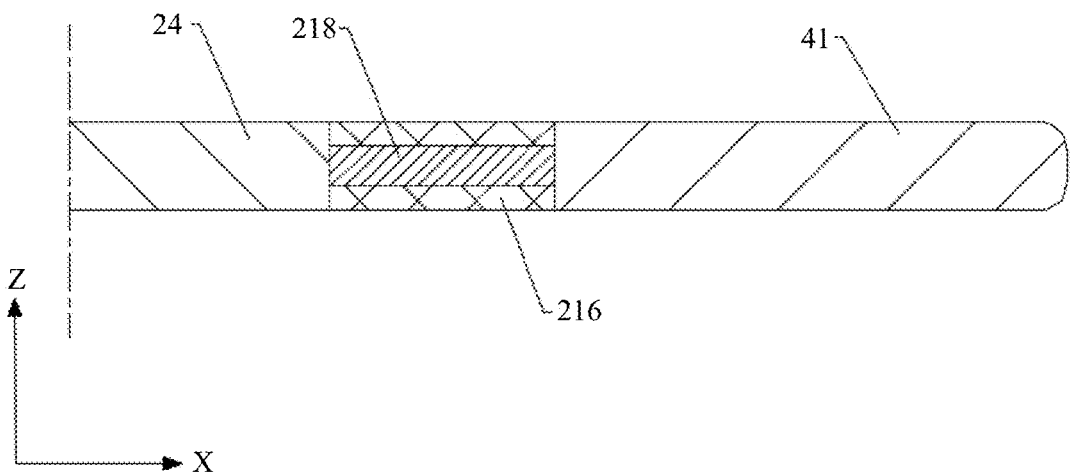
FIG. 23 is a partial cross-sectional view of an electronic device shown in FIG. 22 taken along a line D-D.

First optional manner: FIG. 22 is a partial cross-sectional view of an electronic device shown in FIG. 1 in another optional manner taken along a line A-A. FIG. 23 is a partial cross-sectional view of an electronic device shown in FIG. 22 taken along a line D-D. The frame 21 further includes a connection segment 218. It may be understood that, the cross-sectional view illustrated in FIG. 22 is a cross-sectional view of the electronic device of FIG. 1 taken along the line A-A and viewed along the negative direction of the Z axis. In addition, the cross-sectional view illustrated in FIG. 23 is a schematic diagram obtained by taking a cross section from the electronic device in FIG. 22 along a line D-D and viewing along a positive direction of the Y-axis. The connection segment 218 is connected between the radiator 41 and the middle plate 24. It may be understood that, In the electronic device 100, the middle plate 24 is generally in a grounded state. In this way, the radiator 41 is grounded by being connected to the middle plate 24 through the connection segment 218. In addition, as can be seen from FIG. 23, the thickness of the connection segment 218 in the Z-axis direction is less than that of the radiator 41 in the Z-axis direction. In this case, the third gap 216 between the radiator 41 and the middle plate 24 is not partitioned by the connection segment 218.

It may be understood that, the radiator 41 of the optional manner is grounded in a simpler manner, and has a simpler structure and a low investment cost.

In an optional manner, the connection segment 218 and the radiator 41 are of an integrally formed structure. In this case, compared with the manner of connecting the connection segment 218 to the radiator 41 by the soldering process, the soldering process is omitted in this optional manner, thereby saving the cost investment of the soldering process. Certainly, in other optional manners, the connection segment 218 may alternatively be connected to the radiator 41 by soldering or the like.

Figure 24:
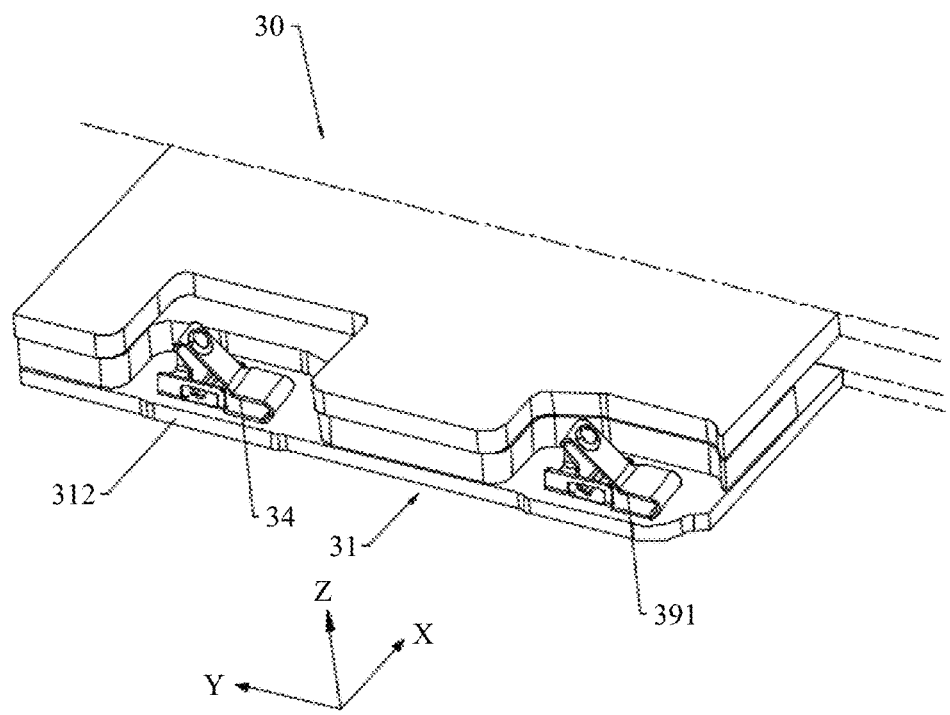
FIG. 24 is a partial schematic structural view of a circuit board assembly of an electronic device shown in FIG. 1 in still another optional manner.
Figure 25:
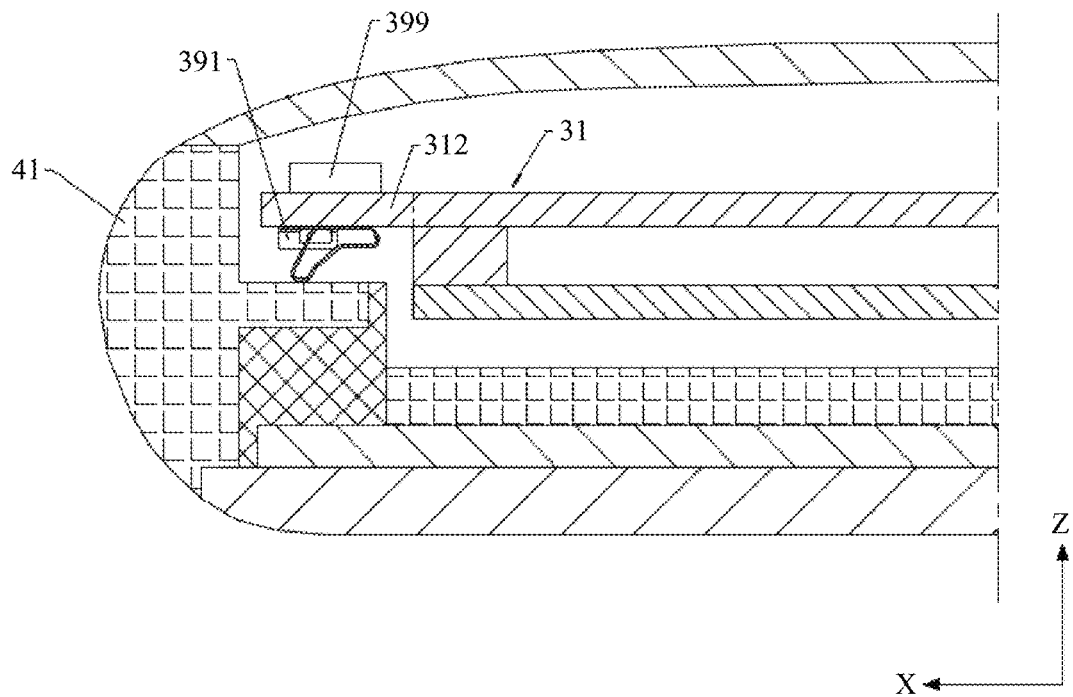
FIG. 25 is a partial cross-sectional view of an electronic device shown in FIG. 1 in an optional manner taken along a line E-E.

Second optional manner: FIG. 24 is a partial schematic structural view of a circuit board assembly of an electronic device shown in FIG. 1 in still another optional manner. FIG. 25 is a partial cross-sectional view of an electronic device shown in FIG. 1 in an optional manner taken along a line E-E. It may be understood that, the cross-sectional view illustrated in FIG. 25 is a cross-sectional view formed by taking a cross section from the electronic device in FIG. 1 along a line B-B, viewing along a positive direction of the Y-axis, and then rotating the obtained cross-sectional view by 180° with the Y-axis as a rotational axis. The circuit board assembly 30 further includes a second conductive member 391. It may be understood that, the structure and the configuration manner for the second conductive member 391 may refer to the structure and configuration manner for the first conductive member 34. For example, the second conductive member 391 is disposed in the first extension portion 312 of the first board 31. Details are not described herein again. In addition, in this implementation, the second conductive member 391 is described using a second elastic piece 391 as an example. Different from the first elastic piece 34, the second elastic piece 391 is electrically connected between a ground layer of the first board 31 and the radiator 41. In other words, the second elastic piece 391 is configured to ground the radiator 41.

It may be understood that, the radiator 41 of the optional manner is grounded in a simpler manner, and has a simpler structure and a low investment cost.

Referring to FIG. 25 again, the first board 31 is provided with a second matching circuit 399. The second matching circuit 399 includes an inductor, capacitor, resistor, or antenna switch. The second elastic piece 391 is electrically connected to the second matching circuit 399, and is electrically connected to the ground layer of the first board 31 through the second matching circuit 399. The second matching circuit 399 is configured to tune the frequency band of the antenna for transmitting and receiving the electromagnetic waves, and is used for the impedance matching of the antenna. In this way, the performance of the antenna for transmitting and receiving the electromagnetic waves is better. In another optional manner, the first board 31 may alternatively not be provided with a second matching circuit 399.

Figure 26:
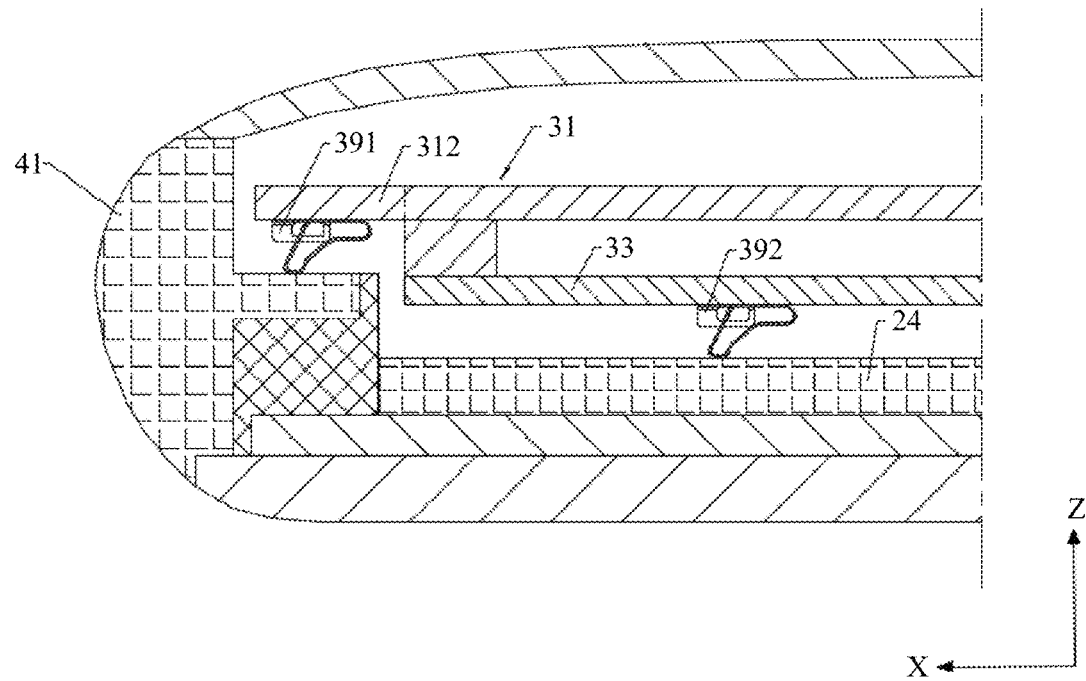
FIG. 26 is a partial cross-sectional view of an electronic device shown in FIG. 1 in another optional manner taken along a line E-E.

Third optional manner: FIG. 26 is a partial cross-sectional view of an electronic device shown in FIG. 1 in another optional manner taken along a line E-E. It may be understood that, the cross-sectional view illustrated in FIG. 26 is a cross-sectional view formed by taking a cross section from the electronic device in FIG. 1 along a line B-B, viewing along a positive direction of the Y-axis, and then rotating the obtained cross-sectional view by 180° with the Y-axis as a rotational axis. The circuit board assembly 30 further includes a second conductive member 391 and a third conductive member 392. It may be understood that, the structure and the configuration manner for the second conductive member 391 may refer to the structure and configuration manner for the first conductive member 34. which are not described herein again. In addition, in this implementation, the second conductive member 391 is described using a second elastic piece 391 as an example. In addition, the third conductive member 392 may be an elastic piece with electrical conductivity or a spring with electrical conductivity. which is not limited in this application. In this implementation, the third conductive member 392 is described using a third elastic piece 392 as an example.

In addition, different from the first elastic piece 34, the second elastic piece 391 is electrically connected between the radiator 41 and the third elastic piece 392 fixed onto the second board 33.

In an optional manner, the third elastic piece 392 is electrically connected to the second elastic piece 391 through the wiring in the circuit board assembly 30. In other optional manners, a wire is disposed on the circuit board assembly 30, and in this case, the third elastic piece 392 is electrically connected to the second elastic piece 391 by the wire.

In addition, the third elastic piece 392 is in elastic contact with the middle plate 24. In this case, the radiator 41 is electrically connected to the middle plate 24 through the second elastic piece 391 and the third elastic piece 392. In other words, the radiator 41 is grounded through the second elastic piece 391 and the third elastic piece 392.

Figure 27:
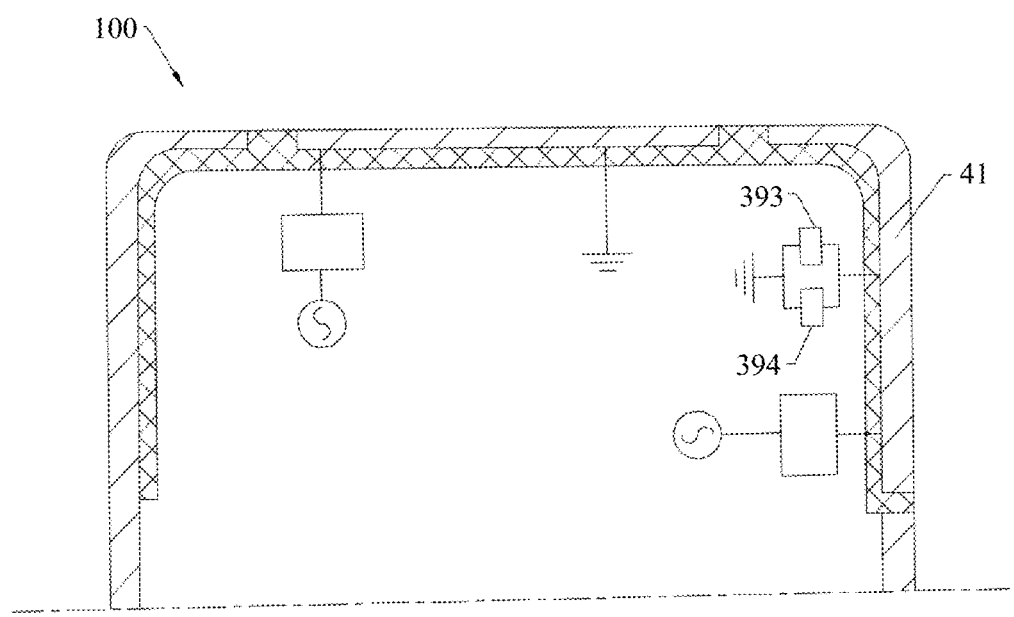
FIG. 27 is a partial cross-sectional view of an electronic device shown in FIG. 1 in yet another optional manner taken along a line A-A.

It may be understood that, the second elastic piece 391 is disposed on the first extension portion 312, and the third elastic piece 392 is disposed on the second board 33 and is used for grounding, and thereby the ground path of the radiator 41 is increased. In this case, in the ground path of the radiator 41, a matching circuit may be disposed on the circuit board assembly 30 to tune the frequency band of the antenna for transmitting and receiving the electromagnetic waves, so that the transmitting and receiving frequency band of the antenna is wider. For example, with reference to FIG. 26, FIG. 27 is a partial cross-sectional view of an electronic device shown in FIG. 1 in yet another optional manner taken along a line A-A. It may be understood that, the cross-sectional view illustrated in FIG. 27 is a cross-sectional view of the electronic device of FIG. 1 taken along the line A-A and viewed along the negative direction of the Z axis. The electronic device 100 includes a first branch 393 and a second branch 394 disposed in parallel, and the first branch 393 and the second branch 394 are located between the second elastic piece 391 and the third elastic piece 392. The first branch 393 includes a capacitor. The second branch 394 includes an inductor. When switched to the first branch 393, the electronic device 100 transmits and receives an antenna signal with a first frequency band, for example, the first frequency band is an intermediate frequency band for LTE. When switched to the second branch 394, the electronic device 100 transmits and receives an antenna signal with a second frequency band, for example, the second frequency band is a high frequency band for LTE.

In an optional manner, antenna switches for antenna are disposed in the first branch 393 and the second branch 394. The second branch 394 is disconnected by the antenna switch for antenna when the electronic device 100 needs to be switched to the first branch 393. The first branch 393 is disconnected by the antenna switch for antenna when the electronic device 100 needs to be switched to the second branch 394.

Several grounding manners of the radiator 41 of the antenna are described above in detail with reference to the associated drawings. The several grounding manners may alternatively be applied in combination with each other. In addition, in each of the foregoing optional manners, the first elastic piece 34 is mainly configured to feed the radio frequency signal emitted by the radio frequency path 42 to the radiator 41, or to transmit the radio frequency signal converted by the radiator 41 to the radio frequency path 42. In other words, the position at which the first elastic piece 34 is in elastic contact with the radiator 41 is a feed point. Another application environment of the first elastic piece 34 is described in detail below with reference to the associated drawings. The first elastic piece 34 may alternatively be configured to ground the radiator 41, or to electrically connect to the matching circuit of the antenna to be grounded through the matching circuit. In this case, the contact position between the first elastic piece 34 and the radiator 41 is an antenna ground tuning point.

Figure 28:
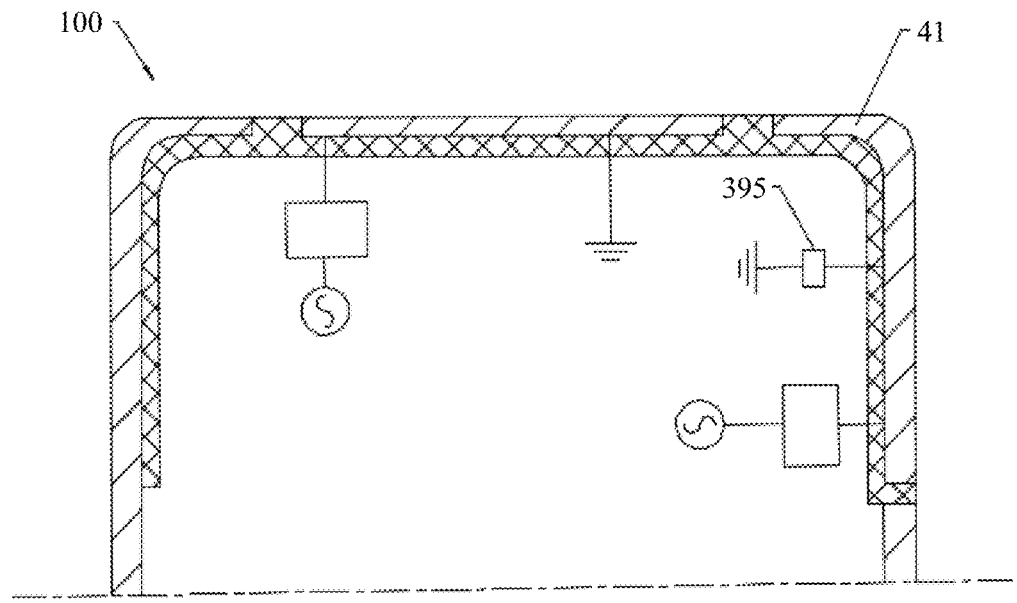
FIG. 28 is a partial cross-sectional view of an electronic device shown in FIG. 1 in still yet another optional manner taken along a line A-A.
Figure 29:
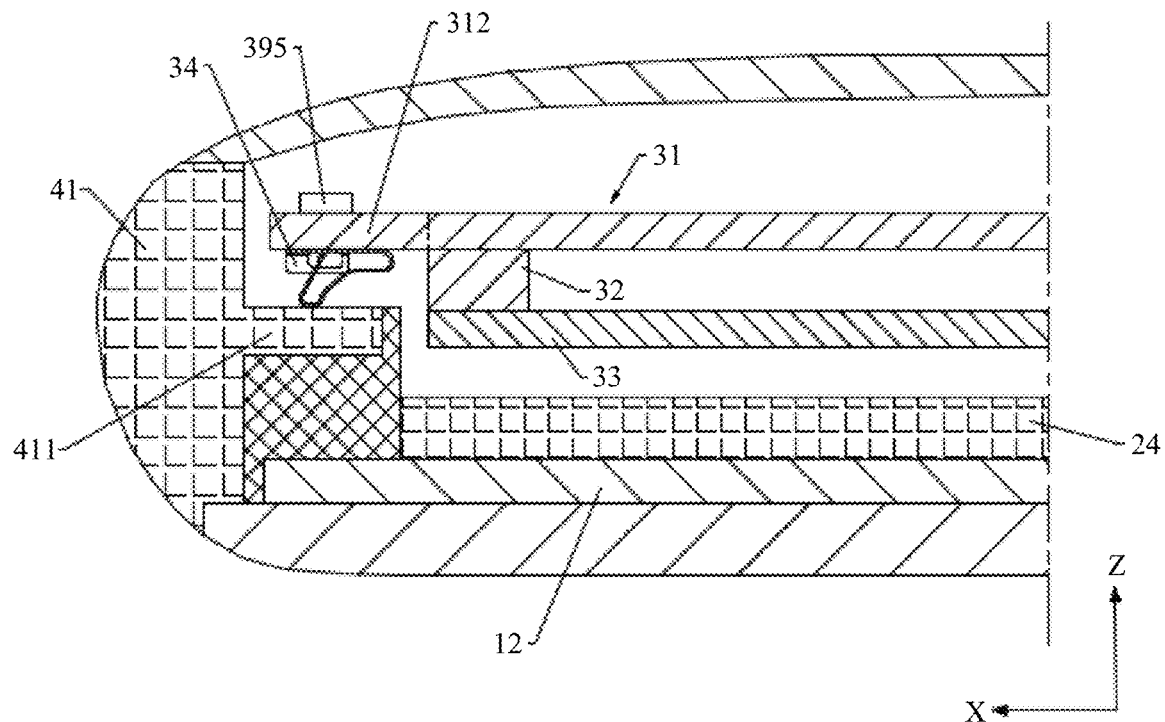
FIG. 29 is a partial cross-sectional view of an electronic device shown in FIG. 1 in still another optional manner taken along a line B-B.

In this implementation, the same technical contents as in each of the foregoing optional manners are not repeated. FIG. 28 is a partial cross-sectional view of an electronic device shown in FIG. 1 in still yet another optional manner taken along a line A-A. FIG. 29 is a partial cross-sectional view of an electronic device shown in FIG. 1 in still another optional manner taken along a line B-B. It may be understood that, the cross-sectional view illustrated in FIG. 28 is a cross-sectional view of the electronic device of FIG. 1 taken along the line A-A and viewed along the negative direction of the Z axis. the cross-sectional view illustrated in FIG. 29 is a cross-sectional view formed by taking a cross section from the electronic device of FIG. 1 along a line B-B and viewing along the positive direction of the Y axis, and then rotating the obtained cross-sectional view by 180° with the Y axis as the rotation axis. The circuit board assembly 30 includes a first board 31, an elevating board 32, a second board 33, and a first conductive member 34. The configuration manners for the first board 31, the elevating board 32, the second board 33, and the first conductive member 34 may refer to the configuration manners for the first board 31, the elevating board 32, the second board 33, and the first conductive member 34 in each of the foregoing optional manners. which are not described herein again.

In this implementation, the electronic device 100 includes a second matching circuit 395. The second matching circuit 395 is configured to tune the frequency band of the antenna for transmitting and receiving the electromagnetic waves. Certainly, the second matching circuit 395 may also be used for the impedance matching of the antenna. The second matching circuit 395 is disposed on the first board 31. In addition, the second matching circuit 395 is electrically connected between the first elastic piece 34 and the ground layer of the first board 31. In other words, the radiator 41 is grounded through the first elastic piece 34 and the second matching circuit 395. In addition, the second matching circuit 395 may include an antenna switch, capacitor, or inductance.

It may be understood that, by disposing the first extension portion 312 that protrudes relative to the elevating board 32 and the second board 33, and fixedly connecting the first elastic piece 34 to the first extension portion 312, the first elastic piece 34 is disposed away from the display screen 12, that is, in the Z-axis direction, the distance between the first elastic piece 34 and the display screen 12 can be significantly increased. In this way, in the Z-axis direction, the protrusion 411 of the radiator 41 can also be disposed in a direction away from the display screen 12, that is, the antenna clearance area between the bottom of the protrusion 411 and the display screen 12 can be made larger, and the performance of the antenna is also better.

In addition, when the first elastic piece 34 and the protrusion 411 are both disposed away from the display screen 12, the contact point (the antenna ground tuning point) at which the first elastic piece 34 is in contact with the protrusion 411 can also be arranged away from the display screen 12. In this way, the contact point (the antenna ground tuning point) at which the first elastic piece 34 is in contact with the protrusion 411 is less affected by the display screen 12.

In addition, by disposing the second matching circuit 395 on the first board 31, the tuning circuit 395 is disposed away from the display screen 12, that is, the distance between the second matching circuit 395 and the display screen 12 in the Z-axis direction can be significantly increased. In this way, in the Z-axis direction, the antenna clearance area between the display screen 12 and the second matching circuit 395 can be larger, and the performance of the antenna is better.

In addition, when the antenna clearance area is greatly increased, by disposing the first extension portion 312 protruding relative to the elevating board 32 and the second board 33, and fixedly connecting the first elastic piece 34 to the first extension portion 312, and making the first elastic piece 34 be in elastic contact with the radiator 41, the ground path of the radiator 41 is greatly reduced, thereby improving the antenna performance.

In addition, the grounding manner of the radiator 41 in the optional manner through the first elastic piece 34 and the second matching circuit 395 is simple and is easy to operate.

In another optional manner, the electronic device 100 may alternatively not include the second matching circuit 395. In this case, the radiator 41 is directly electrically connected to the ground layer of the first board 31, that is, the radiator 41 is directly grounded.

Several structures of the circuit board assembly 30 and several application scenarios of the first elastic piece 34 are described above in detail with reference to the associated drawings. In each of the foregoing optional manners, the first elastic piece 34 is disposed on the first extension portion 312 of the first board 31. Several configuration manners for the circuit board assembly 30 are described in detail below with reference to the associated drawings. It may be understood that, several first elastic pieces 34 of the circuit board assembly 30 described below are disposed on an extension portion of the elevating board 32. Details may refer to the following description. In addition, in each of the following optional manners, the same technical contents as in the foregoing optional manners are not repeated.

Figure 30:
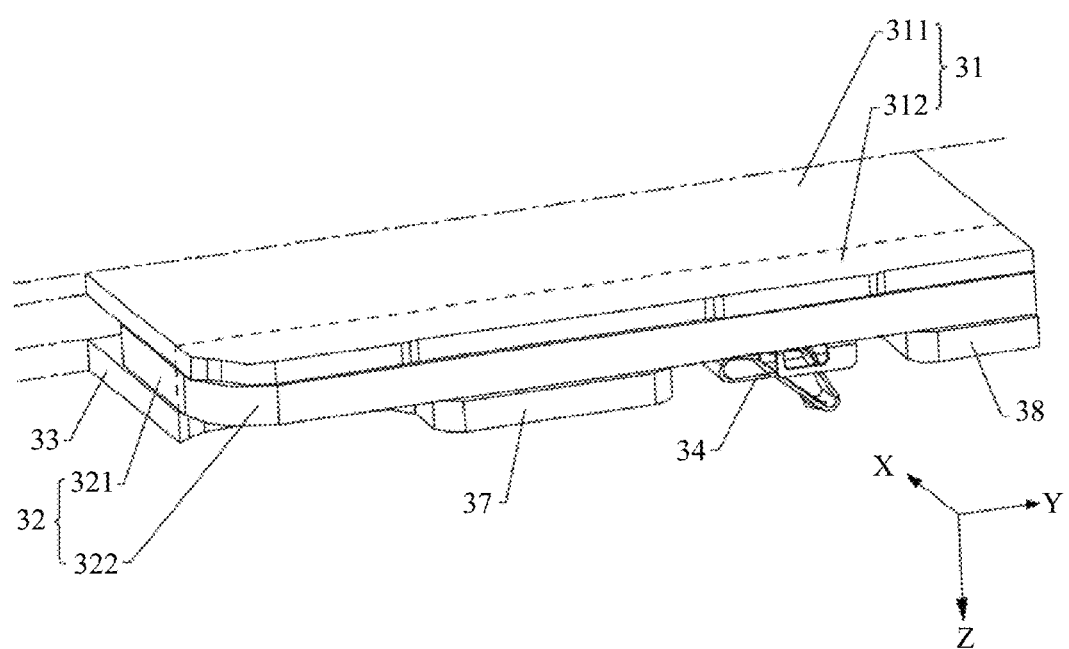
FIG. 30 is a partial schematic structural view of a circuit board assembly of an electronic device shown in FIG. 1 in still another optional manner.
Figure 31:
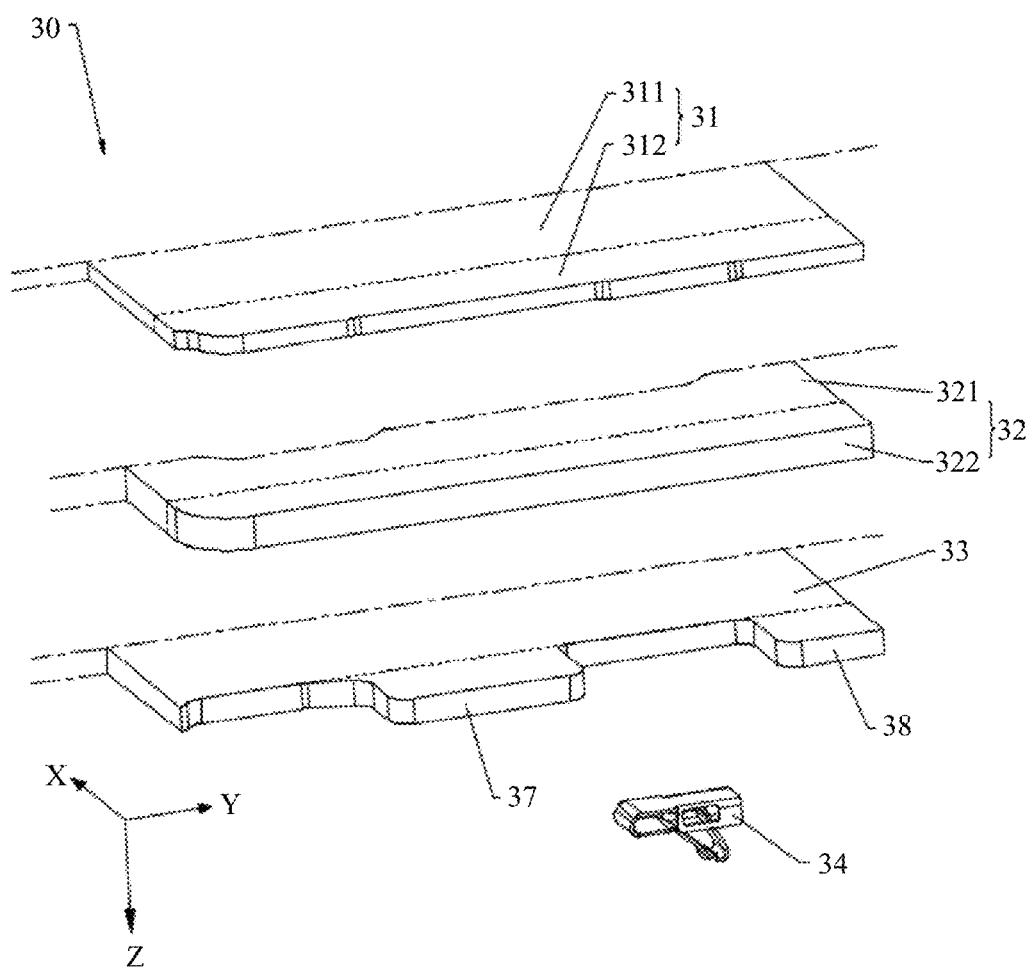
FIG. 31 is a schematic exploded view of a circuit board assembly shown in FIG. 30.

FIG. 30 is a partial schematic structural view of a circuit board assembly of an electronic device shown in FIG. 1 in still another optional manner. FIG. 31 is a schematic exploded view of a circuit board assembly shown in FIG. 30. The circuit board assembly 30 includes a first elastic piece 34, and a first board 31, an elevating board 32, and a second board 33 sequentially stacked.

The first board 31 includes a first main body portion 311 and a first extension portion 312. The first extension portion 312 protrudes relative to the second board 33. FIG. 30 and FIG. 31 both show that the first extension portion 312 protrudes in an X-axis direction relative to the second board 33. In another optional manner, the first extension portion 312 may alternatively protrude in another direction relative to the second board 33, for example in a Y-axis direction. which is not limited in this application.

In addition, the elevating board 32 includes a second main body portion 321 and a second extension portion 322. The first main body portion 311, the second main body portion 321, and the second board 33 are sequentially stacked. The second extension portion 322 is stacked on the first extension portion 312, and the second extension portion 322 protrudes relative to the second board 33. In this implementation, FIG. 30 and FIG. 31 both show that the second extension portion 322 and the first extension portion 312 are disposed flush with each other. In another optional manner, the second extension portion 322 may alternatively be staggered from the first extension portion 312.

Figure 32:
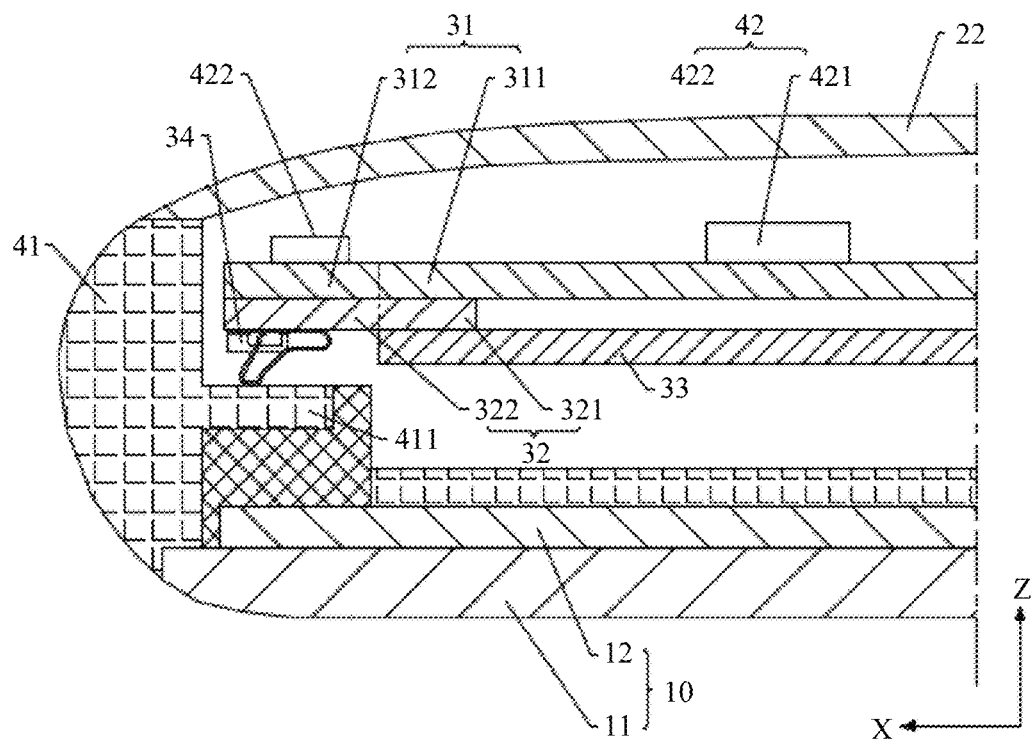
FIG. 32 is a partial cross-sectional view of an electronic device shown in FIG. 1 in still another optional manner taken along a line B-B.

FIG. 32 is a partial cross-sectional view of an electronic device shown in FIG. 1 in still another optional manner taken along a line B-B. It may be understood that, the cross-sectional view illustrated in FIG. 32 is a cross-sectional view formed by taking a cross section from the electronic device of FIG. 1 along a line B-B and viewing along the positive direction of the Y axis, and then rotating the obtained cross-sectional view by 180° with the Y axis as the rotation axis. The first extension portion 312 is disposed close to the radiator 41 relative to the first main body portion 311. The second extension portion 322 is also disposed close to the radiator 41 relative to the second main body portion 321.

In addition, the first elastic piece 34 is fixed to the second extension portion 322, and the first elastic piece 34 is in elastic contact with the radiator 41 of the antenna. In this case, the first elastic piece 34 and the second board 33 are located on a same side of the elevating board 32. In this implementation, the first elastic piece 34 is in elastic contact with the protrusion 411. In another optional manner, the radiator 41 may alternatively not be provided with a protrusion 411. In this case, the first elastic piece 34 may adopt the manner of being in elastic contact with the inner side surface of the radiator 41, and details may refer to the optional manner in FIG. 20*a* described above. which are not described herein again.

In addition, the first elastic piece 34 is electrically connected between the radio frequency path 42 and the radiator 41. In this way, the radio frequency signals transmitted by the radio frequency transceiver chip 421 can be transmitted to the radiator 41 via the first matching circuit 422 and the first elastic piece 34. In addition, after the radiator 41 converts the received electromagnetic wave signals into radio frequency signals, the radio frequency signals can further be transmitted to the radio frequency transceiver chip 421 via the first elastic piece 34 and the first matching circuit 422.

In this embodiment, by disposing the second extension portion 322 that protrudes relative to the second board 33, and fixedly connecting the first elastic piece 34 to the second extension portion 322, the first elastic piece 34 is disposed away from the display screen 12, that is, in the Z-axis direction, the distance between the first elastic piece 34 and the display screen 12 can be significantly increased. In this case, the distance from the contact point between the first elastic piece 34 and the radiator 41 to the display screen 12 is significantly increased. In this way, in the Z-axis direction, the protrusion 411 of the radiator 41 can also be disposed in a direction away from the display screen 12, that is, the antenna clearance area between the bottom of the protrusion 411 and the display screen 12 can be made larger, and the performance of the antenna is also better.

In addition, when both the first elastic piece 34 and the protrusion 411 are disposed away from the display screen 12, the contact point of the first elastic piece 34 in contact with the protrusion 411 may also be arranged away from the display screen 12. In this way, the contact point (feed point) of the first elastic piece 34 in contact with the protrusion 411 is less affected by the display screen 12.

In addition, the second extension portion 322 is stacked on the first extension portion 312. In this case, the overall strength of this part may be improved with the cooperation of the second extension portion 322 and the first extension portion 312. In this way, when the first elastic piece 34 is in elastic contact with the radiator 41 of the antenna, the first elastic piece 34 receives a reaction force of the radiator 41. The first elastic piece 34 transmits the reaction force to the second extension portion 322. In this case, with the cooperation of the first extension portion 312, the second extension portion 322 can effectively counteract the force, thereby avoiding the second extension portion 322 from being damaged or cracked due to an external force, and thus avoiding the disconnection of the circuit of the antenna.

Referring to FIG. 30 and FIG. 31 again, the circuit board assembly 30 further includes a third strengthening board 37 and a fourth strengthening board 38. The third strengthening board 37 and the fourth strengthening board 38 are also respectively located on both sides of the first elastic piece 34. In FIG. 31, the third strengthening board 37, the fourth strengthening board 38, and the second board 33 are schematically distinguished by a dashed line. In addition, the third strengthening board 37 and the fourth strengthening board 38 are stacked on a board surface of the second extension portion 322 of the elevating board 32 facing the screen 10. In this way, the overall strength of the second extension portion 322 is further improved. In this case, when the first elastic piece 34 is in elastic contact with the radiator 41, the first elastic piece 34 receives a reaction force of the radiator 41 of the antenna. The first elastic piece 34 transmits the reaction force to the second extension portion 322 of the first board 31. In this case, with the cooperation of the third strengthening board 37 and the fourth strengthening board 38, the second extension portion 322 can effectively counteract the force, thereby avoiding the second extension portion 322 from being damaged or cracked due to an external force.

In an optional manner, the third strengthening board 37, the fourth strengthening board 38, and the second board 33 are of an integrally formed structure. In other words, the third strengthening board 37, the fourth strengthening board 38, and the second board 33 are an integral board. In this case, the overall structural strength of the third strengthening board 37, the fourth strengthening board 38, and the second board 33 is better. In this way, the third strengthening board 37, the fourth strengthening board 38, and the second board 33 is not easy to fracture or crack when subjected to an external force.

In another optional manner, the third strengthening board 37 and the fourth strengthening board 38 may also be connected to the second board 33 by the soldering process.

In another optional manner, the third strengthening board 37, the fourth strengthening board 38, and the second board 33 may also be separately disposed, that is, the third strengthening board 37 and the fourth strengthening board 38 are directly fixed to the second extension portion 322 of the elevating board 32 without being fixedly connected to the second board 33.

Figure 33:
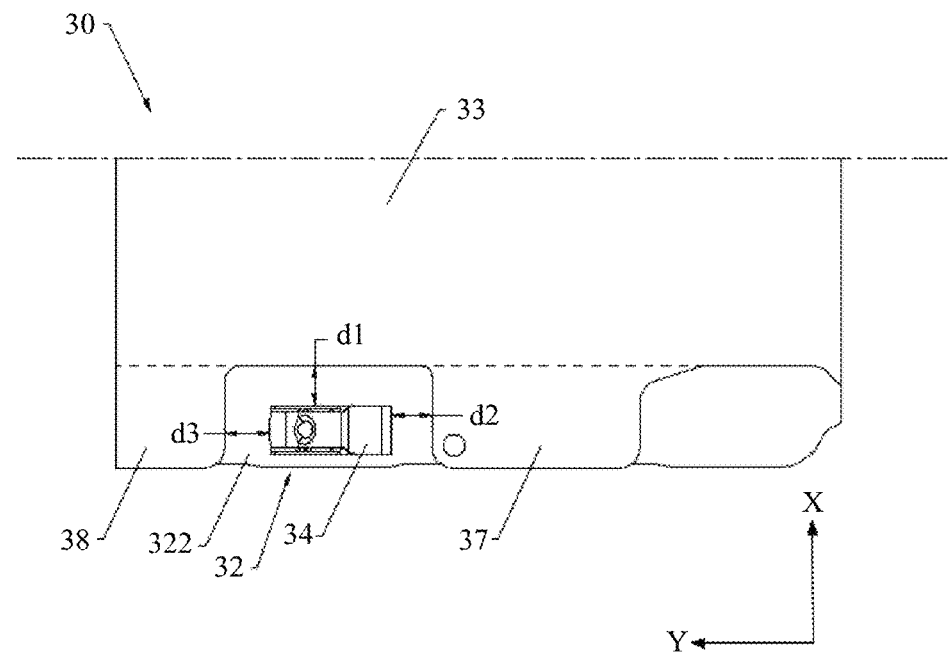
FIG. 33 is a partial schematic structural view of a circuit board assembly shown in FIG. 30 from another angle.

FIG. 33 is a partial schematic structural view of a circuit board assembly shown in FIG. 30 from another angle. A distance d1 between the first elastic piece 34 and the second board 33 ranges from 0.15 mm to 30 mm.

In this implementation, when the distance d1 between the first elastic piece 34 and the second board 33 ranges from 0.15 mm to 30 mm, the size of the second extension portion 322 located between the first elastic piece 34 and the second board 33 is relatively moderate. In this way, when the first elastic piece 34 is in elastic contact with the radiator 41, the first elastic piece 34 receives a reaction force of the radiator 41. The first elastic piece 34 transmits the reaction force to the second extension portion 322. In this case, the second extension portion 322 located between the first elastic piece 34 and the second board 33 is not easy to fracture or crack. In other words, the reaction force received by the second extension portion 322 can be rapidly transmitted to the second board 33, so that the reaction force is counteracted by an internal stress of the second board 33.

Referring to FIG. 33 again, a distance d2 between the first elastic piece 34 and the third strengthening board 37 ranges from 0.15 mm to 30 mm. In this case, the size of the second extension portion 322 located between the first elastic piece 34 and the third strengthening board 37 is relatively moderate. In this way, when the first elastic piece 34 is in elastic contact with the radiator 41 of the antenna, the first elastic piece 34 receives a reaction force of the radiator 41. The first elastic piece 34 transmits the reaction force to the second extension portion 322. In this case, the second extension portion 322 located between the first elastic piece 34 and the third strengthening board 37 is not easy to fracture or crack. In other words, the reaction force received by the second extension portion 322 can be rapidly transmitted to the third strengthening board 37, so that the reaction force is counteracted by an internal stress of the third strengthening board 37.

Referring to FIG. 33 again, a distance d3 between the first elastic piece 34 and the fourth strengthening board 38 ranges from 0.15 mm to 30 mm. In this case, the size of the second extension portion 322 located between the first elastic piece 34 and the fourth strengthening board 38 is relatively moderate. In this way, when the first elastic piece 34 is in elastic contact with the radiator 41 of the antenna, the first elastic piece 34 receives a reaction force of the radiator 41. The first elastic piece 34 transmits the reaction force to the second extension portion 322. In this case, the second extension portion 322 located between the first elastic piece 34 and the fourth strengthening board 38 is not easy to fracture or crack. In other words, the reaction force received by the second extension portion 322 can be rapidly transmitted to the fourth strengthening board 38, so that the reaction force is counteracted by an internal stress of the fourth strengthening board 38.

Figure 34:
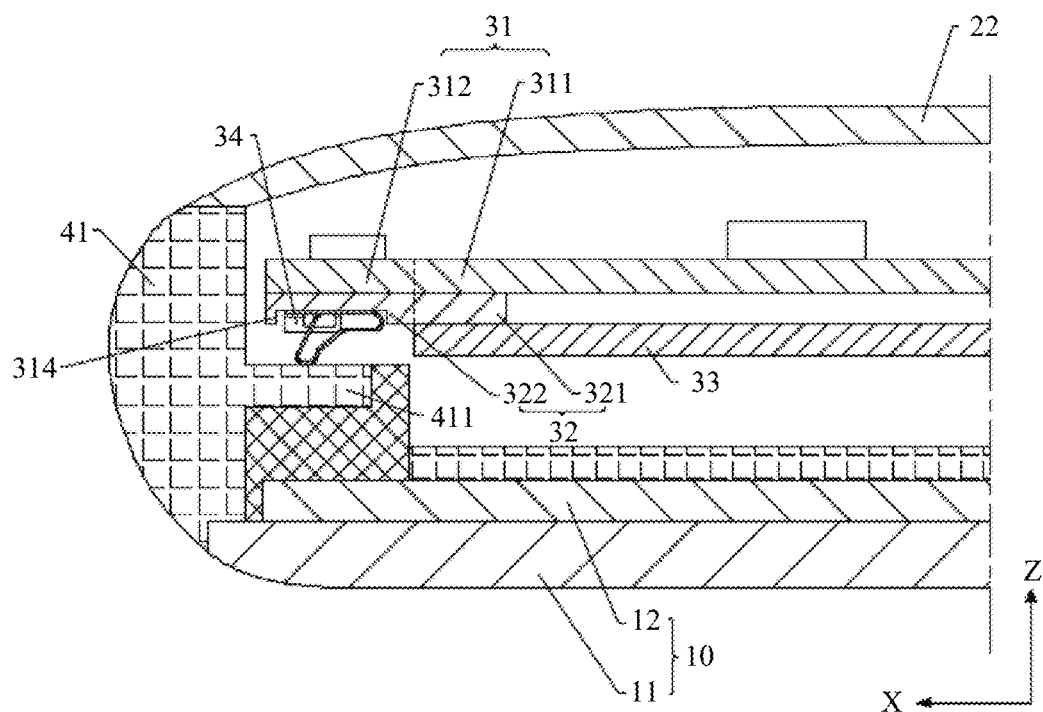
FIG. 34 is a partial cross-sectional view of an electronic device shown in FIG. 1 in another optional manner taken along a line B-B.

FIG. 34 is a partial cross-sectional view of an electronic device shown in FIG. 1 in another optional manner taken along a line B-B. It may be understood that, the cross-sectional view illustrated in FIG. 34 is a cross-sectional view formed by taking a cross section from the electronic device of FIG. 1 along a line B-B and viewing along the positive direction of the Y axis, and then rotating the obtained cross-sectional view by 180° with the Y axis as the rotation axis. The second extension portion 322 of the elevating board 32 is provided with a groove 314. An opening of the groove 314 is located on a surface of the elevating board 32 facing the display screen 12. A part of the first elastic piece 34 is mounted in the groove 314.

It may be understood that, when a part of the first elastic piece 34 is mounted in the groove 314, in the Z-axis direction, there is an overlapping region between the first elastic piece 34 and the second extension portion 322. In this case, the first elastic piece 34 can be disposed further away from the display screen 12, that is, in the Z-axis direction, the distance between the first elastic piece 34 and the display screen 12 can be significantly increased. In this way, in the Z-axis direction, the protrusion 411 of the radiator 41 can also be disposed in a direction away from the display screen 12, that is, the antenna clearance area between the bottom of the protrusion 411 and the display screen 12 can be made larger, and the performance of the antenna is also better.

In addition, when both the first elastic piece 34 and the protrusion 411 are disposed away from the display screen 12, the contact point of the first elastic piece 34 in contact with the protrusion 411 may also be arranged away from the display screen 12. In this way, the contact point at which the first elastic piece 34 is in contact with the protrusion 411 is less affected by the display screen 12.

In an optional manner, when the third strengthening board 37 and the fourth strengthening board 38 are disposed in the second extension portion 322, the groove 314 is located between the first strengthening board 35 and the second strengthening board 36. In this case, the third strengthening board 37, the fourth strengthening board 38, and the first extension portion 312 may improve the strength of the second extension portion 322, thereby avoiding the strength of the second extension portion 322 from being reduced due to the groove 314 being opened.

Figure 35:
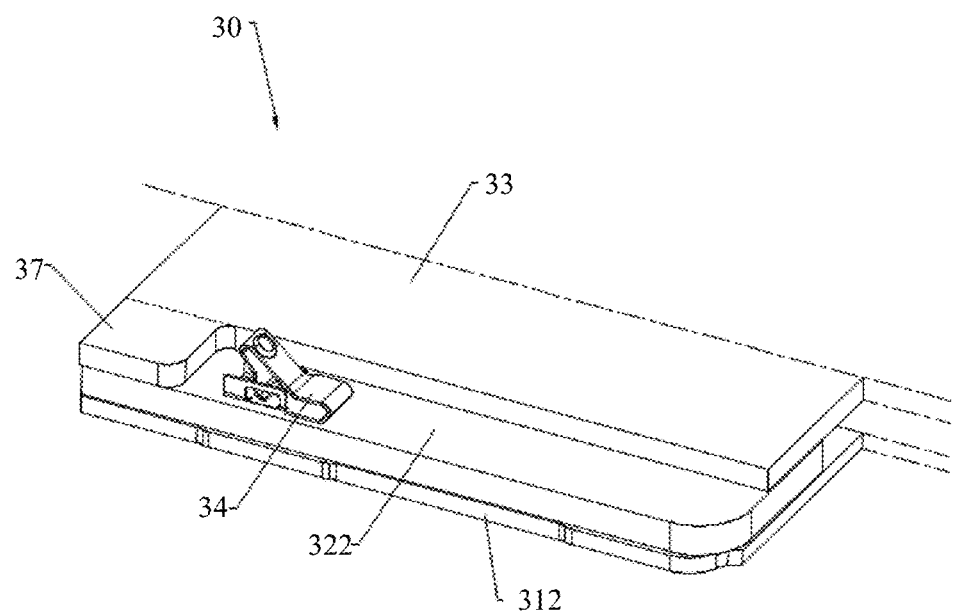
FIG. 35 is a partial schematic structural view of a circuit board assembly of an electronic device shown in FIG. 1 in still another optional manner.

FIG. 35 is a partial schematic structural view of a circuit board assembly of an electronic device shown in FIG. 1 in still another optional manner. The circuit board assembly 30 includes a third strengthening board 37. The third strengthening board 37 is located on one side of a first elastic piece 34.

In addition, the third strengthening board 37 is stacked on the second extension portion 322. In this way, the second extension portion 322, the second board 33, and the third strengthening board 37 enclose the first elastic piece 34.

It may be understood that, by stacking the third strengthening board 37 on one side of the first elastic piece 34 and on the second extension portion 322, the structural strength of the second extension portion 322 is significantly improved. In this way, when the first elastic piece 34 is in elastic contact with the radiator 41 of the antenna, the first elastic piece 34 receives a reaction force of the radiator 41. The first elastic piece 34 transmits the reaction force to the second extension portion 322. In this case, with the cooperation of the third strengthening board 37 and the first extension portion 312, the second extension portion 322 can effectively counteract the force, thereby avoiding the second extension portion 322 from being damaged or cracked due to an external force, and thus avoiding the disconnection of the circuit of the antenna.

In this implementation, FIG. 35 shows that the second extension portion 322 and the first extension portion 312 are disposed flush with each other. In another optional manner, the second extension portion 322 may alternatively be staggered from the first extension portion 312.

In another optional manner, a plurality of first elastic pieces 34 may be disposed on the second extension portion 322. Different first elastic pieces 34 may be applied in different antennas. In this way, the circuit board assembly 30 has lots of functions and is widely used.

Figure 36:
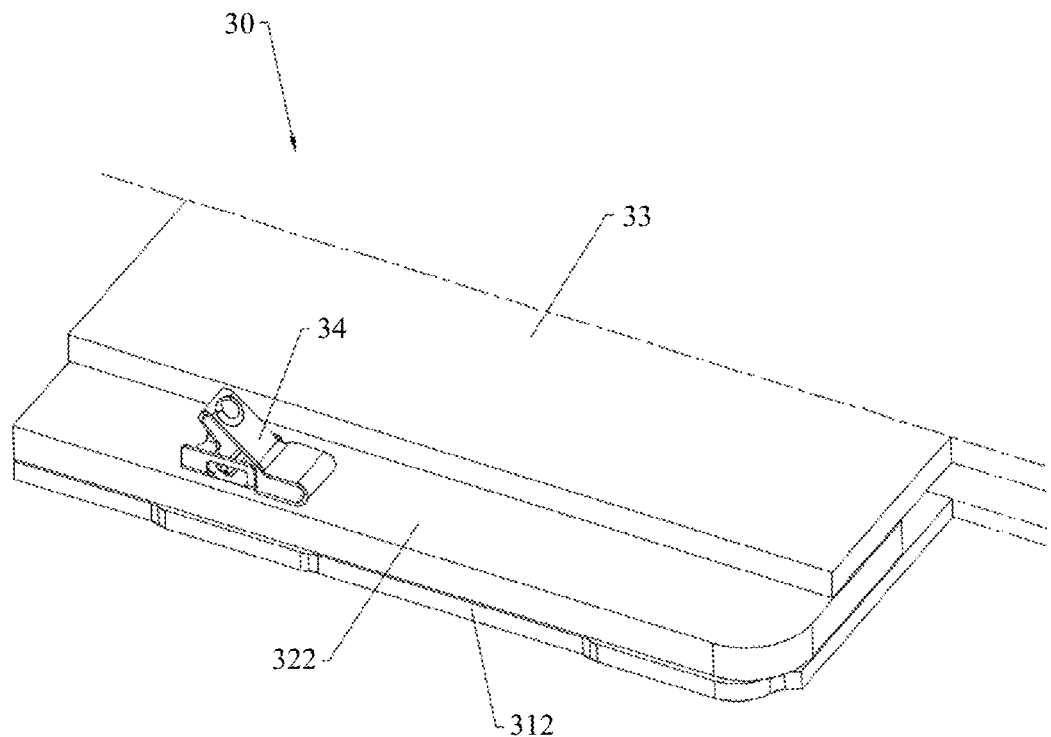
FIG. 36 is a partial schematic structural view of a circuit board assembly of an electronic device shown in FIG. 1 in still another optional manner.

FIG. 36 is a partial schematic structural view of a circuit board assembly of an electronic device shown in FIG. 1 in still another optional manner. The circuit board assembly 30 no longer includes the third strengthening board 37 and the fourth strengthening board 38. In this way, the space of the second extension portion 322 is wider. In addition, because the second extension portion 322 of the elevating board 32 is stacked on the first extension portion 312 of the first board 31, the structural strength of the second extension portion 322 is better. In this case, the plurality of first elastic pieces 34 may be disposed on the second extension portion 322. Different first elastic pieces 34 may be applied in different antennas. In this way, the circuit board assembly 30 has lots of functions and is widely used.

In this implementation, FIG. 36 shows that the second extension portion 322 and the first extension portion 312 are disposed flush with each other. In another optional manner, the second extension portion 322 may alternatively be staggered from the first extension portion 312.

The first embodiment of the electronic device 100 in which the screen 10 is flat is described above in detail with reference to the associated drawings. A second embodiment of an electronic device 100 in which a screen 10 is curved is described in detail below with reference to the associated drawings.

Figure 37:
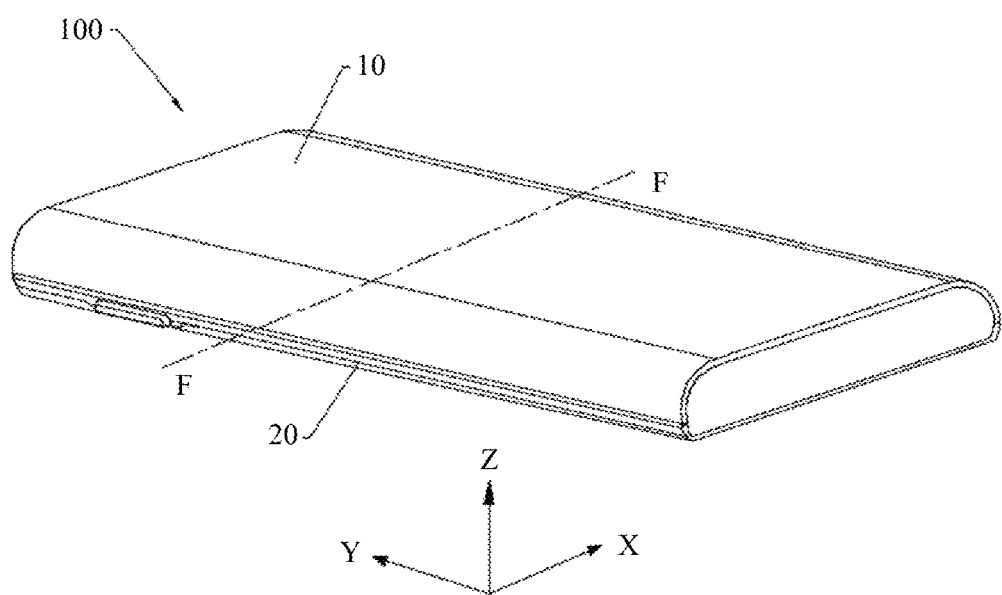
FIG. 37 is a schematic structural view of an electronic device in another optional manner provided by an embodiment of this application.

In the second embodiment, the same technical contents as in the first embodiment are not described again. FIG. 37 is a schematic structural view of an electronic device in another optional manner provided by an embodiment of this application. The screen 10 of the electronic device 100 is a curved screen. The screen 10 may be a 2.5-dimensions (Dimensions, D) curved screen or a 3D curved screen. Details are not limited in this embodiment. FIG. 37 shows that the screen 10 covers the majority of a housing 20.

Figure 38:
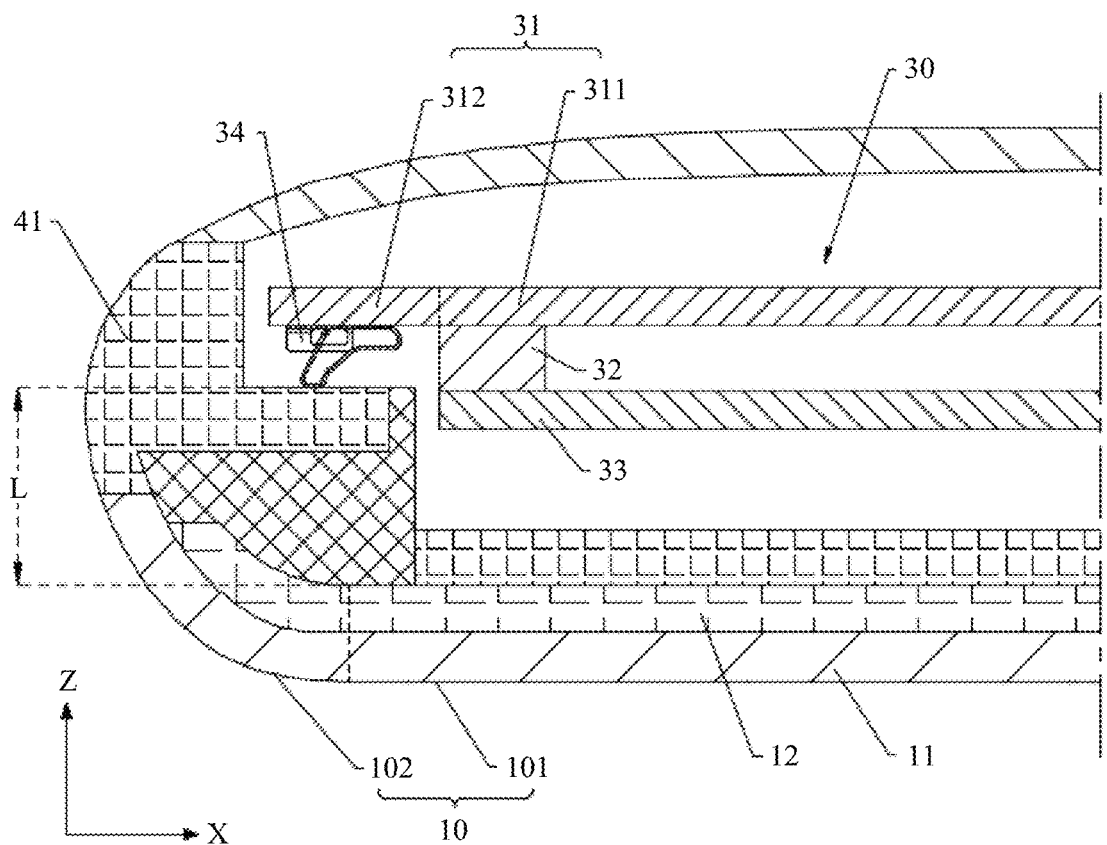
FIG. 38 is a partial cross-sectional view of an electronic device shown in FIG. 37 in an optional manner taken along a line F-F.

FIG. 38 is a partial cross-sectional view of an electronic device shown in FIG. 37 taken along a line F-F. It may be understood that, the cross-sectional view illustrated in FIG. 38 is a partial cross-sectional view formed by taking a cross section from the electronic device in FIG. 37 along a line F-F, viewing along a positive direction of the Y-axis, and then rotating the obtained cross-sectional view by 180° with the Y-axis as a rotational axis. The screen 10 includes a flat portion 101 and a bending portion 102 connected to the flat portion 101. It may be understood that, the flat portion 101 is a flat part in the screen 10, and the bending portion 102 is a bent part in the screen 10. In addition, the flat portion 101 includes a part of a protective cover plate 11 and a part of a display screen 12. the bending portion 102 includes a part of the protective cover plate 11 and a part of the display screen 12.

In this embodiment, a circuit board assembly 30 of the electronic device 100 includes a first board 31, an elevating board 32, a second board 33, and a first conductive member 34. The configuration manners for the first board 31, the elevating board 32, the second board 33, and the first conductive member 34 may refer to the configuration manners for the first board 31, the elevating board 32, the second board 33, and the first conductive member 34 in the first embodiment. which are not described herein again.

It may be understood that, when the screen 10 is a curved screen, the bending portion 102 of the screen 10 form a side of the electronic device 100. In this case, when the first elastic piece 34 is disposed on the second board 33, the first elastic piece 34 is likely to be surrounded by the bending portion 102 of the screen 10 in the X-axis direction. In this case, the radio frequency signal of the antenna is more affected by the bending portion 102 of the screen 10. In addition, in the Z-axis direction, the distance between the first elastic piece 34 and the flat portion 101 of the screen 10 is short, so that in the Z-axis direction, the clearance area of the antenna is extremely compressed, and the performance of the antenna is poor. However, in this embodiment, by disposing the first extension portion 312 protruding relative to the elevating board 32 and the second board 33 on the first board 31, and fixedly connecting the first elastic piece 34 to the first extension portion 312, in the X-axis direction, the first elastic piece 34 is no longer surrounded by the bending portion 102 of the screen 10. In this way, the first elastic piece 34 is less affected by the bending portion 102, and the performance of the antenna is better. In addition, when the first elastic piece 34 is fixedly connected to the first extension portion 312, in the Z-axis direction, the distance between the first elastic piece 34 and the flat portion 101 of the screen 10 is further. In this way, in the Z-axis direction, the antenna clearance area between the first elastic piece 34 and the flat portion 101 of the screen 10 is larger, and the performance of the antenna is better.

In addition, when both the first elastic piece 34 and the protrusion 411 are disposed away from the display screen 12, the contact point of the first elastic piece 34 in contact with the protrusion 411 may also be arranged away from the display screen 12. In this way, the contact point at which the first elastic piece 34 is in contact with the protrusion 411 is less affected by the display screen 12.

Referring to FIG. 38 again, a distance L from the contact point between the first elastic piece 34 and the radiator 41 to the flat portion 101 is greater than or equal to 2 mm. For example, L equals 2 mm, 2.5 mm, 3 mm, 3.5 mm or 4 mm.

It may be understood that, when the distance L from the contact point between the first elastic piece 34 and the radiator 41 to the flat portion 101 is greater than or equal to 2 mm, the first elastic piece 34 can be disposed away from the flat portion 101 to a greater extent. In this case, in the Z-axis direction, the protrusion 411 may also be disposed away from the display screen 12 to a greater extent. In this way, the antenna clearance area between the bottom of the protrusion 411 and the display screen 12 is greatly increased, and the performance of the antenna is also better.

In addition, a distance L from the contact point between the first elastic piece 34 and the radiator 41 to the flat portion 101 is less than or equal to 4.7 mm.

It may be understood that, when the distance L from the contact point between the first elastic piece 34 and the radiator 41 to the flat portion 101 is less than or equal to 4.7 mm, on the one hand, it can be ensured that the first elastic piece 34 is disposed away from the flat portion 101; on the other hand, it can be ensured that the thickness of the electronic device 100 in the Z-axis direction is not too large, which is conducive for thinning configuration.

It may be understood that, FIG. 38 shows only one structure of the circuit board assembly 30. In another optional manner, the electronic device 100 with a curved screen may also include various structures of the circuit board assembly 30 in the first embodiment.

The embodiment of the electronic device 100 in which the screen 10 is curved is described above in detail with reference to the associated drawings. An embodiment of another electronic device 100 in which a screen 10 is curved is described in detail below with reference to the associated drawings.

Figure 39:
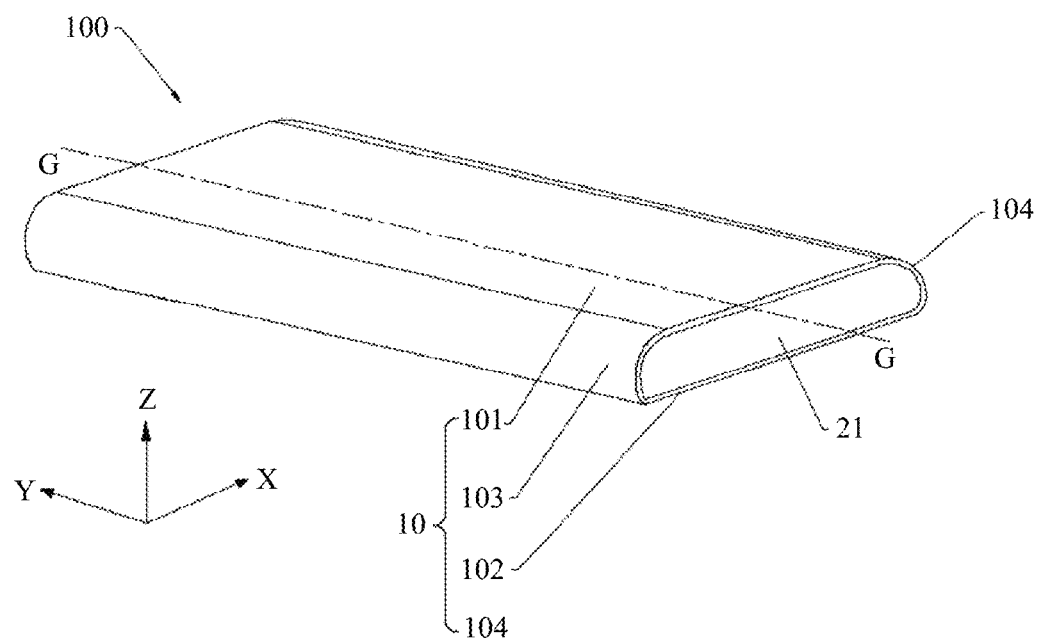
FIG. 39 is a schematic structural view of an electronic device in another optional manner provided by an embodiment of this application.

In the third embodiment, the same technical contents as in the first embodiment and the second embodiment are not described again. FIG. 39 is a schematic structural view of an electronic device in still another optional manner provided by an embodiment of this application. The screen 10 of the electronic device 100 includes a first screen region 101 and a second screen region 102 disposed relative to each other, and a third screen region 103 and a fourth screen region 104 disposed relative to each other. The third screen region 103 and the fourth screen region 104 are connected between the first screen region 101 and the second screen region 102. In this case, the screen 10 of the electronic device 100 is a 360° curved screen.

In this implementation, a housing 20 no longer includes a rear cover 22, that is, the housing 20 includes a frame 21. The first screen region 101, the third screen region 103, the second screen region 102, and the fourth screen region 104 are disposed around the frame 21. FIG. 39 shows that the first screen region 101 and the second screen region 102 are located on a top side and bottom side of the frame 21, and the third screen region 103 and the fourth screen region 104 are located on a left side and right side of the frame 21.

Figure 40:
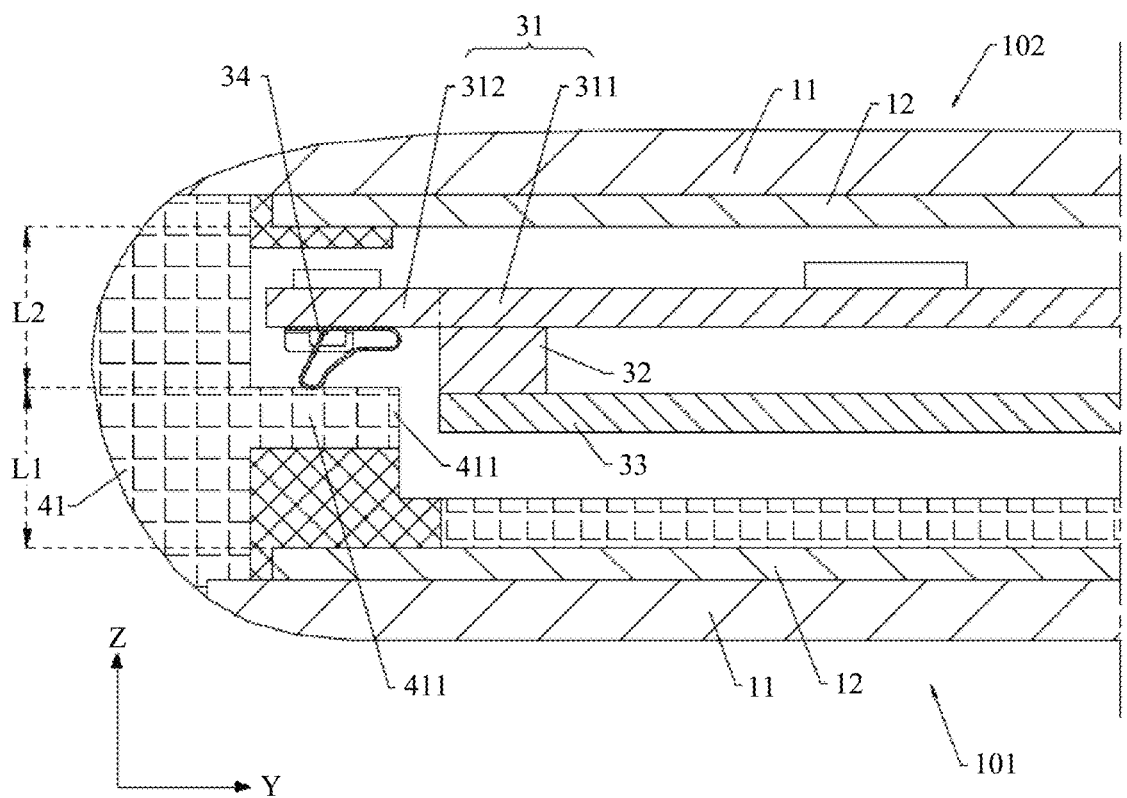
FIG. 40 is a partial cross-sectional view of an electronic device shown in FIG. 39 in an optional manner taken along a line G-G.

FIG. 40 is a partial cross-sectional view of an electronic device shown in FIG. 39 taken along a line G-G. It may be understood that, the cross-sectional view illustrated in FIG. 40 is a cross-sectional view formed by taking a cross section from the electronic device in FIG. 39 along a line G-G, viewing along a positive direction of the Y-axis, and then rotating the obtained cross-sectional view by 180° with the Y-axis as a rotational axis. The first screen region 101 and the second screen region 102 both include a part of a protective cover plate 11 and a part of a display screen 12. In addition, a circuit board assembly 30 of the electronic device 100 includes a first board 31, an elevating board 32, a second board 33, and a first conductive member 34. The configuration manners for the first board 31, the elevating board 32, the second board 33, and the first conductive member 34 may refer to the configuration manners for the first board 31, the elevating board 32, the second board 33, and the first conductive member 34 in the first embodiment. which are not described herein again. In this embodiment, the first conductive member 34 is described using a first elastic piece 34 as an example.

In addition, the distance from the contact point between the first conductive member 34 and the radiator 41 to the first screen region 101 is a first distance L1. The distance from the contact point between the first conductive member 34 and the radiator 41 to the second screen region 102 is a second distance L2, and the ratio of the first distance L1 to the second distance L2 ranges from 0.5 to 2. For example, the ratio of the first distance L1 to the second distance L2 is 0.5, 0.8, 1, 1.4, 1.5, 1.8, or 2.

It may be understood that, when the first elastic piece 34 is fixed to the second board 33, in the Z-axis direction, the distance between the first elastic piece 34 and the first screen region 101 is small, that is, the first elastic piece 34 is disposed close to the first screen region 101. In this implementation, when the first elastic piece 34 is fixedly connected to the first extension portion 312, and the ratio of the first distance L1 to the second distance L2 ranges from 0.5 to 2, in the Z-axis direction, the distance between the first elastic piece 34 and the first screen region 101 is greatly increased. In this way, in the Z-axis direction, the antenna clearance area between the first elastic piece 34 and the first screen region 101 is greatly increased, and the performance of the antenna is also greatly improved. In addition, when the ratio of the first distance L1 to the second distance L2 ranges from 0.5 to 2, the distance from the contact point between the first conductive member 34 and the radiator 41 to the second screen region 102 is relatively moderate. In this case, the second screen region 102 has less influence on the performance of the antenna for transmitting and receiving the electromagnetic waves.

In an optional manner, the first distance L1 from the contact point between the first conductive member 34 and the radiator 41 to the first screen region 101 is greater than or equal to 2 mm. For example, L1 equals 2 mm, 2.5 mm, 3 mm, 3.5 mm or 4 mm.

It may be understood that, when the first distance L1 from the contact point between the first conductive member 34 and the radiator 41 to the first screen region 101 is greater than or equal to 2 mm, the first elastic piece 34 can be disposed away from the first screen region 101 to a greater extent. In this case, in the Z-axis direction, the protrusion 411 can also be disposed away from the first screen region 101 to a greater extent, so that the antenna clearance area between the bottom of the protrusion 411 and the first screen region 101 is greatly increased, and the performance of the antenna is also better.

In addition, the first distance L1 from the contact point between the first conductive member 34 and the radiator 41 to the first screen region 101 is less than or equal to 4.7 mm.

It may be understood that, when the first distance L1 from the contact point between the first conductive member 34 and the radiator 41 to the first screen region 101 is less than or equal to 4.7 mm, on the one hand, it can be ensured that the first elastic piece 34 is disposed away from the first screen region 101; and on the other hand, it can be ensured that the thickness of the electronic device 100 in the Z-axis direction is not great, which facilitates thinning of the electronic device 100.

It may be understood that, FIG. 40 shows only one structure of the circuit board assembly 30. In another optional manner, the electronic device 100 with a curved screen may also include various structures of the circuit board assembly 30 in the first embodiment.

Embodiments of three electronic devices 100 are described above in detail. Among the three electronic devices 100, each of the electronic devices 100 is provided with the circuit board assembly 30 of each of the foregoing optional manners. In this way, in an environment where the antenna arrangement is tight, the antenna of the electronic device 100 has a wide clearance area, thereby significantly improving the antenna performance of the electronic device 100. In another embodiment, the circuit board assembly 30 of each of the foregoing optional manners may also be disposed in an electronic device with a folding screen. In this way, in the electronic device with a folding screen, the electronic device can also have a wide clearance area for antenna in an environment where the antenna arrangement is tight, thereby significantly improving the antenna performance of the electronic device 100.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising a frame, a screen, and a circuit board assembly; wherein
the screen is mounted on one side of the frame, and a part of the frame forms a radiator of an antenna or the radiator of the antenna is fixed on an inner side of the frame; and
the circuit board assembly is located on the inner side of the frame, the circuit board assembly comprises a first conductive member, a first board, an elevating board, and a second board, with the first board, the elevating board, and the second board being sequentially stacked, the first board is located on one side of the second board away from the screen, the first board comprises a first main body portion and a first extension portion connected to the first main body portion, the first main body portion is fixedly connected to the elevating board, the first extension portion protrudes relative to the elevating board and the second board, and is disposed close to the radiator, and the first conductive member is fixed to the first extension portion and is in elastic contact with the radiator;
the circuit board assembly further comprises a first strengthening board, and the first strengthening board is located on one side of the first conductive member, and is fixedly connected to a board surface of the first extension portion facing the screen.

2. The electronic device according to claim 1, wherein the first strengthening board comprises a first portion and a second portion connected to the first portion, the first portion is fixedly connected to the board surface of the first extension portion facing the screen, the first portion is fixedly connected to the elevating board, the second portion is fixedly connected to the second board, and in a thickness direction of the electronic device, a thickness of the first strengthening board is greater than a thickness of the elevating board.

3. The electronic device according to claim 2, wherein the first portion is provided with a first strengthening solder pad, the first extension portion is provided with a second strengthening solder pad, and the first strengthening solder pad is soldered to the second strengthening solder pad.

4. The electronic device according to claim 1, wherein the circuit board assembly further comprises a second strengthening board, and the second strengthening board is located on one side of the first conductive member away from the first strengthening board, and is fixedly connected to the board surface of the first extension portion facing the screen.

5. The electronic device according to claim 4, wherein the first extension portion is provided with a groove, the groove is located between the first strengthening board and the second strengthening board, an opening of the groove is located on a surface of the first extension portion facing the screen, and a part of the first conductive member is mounted in the groove.

6. The electronic device according to claim 1, wherein the electronic device comprises a fastener, the radiator is provided with a blind hole, the fastener is fixed into the blind hole, and the first conductive member is in elastic contact with the fastener.

7. The electronic device according to claim 1, wherein the radiator comprises an inner side surface facing the circuit board assembly, and the first conductive member is in elastic contact with the inner side surface.

8. The electronic device according to claim 1, wherein the electronic device further comprises a middle plate, the middle plate is located on the inner side of the frame, the middle plate is grounded, the frame further comprises a connection segment, one end of the connection segment is connected to the radiator, and the other end is connected to the middle plate.

9. The electronic device according to claim 1, wherein the electronic device further comprises a middle plate, the middle plate is grounded, the middle plate is located on the inner side of the frame, the circuit board assembly further comprises a second conductive member and a third conductive member, the second conductive member is fixed to the first extension portion of the first board, the second conductive member is in elastic contact with the radiator, the third conductive member is fixed to the second board, and the third conductive member is in elastic contact with the middle plate, and is electrically connected to the second conductive member.

10. The electronic device according to claim 1, wherein the radiator comprises a protrusion facing an interior of the electronic device, the first conductive member is fixed to one side of the first extension portion facing the screen, the first conductive member is in elastic contact with the protrusion, the first conductive member is electrically connected between the radiator and a radio frequency path of the antenna, and the radio frequency path is mounted on the circuit board assembly;
the circuit board assembly further comprises a first strengthening board and a second strengthening board, the first strengthening board and the second strengthening board are respectively located on two sides of the first conductive member, and in a thickness direction of the electronic device, a thickness of the first strengthening board and a thickness of the second strengthening board are both greater than a thickness of the elevating board;
the first strengthening board comprises a first portion and a second portion connected to the first portion, the first portion is fixedly connected to a board surface of the first extension portion facing the screen, the first portion is fixedly connected to the elevating board, and the second portion is fixedly connected to the second board;
the second strengthening board comprises a third portion and a fourth portion connected to the third portion, the third portion is fixedly connected to the board surface of the first extension portion facing the screen, the third portion is fixedly connected to the elevating board, and the fourth portion is fixedly connected to the second board; and
the first portion, the third portion, and the elevating board are of an integrally formed structure, and the second portion, the fourth portion, and the second board are of an integrally formed structure.

11. An electronic device, comprising a frame, a screen, and a circuit board assembly; wherein
the screen is mounted on the frame and is disposed around the frame, and the screen comprises a first screen region and a second screen region disposed opposite to each other;
a part of the frame forms a radiator of an antenna, or the radiator of the antenna is fixed on an inner side of the frame;

the circuit board assembly is located on the inner side of the frame, the circuit board assembly comprises a first conductive member, a first board, an elevating board, and a second board with the first board, the elevating board, and the second board being sequentially stacked, the first board is disposed away from the first screen region relative to the second board, the first board comprises a first main body portion and a first extension portion connected to the first main body portion, the first main body portion is fixedly connected to the elevating board, the first extension portion protrudes relative to the elevating board and the second board, and is disposed close to the radiator, and the first conductive member is fixed to the first extension portion and is in elastic contact with the radiator; and a distance from a contact point between the first conductive member and the radiator to the first screen region is a first distance, a distance from the contact point between the first conductive member and the radiator to the second screen region is a second distance, and a ratio of the first distance to the second distance ranges from 0.5 to 2.

12. The electronic device according to claim 11, wherein the circuit board assembly further comprises a first strengthening board, the first strengthening board is located on one side of the first conductive member, and is fixedly connected to a board surface of the first extension portion facing the first screen region.

13. The electronic device according to claim 12, wherein the circuit board assembly further comprises a second strengthening board, and the second strengthening board is located on one side of the first conductive member away from the first strengthening board, and is fixedly connected to the board surface of the first extension portion facing the first screen region.

14. The electronic device according to claim 11, wherein the radiator comprises an inner side surface facing the circuit board assembly, and the first conductive member is in elastic contact with the inner side surface.

15. The electronic device according to claim 1, wherein the first portion and the elevating board are of an integrally formed structure, and the second portion and the second board are of an integrally formed structure.

16. The electronic device according to claim 4, wherein the second strengthening board comprises a third portion and a fourth portion connected to the third portion, the third portion is fixedly connected to the board surface of the first extension portion facing the screen, the third portion is fixedly connected to the elevating board, the fourth portion is fixedly connected to the second board, and in a thickness direction of the electronic device, a thickness of the second strengthening board is greater than a thickness of the elevating board.

17. The electronic device according to claim 16, wherein the third portion and the elevating board are of an integrally formed structure, and the fourth portion and the second board are of an integrally formed structure.

18. The electronic device according to claim 1, wherein a conductive piece is disposed on a surface of the radiator facing the first conductive member, and the first conductive member is in elastic contact with the conductive piece.

* * * * *